(12) United States Patent
Arriola et al.

(10) Patent No.: US 8,785,551 B2
(45) Date of Patent: *Jul. 22, 2014

(54) CATALYST COMPOSITION COMPRISING SHUTTLING AGENT FOR ETHYLENE MULTI-BLOCK COPOLYMER FORMATION

(75) Inventors: Daniel J. Arriola, Midland, MI (US); Edmund M. Carnahan, Fresno, TX (US); Yunwa Wilson Cheung, Lake Jackson, TX (US); David D. Devore, Midland, MI (US); David D. Graf, Midland, MI (US); Phillip D. Hustad, Manvel, TX (US); Roger L. Kuhlman, Charleston, WV (US); Colin Li Pi Shan, Pearland, TX (US); Benjamin C. Poon, Lake Jackson, TX (US); Gordon R. Roof, Midland, MI (US); James C. Stevens, Richmond, TX (US); Pamela J. Stirn, Midland, MI (US); Timothy T. Wenzel, Charleston, WV (US)

(73) Assignee: Dow Global Technologies LLC, Midland, MI (US)

( * ) Notice: Subject to any disclaimer, the term of this patent is extended or adjusted under 35 U.S.C. 154(b) by 245 days.

This patent is subject to a terminal disclaimer.

(21) Appl. No.: 12/962,800

(22) Filed: Dec. 8, 2010

(65) Prior Publication Data

US 2011/0118416 A1 May 19, 2011

Related U.S. Application Data

(63) Continuation of application No. 10/589,377, filed as application No. PCT/US2005/008917 on Mar. 17, 2005, now Pat. No. 7,858,706.

(60) Provisional application No. 60/553,906, filed on Mar. 17, 2004.

(51) Int. Cl.
*C08F 255/02* (2006.01)
*C08F 255/00* (2006.01)
*C08F 293/00* (2006.01)

(52) U.S. Cl.
USPC ........... 524/783; 524/779; 525/242; 525/245; 525/319

(58) Field of Classification Search
USPC ......... 524/439, 440, 543, 570, 700, 779, 780, 524/783; 525/242, 244, 245, 319, 320, 321, 525/322, 323, 324
See application file for complete search history.

(56) References Cited

U.S. PATENT DOCUMENTS

| | | |
|---|---|---|
| 2,973,344 A | 2/1961 | Fasce et al. |
| 2,997,432 A | 8/1961 | Koble et al. |
| 3,873,642 A | 3/1975 | Jezl |
| 3,970,719 A | 7/1976 | Edmonds, Jr. |
| 4,039,632 A | 8/1977 | Edmonds, Jr. |
| 4,146,492 A | 3/1979 | Cusano et al. |
| 4,299,931 A | 11/1981 | Coran et al. |
| 4,429,079 A | 1/1984 | Shibata et al. |
| 4,510,031 A | 4/1985 | Matsumura et al. |
| 4,780,228 A | 10/1988 | Gardiner et al. |
| 4,798,081 A | 1/1989 | Hazlitt et al. |
| 4,971,936 A | 11/1990 | Wilson et al. |
| 5,068,047 A | 11/1991 | Chung et al. |
| 5,077,328 A | 12/1991 | Haruna et al. |
| 5,089,573 A | 2/1992 | Job |
| 5,118,767 A | 6/1992 | Job |
| 5,118,768 A | 6/1992 | Job et al. |
| 5,134,209 A | 7/1992 | Job et al. |
| 5,210,338 A | 5/1993 | Samsel |
| 5,229,477 A | 7/1993 | Job et al. |
| 5,266,626 A | 11/1993 | Hert et al. |
| 5,270,276 A | 12/1993 | Job |
| 5,270,410 A | 12/1993 | Job |
| 5,276,220 A | 1/1994 | Samsel et al. |
| 5,294,581 A | 3/1994 | Job |
| 5,391,629 A | 2/1995 | Turner et al. |
| 5,468,810 A | 11/1995 | Hayakawa et al. |
| 5,543,458 A | 8/1996 | Hoxmeier et al. |
| 5,550,194 A | 8/1996 | Hoxmeier et al. |
| 5,594,080 A | 1/1997 | Waymouth et al. |
| 5,597,881 A | 1/1997 | Winter et al. |
| 5,610,253 A | 3/1997 | Hatke et al. |
| 5,624,991 A | 4/1997 | Harada et al. |

(Continued)

FOREIGN PATENT DOCUMENTS

| | | |
|---|---|---|
| EP | 0274906 | 7/1988 |
| EP | 470171 | 2/1992 |

(Continued)

OTHER PUBLICATIONS

Przybyla, C. et al, Acta Polymerica vol. 50, pp. 77-83 (1999).

(Continued)

*Primary Examiner* — Irina S Zemel
*Assistant Examiner* — Jeffrey Lenihan
(74) *Attorney, Agent, or Firm* — Whyte Hirschboeck Dudek S.C.

(57) ABSTRACT

A composition for use in forming a multi-block copolymer, said copolymer containing therein two or more segments or blocks differing in chemical or physical properties, a polymerization process using the same, and the resulting polymers, wherein the composition comprises the admixture or reaction product resulting from combining:

(A) a first metal complex olefin polymerization catalyst, (B) a second metal complex olefin polymerization catalyst capable of preparing polymers differing in chemical or physical properties from the polymer prepared by catalyst (A) under equivalent polymerization conditions, and (C) a chain shuttling agent.

8 Claims, 48 Drawing Sheets

(56) References Cited

U.S. PATENT DOCUMENTS

| | | | |
|---|---|---|---|
| 5,693,713 | A | 12/1997 | Hoxmeier et al. |
| 5,733,980 | A | 3/1998 | Cozewith et al. |
| 5,783,531 | A | 7/1998 | Andrew et al. |
| 5,798,420 | A | 8/1998 | Cozewith et al. |
| 5,868,984 | A | 2/1999 | Winter et al. |
| 5,892,076 | A | 4/1999 | Nickias |
| 5,916,953 | A | 6/1999 | Jacoby et al. |
| 5,969,070 | A | 10/1999 | Waymouth et al. |
| 5,994,255 | A | 11/1999 | Nickias et al. |
| 6,008,262 | A | 12/1999 | McKay et al. |
| 6,025,448 | A | 2/2000 | Swindoll et al. |
| 6,096,668 | A | 8/2000 | Abuto et al. |
| 6,114,457 | A | 9/2000 | Markel et al. |
| 6,121,402 | A | 9/2000 | Machida et al. |
| 6,136,937 | A | 10/2000 | Lai et al. |
| 6,147,180 | A | 11/2000 | Markel et al. |
| 6,160,029 | A | 12/2000 | Chaudhary et al. |
| 6,169,151 | B1 | 1/2001 | Waymouth et al. |
| 6,187,424 | B1 | 2/2001 | Kjellqvist et al. |
| 6,197,404 | B1 | 3/2001 | Varona |
| 6,262,203 | B1 | 7/2001 | Chien et al. |
| 6,322,728 | B1 | 11/2001 | Brodkin et al. |
| 6,323,284 | B1 | 11/2001 | Peacock |
| 6,362,252 | B1 | 3/2002 | Prutkin |
| 6,380,341 | B1 | 4/2002 | Waymouth et al. |
| 6,444,867 | B1 | 9/2002 | Samsel et al. |
| 6,455,638 | B2 | 9/2002 | Laughner et al. |
| 6,537,472 | B2 | 3/2003 | Masubuchi |
| 6,566,446 | B1 | 5/2003 | Parikh et al. |
| 6,566,544 | B1 | 5/2003 | Waymouth et al. |
| 6,815,023 | B1 | 11/2004 | Tatarka et al. |
| 6,815,508 | B1 * | 11/2004 | Terano et al. ............. 525/323 |
| 6,924,334 | B1 * | 8/2005 | Fukatani et al. ............. 524/445 |
| 7,005,395 | B2 | 2/2006 | Zafiroglu et al. |
| 7,858,707 | B2 * | 12/2010 | Arriola et al. ............. 525/245 |
| 2002/0107341 | A1 | 8/2002 | Murray et al. |
| 2002/0161141 | A1 | 10/2002 | Mawson et al. |
| 2003/0027954 | A1 | 2/2003 | Becke et al. |
| 2003/0088037 | A1 | 5/2003 | Stevens et al. |
| 2003/0114623 | A1 | 6/2003 | Mitani et al. |
| 2003/0153689 | A1 | 8/2003 | Mehta et al. |
| 2003/0195128 | A1 | 10/2003 | Deckman et al. |
| 2003/0195308 | A1 | 10/2003 | Waymouth et al. |
| 2003/0216518 | A1 | 11/2003 | Tau et al. |
| 2004/0044154 | A1 | 3/2004 | Kuo et al. |
| 2004/0082750 | A1 | 4/2004 | Tau et al. |
| 2004/0092662 | A1 | 5/2004 | Goto et al. |
| 2004/0121922 | A1 | 6/2004 | Okada et al. |
| 2004/0158011 | A1 | 8/2004 | Jain et al. |
| 2004/0192147 | A1 | 9/2004 | Smith et al. |
| 2005/0009993 | A1 | 1/2005 | Morioka et al. |
| 2005/0131160 | A1 * | 6/2005 | Shimizu et al. ............. 525/242 |
| 2006/0030667 | A1 | 2/2006 | Yalvac et al. |
| 2008/0299857 | A1 | 12/2008 | Harding et al. |

FOREIGN PATENT DOCUMENTS

| | | |
|---|---|---|
| EP | 500530 | 9/1992 |
| EP | 0877050 | 11/1998 |
| EP | 0958313 | 11/1999 |
| EP | 1026184 | 8/2000 |
| EP | 1197500 | 4/2002 |
| EP | 1262498 | 12/2002 |
| EP | 02079322 | 7/2009 |
| JP | 2002206007 | 7/2002 |
| JP | 2004204058 | 7/2004 |
| WO | 9012816 | 11/1990 |
| WO | 9100875 | 1/1991 |
| WO | 9527745 | 10/1995 |
| WO | 9527746 | 10/1995 |
| WO | 9834970 | 8/1998 |
| WO | 9849211 | 11/1998 |
| WO | 9935171 | 7/1999 |
| WO | WO 0023489 A1 * | 4/2000 |
| WO | 0037514 | 6/2000 |
| WO | WO-01/36532 A1 * | 5/2001 |
| WO | 02066540 | 8/2002 |
| WO | 03014046 | 2/2003 |
| WO | 03022890 | 3/2003 |
| WO | WO 03064488 A1 * | 8/2003 |
| WO | 2004046214 | 6/2004 |
| WO | 2005090426 | 9/2005 |

OTHER PUBLICATIONS

Lieber SuSanna et al: "Propene polymeriztion with catalyst mixtures containing different ansa-zirconocenes:chain transfer to alkylaluminum cocatalystes and formation of steroblock polymers" Macromolecues; Macromolecules Dec. 2000 ACS, Washington.DC. USA.

Chien James C W et al:"Homogeneous binary zirconocenium catalystst for propylene ploymeriation. II. Mixtures of isospecific and syndiospecific zirconocene systems" J Polym Sci Part A; Ploymer Chemistry 1999 John Wiley & Sons Inc. NewYork, NY USA.vol. 37.

Tanim B S et al: "Blends of single-site linear and branched polyethylene. I. Thermal characterisation" Polymer, Elesvier Science Publishers B.V., GB. vol. 42, No. 12, Jun. 2001, pp. 5389-52399.

Starck P et al "Thermal properites of ethylene/long chain alpha olefin copolymers produced by metallocences" Jan. 2002, European Polymers Journal, Peramon Press, London, GB, pp. 97-107.

Yoon J-S et al: "Thermal and mechanical properties of ethylene/ alpha-olefin copolymers produced over (2-Melnd) 2ZrC12/MAO system" Jun. 2000, Polymer Elsevier Science Publishers B.V. GB. pp. 4523 4530.

Bruaseth I et al: "Crystallization analysis fractionation of ethene/1-hexene coployres madee with the MAO-activated dual-site (1,2,4-Me3Cp..." Oct. 2004, Polymer, Elesevier Science Publishers B.V. GB. pp. 7853-7861.

Graef S M et al: Copolymerization of propylene with higher alpha-olefins in the presence of the syndiospecific catalyste i-Pr (Cp) (9-Flu)... Jan. 1, 2002, J Polym Sci Part A; Journal of Polymer vol. 40, nr. pp. 128-140.

Rosthauser J W et al: "Mechanical and Dynamic Mechanical Properties of Polyurethane and Polyurethane/Polyurea Elastomers Based on 4, 4-Diisocyanatodicyclohexyl Methane" May 2, 1997 Journal of Applied Polymer Science, John Wiley and Sons Inc. NewYork, NY.

Basak Sham: "Zurcon Z20/Z22" Aug. 10, 2002, Busak Shamm Ban , Crisser, the whole document.

Coates, Hustad, and Reinartz in Angew, Chem. Int. Ed. 41, 2236-2257 (2002).

Liu and Rytter, Macromolecular Rapid Comm. 22,952-956 (2001).

Bruaseth and Rytter, Macromolecules 36, 3026-3034 (2003).

[S]oares and Kim, J. Polym. Sci. Part A: Polym Chem, 38, 1408-1432 (2000).

Heiland and Kamisksy, Makrolmol. Chem. 193, 601-610 (1992).

JAC, 2004, 126, 10701-10712, Gibson et al.

Chein, James, et al.; Macromolecules, 30, 3447-3458, 1997.

\* cited by examiner

DSC Example 1

CRYSTAF Report
LIMS #: 77391.0
Reference: 102285-A2
Crystaf ID: 38600.0

|       | Temp (C) | Area (%) |
|-------|----------|----------|
| Peak 1 | 34.5 | 52.9 |
| Peak 2 | 64.0 | 16.5 |
| Peak 3 | 0.0 | 0.0 |
| Peak 4 | 0.0 | 0.0 |
| Soluble | < 30 | 30.0 |

Statistics
| Tn | 38.2 |
|----|------|
| Tw | 41.0 |
| r | 1.1 |
| R | 7.3 |
| RMS T | 12.0 |
| Median | 34.6 |
| SDBI | 18.5 |

DSC Example 2

CRYSTAF Report
LIMS #: 77392.0
Reference: 102285-A2
Crystaf ID: 38630.0

| | Temp (C) | Area (%) |
|---|---|---|
| Peak 1 | 46.2 | 57.0 |
| Peak 2 | 0.0 | 0.0 |
| Peak 3 | 0.0 | 0.0 |
| Peak 4 | 0.0 | 0.0 |
| Soluble | < 30 | 42.6 |

| Statistics | |
|---|---|
| Tn | 38.1 |
| Tw | 39.5 |
| r | 1.0 |
| R | 3.7 |
| RMS T | 7.5 |
| Median | 36.3 |
| SDBI | 18.9 |

DSC Example 3

CRYSTAF Report
LIMS #: 77393.0
Reference: 102285-E4
Crystaf ID: 38661.0

|  | Temp (C) | Area (%) |
|---|---|---|
| Peak 1 | 36.7 | 3.2 |
| Peak 2 | 66.1 | 71.8 |
| Peak 3 | 0.0 | 0.0 |
| Peak 4 | 0.0 | 0.0 |
| Soluble | < 30 | 24.3 |

Statistics
| Tn | 51.6 |
|---|---|
| Tw | 56.1 |
| r | 1.1 |
| R | 8.8 |
| RMS T | 14.1 |
| Median | 57.3 |
| SDBI | 18.4 |

DSC Example 4

CRYSTAF Report
LIMS #: 77394.0
Reference: 102285-E5
Crystaf ID: 38691.0

|  | Temp (C) | Area (%) |
|---|---|---|
| Peak 1 | 30.0 | 18.2 |
| Peak 2 | 48.4 | 26.5 |
| Peak 3 | 73.7 | 1.6 |
| Peak 4 | 77.2 | 0.7 |
| Soluble | <30 | 51.9 |

Statistics
| Tn | 37.2 |
|---|---|
| Tw | 40.2 |
| r | 1.1 |
| R | 8.1 |
| RMS T | 12.5 |
| Median | 30.0 |
| SDBI | 23.3 |

DSC Example 5

CRYSTAF Report
LIMS #: 70205.0
Reference: 200402166-28-8
Crystaf ID: 609-04

|  | Temp (C) | Area (%) |
|---|---|---|
| Peak 1 | 47.6 | 59.5 |
| Peak 2 | 0.0 | 0.0 |
| Peak 3 | 0.0 | 0.0 |
| Peak 4 | 0.0 | 0.0 |
| Soluble | < 30 | 37.8 |

| Statistics | |
|---|---|
| Tn | 42.5 |
| Tw | 45.5 |
| r | 1.1 |
| R | 7.1 |
| RMS T | 11.8 |
| Median | 42.3 |
| SDBI | 19.0 |

DSC Example 6

CRYSTAF Report
LIMS #: 70203.0
Reference: 200402166-28-6
Crystaf ID: 607-04

|  | Temp (C) | Area (%) |
|---|---|---|
| Peak 1 | 44.2 | 62.7 |
| Peak 2 | 0.0 | 0.0 |
| Peak 3 | 0.0 | 0.0 |
| Peak 4 | 0.0 | 0.0 |
| Soluble | < 30 | 37.0 |

Statistics
Tn 41.2
Tw 43.1
r 1.0
R 4.6
RMS T 8.8
Median 41.3
SDBI 18.9

DSC Example 7

CRYSTAF Report
LIMS #: 70432.0
Reference: 200402166-28-10
Crystaf ID: 621-04

| | Temp (C) | Area (%) |
|---|---|---|
| Peak 1 | 49.2 | 29.4 |
| Peak 2 | 70.3 | 2.0 |
| Peak 3 | 78.1 | 6.2 |
| Peak 4 | 0.0 | 0.0 |
| Soluble | < 30 | 62.2 |

Statistics
| | |
|---|---|
| Tn | 42.1 |
| Tw | 47.3 |
| r | 1.1 |
| R | 12.6 |
| RMS T | 16.0 |
| Median | 30.0 |
| SDBI | 23.0 |

DSC Example 8

CRYSTAF Report
LIMS #: 70552.0
Reference: 200402166-28-13
Crystaf ID: 631-04

|  | Temp (C) | Area (%) |
|---|---|---|
| Peak 1 | 47.3 | 9.7 |
| Peak 2 | 63.8 | 2.9 |
| Peak 3 | 72.1 | 1.8 |
| Peak 4 | 80.1 | 12.7 |
| Soluble | < 30 | 72.7 |

Statistics
| Tn | 39.5 |
|---|---|
| Tw | 46.4 |
| r | 1.2 |
| R | 17.4 |
| RMS T | 19.9 |
| Median | 30.0 |
| SDBI | 25.9 |

DSC Example 9

CRYSTAF Report
LIMS #: 70553.0
Reference: 200402166-28-14
Crystaf ID: 632-04

|        | Temp (C) | Area (%) |
|--------|----------|----------|
| Peak 1 | 39.6     | 2.2      |
| Peak 2 | 62.0     | 3.0      |
| Peak 3 | 72.2     | 2.0      |
| Peak 4 | 80.8     | 16.0     |
| Soluble| < 30     | 71.9     |

Statistics
Tn       39.4
Tw       47.3
r        1.2
R        20.1
RMS T    21.6
Median   30.6
SDBI     25.9

DSC Example 10

CRYSTAF Report
LIMS #: 73541.0
Reference: 04C25R01
Crystaf ID: 697-04

|        | Temp (C) | Area (%) |
|--------|----------|----------|
| Peak 1 | 40.9     | 52.4     |
| Peak 2 | 0.0      | 0.0      |
| Peak 3 | 0.0      | 0.0      |
| Peak 4 | 0.0      | 0.0      |
| Soluble| < 30     | 47.2     |

| Statistics | |
|------------|------|
| Tn    | 38.0 |
| Tw    | 39.9 |
| r     | 1.0  |
| R     | 4.9  |
| RMS T | 8.9  |
| Median| 34.9 |
| SDBI  | 20.5 |

DSC Example 11

CRYSTAF Report
LIMS #: 73542.0
Reference: 04C25R02
Crystaf ID: 698-04

|  | Temp (C) | Area (%) |
|---|---|---|
| Peak 1 | 39.6 | 25.2 |
| Peak 2 | 0.0 | 0.0 |
| Peak 3 | 0.0 | 0.0 |
| Peak 4 | 0.0 | 0.0 |
| Soluble | < 30 | 74.0 |

| Statistics | |
|---|---|
| Tn | 34.3 |
| Tw | 36.2 |
| r | 1.1 |
| R | 5.6 |
| RMS T | 9.6 |
| Median | 30.0 |
| SDBI | 22.3 |

DSC Example 12

CRYSTAF Report
LIMS #: 73543.0
Reference: 04C25R03
Crystaf ID: 699-04

|  | Temp (C) | Area (%) |
|---|---|---|
| Peak 1 | 33.6 | 2.2 |
| Peak 2 | 36.7 | 1.7 |
| Peak 3 | 41.1 | 2.2 |
| Peak 4 | 48.1 | 1.0 |
| Soluble | < 30 | 91.0 |

| Statistics | |
|---|---|
| Tn | 31.2 |
| Tw | 31.8 |
| r | 1.0 |
| R | 1.8 |
| RMS T | 5.2 |
| Median | 30.0 |
| SDBI | 26.4 |

DSC Example 13

CRYSTAF Report
LIMS #: 73698.0
Reference: 04C25R04 20040216
Crystaf ID: 718-04

|       | Temp (C) | Area (%) |
|-------|----------|----------|
| Peak 1 | 33.8 | 7.7 |
| Peak 2 | 46.2 | 1.4 |
| Peak 3 | 51.7 | 0.5 |
| Peak 4 | 62.2 | 0.5 |
| Soluble | <30 | 88.9 |

Statistics
| | |
|---|---|
| Tn | 31.4 |
| Tw | 31.9 |
| r | 1.0 |
| R | 1.7 |
| RMS T | 4.6 |
| Median | 30.0 |
| SDBI | 23.6 |

DSC Example 14

CRYSTAF Report
LIMS #: 73699.0
Reference: 04C25R05 20040216
Crystaf ID: 715-04

|        | Temp (C) | Area (%) |
|--------|----------|----------|
| Peak 1 | 72.9     | 92.2     |
| Peak 2 | 83.0     | 0.1      |
| Peak 3 | 0.0      | 0.0      |
| Peak 4 | 0.0      | 0.0      |
| Soluble| < 30     | 9.6      |

| Statistics |      |
|------------|------|
| Tn         | 68.1 |
| Tw         | 70.5 |
| r          | 1.0  |
| R          | 3.6  |
| RMS T      | 9.0  |
| Median     | 72.1 |
| SDBI       | 20.0 |

DSC Example 15

CRYSTAF Report
LIMS #: 74111.0
Reference: 104C25R06 20040216
Crystaf ID: 719-04

|  | Temp (C) | Area (%) |
|---|---|---|
| Peak 1 | 30.0 | 0.9 |
| Peak 2 | 32.3 | 9.8 |
| Peak 3 | 41.4 | 9.6 |
| Peak 4 | 69.1 | 0.5 |
| Soluble | < 30 | 79.2 |

| Statistics | |
|---|---|
| Tn | 32.9 |
| Tw | 34.0 |
| r | 1.0 |
| R | 3.6 |
| RMS T | 7.2 |
| Median | 30.0 |
| SDBI | 23.2 |

DSC Example 16

CRYSTAF Report
LIMS #: 74112.0
Reference: 200402166-39 04C25
Crystaf ID: 725-04

|  | Temp (C) | Area (%) |
|---|---|---|
| Peak 1 | 48.0 | 65.0 |
| Peak 2 | 0.0 | 0.0 |
| Peak 3 | 0.0 | 0.0 |
| Peak 4 | 0.0 | 0.0 |
| Soluble | < 30 | 33.4 |

Statistics
| Tn | 42.0 |
|---|---|
| Tw | 44.7 |
| r | 1.1 |
| R | 6.4 |
| RMS T | 10.8 |
| Median | 42.0 |
| SDBI | 19.9 |

DSC Example 17

CRYSTAF Report
LIMS #: 74115.0
Reference: 200402166-39 04C25
Crystaf ID: 726-04

| | Temp (C) | Area (%) |
|---|---|---|
| Peak | 43.1 | 56.8 |
| Peak 2 | 0.0 | 0.0 |
| Peak 3 | 0.0 | 0.0 |
| Peak 4 | 0.0 | 0.0 |
| Soluble | < 30 | 42.3 |

Statistics
| | |
|---|---|
| Tn | 39.5 |
| Tw | 42.0 |
| r | 1.1 |
| R | 6.3 |
| RMS T | 10.7 |
| Median | 36.7 |
| SDBI | 20.6 |

DSC Example 18

CRYSTAF Report
LIMS #: 74113.0
Reference: 04C25R08 20040216
Crystaf ID: 716-04

|  | Temp (C) | Area (%) |
|---|---|---|
| Peak 1 | 70.0 | 94.0 |
| Peak 2 | 0.0 | 0.0 |
| Peak 3 | 0.0 | 0.0 |
| Peak 4 | 0.0 | 0.0 |
| Soluble | < 30 | 5.9 |

Statistics
| Tn | 66.9 |
|---|---|
| Tw | 68.2 |
| r | 1.0 |
| R | 1.8 |
| RMS T | 7.1 |
| Median | 68.9 |
| SDBI | 17.7 |

DSC Example 19

CRYSTAF Report
LIMS #: 74114.0
Reference: 04C25R09 20040216
Crystaf ID: 717-04

|  | Temp (C) | Area (%) |
|---|---|---|
| Peak 1 | 55.0 | 2.0 |
| Peak 2 | 61.9 | 2.7 |
| Peak 3 | 74.8 | 1.7 |
| Peak 4 | 79.9 | 87.9 |
| Soluble | < 30 | 2.1 |

Statistics
| Tn | 76.7 |
|---|---|
| Tw | 77.8 |
| r | 1.0 |
| R | 1.5 |
| RMS T | 7.3 |
| Median | 79.6 |
| SDBI | 18.9 |

DSC Comparative A*

CRYSTAF Report
LIMS #: 77388.0
Reference: 102253-A6
Crystaf ID: 38508.0

| Temp (C) | Area (%) |
|---|---|
| Peak 1 | 30.0 | 2.3 |
| Peak 2 | 34.8 | 7.3 |
| Peak 3 | 37.5 | 4.2 |
| Peak 4 | 48.5 | 29.4 |
| Soluble | < 30 | 54.1 |

| Statistics | |
|---|---|
| Tn | 35.9 |
| Tw | 36.4 |
| r | 1.0 |
| R | 1.4 |
| RMS T | 6.4 |
| Median | 30.0 |
| SDBI | 36.9 |

DSC Comparative B*

CRYSTAF Report
LIMS #: 77389.0
Reference: 102286-A1
Crystaf ID: 38538.0

| Temp (C) | Area (%) |
|---|---|---|
| Peak 1 | 77.6 | 8.7 |
| Peak 2 | 82.4 | 83.7 |
| Peak 3 | 0.0 | 0.0 |
| Peak 4 | 0.0 | 0.0 |
| Soluble | < 30 | 1.6 |

| Statistics | |
|---|---|
| Tn | 77.5 |
| Tw | 79.4 |
| r | 1.0 |
| R | 2.5 |
| RMS T | 9.0 |
| Median | 81.8 |
| SDBI | 18.5 |

DSC Comparative C*

CRYSTAF Report
LIMS #: 77390.0
Reference: 102285-E1
Crystaf ID: 38569.0

|  | Temp (C) | Area (%) |
|---|---|---|
| Peak 1 | 31.6 | 0.7 |
| Peak 2 | 38.7 | 2.3 |
| Peak 3 | 52.4 | 55.5 |
| Peak 4 | 81.8 | 34.7 |
| Soluble | < 30 | 6.6 |

| Statistics | |
|---|---|
| Tn | 58.0 |
| Tw | 61.9 |
| r | 1.1 |
| R | 6.7 |
| RMS T | 14.9 |
| Median | 56.5 |
| SDBI | 18.1 |

DSC Comparative D*

CRYSTAF Report
LIMS #: 69534.0
Reference: 200402166-28-2
Crystaf ID: 578-04

|  | Temp (C) | Area (%) |
|---|---|---|
| Peak 1 | 0.0 | 0.0 |
| Peak 2 | 0.0 | 0.0 |
| Peak 3 | 0.0 | 0.0 |
| Peak 4 | 0.0 | 0.0 |
| Soluble | < 30 | 99.0 |

| Statistics | |
|---|---|
| Tn | 30.3 |
| Tw | 30.4 |
| r | 1.0 |
| R | 0.3 |
| RMS T | 1.4 |
| Median | 30.0 |
| SDBI | 26.7 |

DSC Comparative E*

CRYSTAF Report
LIMS #: 69535.0
Reference: 200402166-28-3
Crystaf ID: 577-04

|        | Temp (C) | Area (%) |
|--------|----------|----------|
| Peak 1 | 79.3     | 94.6     |
| Peak 2 | 0.0      | 0.0      |
| Peak 3 | 0.0      | 0.0      |
| Peak 4 | 0.0      | 0.0      |
| Soluble| < 30     | 3.0      |

Statistics
| Tn    | 78.7 |
| Tw    | 79.0 |
| r     | 1.0  |
| R     | 0.4  |
| RMS T | 3.4  |
| Median| 79.4 |
| SDBI  | 20.7 |

DSC Comparative F*

CRYSTAF Report
LIMS #:    70870.0
Reference: 04C22R14
Crystaf ID: 675-04

|        | Temp (C) | Area (%) |
|--------|----------|----------|
| Peak 1 | 60.4     | 2.6      |
| Peak 2 | 65.3     | 2.7      |
| Peak 3 | 71.6     | 3.6      |
| Peak 4 | 77.6     | 19.5     |
| Soluble| < 30     | 68.9     |

Statistics
Tn        41.0
Tw        49.3
r          1.2
R         20.2
RMS T     21.4
Median    30.0
SDBI      24.2

High Resolution Scanning Microscopy

Random E/O Copolymer

High CSA

Low CSA

Medium CSA

DSC Example 24

CRYSTAF Report
LIMS #: 80053
Reference: 200402602-46-9
Crystaf ID: 134-05

|  | Temp.(C) | Area (%) |
|---|---|---|
| Peak 1 | 42.6 | 48.4 |
| Peak 2 | 0.0 | 0.0 |
| Peak 3 | 0.0 | 0.0 |
| Peak 4 | 0.0 | 0.0 |
| Soluble | < 30 | 48.5 |

| Statistics | |
|---|---|
| Tn | 38.1 |
| Tw | 40.2 |
| r | 1.1 |
| R | 5.7 |
| RMS T | 9.9 |
| Median | 32.3 |
| SDBI | 20.3 |

DSC Example 25

CRYSTAF Report
LIMS #: 80148-1
Reference: 200402602-47-1
Crystaf ID: 79-05

|        | Temp (C) | Area (%) |
|--------|----------|----------|
| Peak 1 | 41.0     | 24.2     |
| Peak 2 | 57.2     | 3.3      |
| Peak 3 | 67.1     | 1.3      |
| Peak 4 | 73.0     | 0.3      |
| Soluble| < 30     | 70.8     |

Statistics
Tn     35.1
Tw     37.4
r      1.1
R      6.4
RMS T  10.5
Median 30.0
SDBI   19.5

DSC Example 26

CRYSTAF Report
LIMS #: 80541
Reference: 200402602-47-3
Crystaf ID: 84-05

|        | Temp (C) | Area (%) |
|--------|----------|----------|
| Peak 1 | 34.8     | 5.1      |
| Peak 2 | 40.2     | 6.1      |
| Peak 3 | 43.8     | 7.4      |
| Peak 4 | 53.4     | 2.7      |
| Soluble| < 30     | 68.6     |

Statistics
| Tn     | 35.8 |
| Tw     | 38.9 |
| r      | 1.1  |
| R      | 8.5  |
| RMS T  | 12.8 |
| Median | 30.8 |
| SDBI   | 21.9 |

DSC Example 27

CRYSTAF Report
LIMS #:  80542
Reference: 200402602-47-4
Crystaf ID: 85-05

|       | Temp (C) | Area (%) |
|-------|----------|----------|
| Peak 1 | 33.5    | 3.0      |
| Peak 2 | 38.6    | 6.1      |
| Peak 3 | 45.9    | 7.6      |
| Peak 4 | 74.4    | 3.9      |
| Soluble | <30    | 68.9     |

Statistics
Tn    36.0
Tw    39.5
r     1.1
R     9.7
RMS T 13.9
Median 30.0
SDBI  22.9

DSC Example 28

CRYSTAF Report
LIMS #: 81959
Reference: 200402602-50-6
Crystaf ID: 140-05

|        | Temp (C) | Area (%) |
|--------|----------|----------|
| Peak 1 | 74.4     | 96.6     |
| Peak 2 | 0.0      | 0.0      |
| Peak 3 | 0.0      | 0.0      |
| Peak 4 | 0.0      | 0.0      |
| Soluble| < 30     | 0.4      |

Statistics
| Tn    | 72.0 |
|-------|------|
| Tw    | 72.7 |
| r     | 1.0  |
| R     | 1.0  |
| RMS T | 5.8  |
| Median| 73.8 |
| SDBI  | 13.1 |

DSC Example 29

CRYSTAF Report
LIMS #: 78640
Reference Lib: 103875 B6
Crystaf ID: 143-05

|  | Temp (C) | Area (%) |
|---|---|---|
| Peak 1 | 35.6 | 11.4 |
| Peak 2 | 50.5 | 20.0 |
| Peak 3 | 61.0 | 17.8 |
| Peak 4 | 76.6 | 2.0 |
| Soluble | < 30 | 47.4 |

| Statistics | |
|---|---|
| Tn | 40.7 |
| Tw | 45.0 |
| r | 1.1 |
| R | 10.5 |
| RMS T | 14.6 |
| Median | 32.3 |
| SDBI | 20.8 |

DSC Example 30

CRYSTAF Report
LIMS #:  78644
Reference Lib: 103975 C6
Crystaf ID: 145-05

|         | Temp (C) | Area (%) |
|---------|----------|----------|
| Peak 1  | 34.4     | 2.8      |
| Peak 2  | 50.6     | 25.4     |
| Peak 3  | 59.2     | 6.2      |
| Peak 4  | 66.1     | 16.6     |
| Soluble | < 30     | 43.3     |

| Statistics |      |
|------------|------|
| Tn         | 42.8 |
| Tw         | 47.6 |
| r          | 1.1  |
| R          | 11.2 |
| RMS T      | 15.2 |
| Median     | 37.9 |
| SDBI       | 22.0 |

DSC Example 31

CRYSTAF Report
LIMS #: 78648
Reference Lib: 103975
Crystaf ID: 147-05

|  | Temp (C) | Area (%) |
|---|---|---|
| Peak 1 | 52.3 | 95.1 |
| Peak 2 | 0.0 | 0.0 |
| Peak 3 | 0.0 | 0.0 |
| Peak 4 | 0.0 | 0.0 |
| Soluble | < 30 | 4.7 |

| Statistics | |
|---|---|
| Tn | 50.9 |
| Tw | 53.0 |
| r | 1.0 |
| R | 4.1 |
| RMS T | 9.8 |
| Median | 53.2 |
| SDBI | 18.8 |

DSC Example 32

CRYSTAF Report
LIMS #: 78651
Reference: Lib 103975 E6
Crystaf ID: 148-05

|  | Temp (C) | Area (%) |
|---|---|---|
| Peak 1 | 37.7 | 2.2 |
| Peak 2 | 64.1 | 95.2 |
| Peak 3 | 0.0 | 0.0 |
| Peak 4 | 0.0 | 0.0 |
| Soluble | < 30 | 2.3 |

| Statistics | |
|---|---|
| Tn | 60.8 |
| Tw | 62.3 |
| r | 1.0 |
| R | 2.5 |
| RMS T | 8.4 |
| Median | 63.2 |
| SDBI | 14.6 |

DSC Example 33

CRYSTAF Report
LIMS #: 78659
Reference: Lib 103975 G6
Crystaf ID: 152-05

|  | Temp (C) | Area (%) |
|---|---|---|
| Peak 1 | 64.1 | 95.7 |
| Peak 2 | 0.0 | 0.0 |
| Peak 3 | 0.0 | 0.0 |
| Peak 4 | 0.0 | 0.0 |
| Soluble | < 30 | 3.2 |

| Statistics | |
|---|---|
| Tn | 57.9 |
| Tw | 59.9 |
| r | 1.0 |
| R | 3.4 |
| RMS T | 9.4 |
| Median | 61.5 |
| SDBI | 16.9 |

DSC Comparative M*

CRYSTAF Report
LIMS #: 78637
Reference: Lib 103875 B1
Crystaf ID: 142-05

| | Temp (C) | Area (%) |
|---|---|---|
| Peak 1 | 30.0 | 9.5 |
| Peak 2 | 48.5 | 0.9 |
| Peak 3 | 53.9 | 0.6 |
| Peak 4 | 78.9 | 36.1 |
| Soluble | < 30 | 51.8 |

| Statistics | |
|---|---|
| Tn | 44.7 |
| Tw | 54.5 |
| r | 1.2 |
| R | 21.9 |
| RMS T | 22.9 |
| Median | 30.0 |
| SDBI | 25.2 |

DSC Comparative N*

CRYSTAF Report
LIMS #:    78641
Reference: Lib 103875 C1
Crystaf ID: 144-05

|  | Temp (C) | Area (%) |
|---|---|---|
| Peak 1 | 30.0 | 69.7 |
| Peak 2 | 53.2 | 5.9 |
| Peak 3 | 79.7 | 24.4 |
| Peak 4 | 0.0 | 0.0 |
| Soluble | < 30 | 0.0 |

Statistics
| Tn | 41.0 |
|---|---|
| Tw | 42.4 |
| r | 1.0 |
| R | 3.4 |
| RMS T | 11.0 |
| Median | 41.0 |
| SDBI | 22.4 |

DSC Comparative 0*

CRYSTAF Report
LIMS #: 78645
Reference: 103975 D1
Crystaf ID: 146-05

| | Temp (C) | Area (%) |
|---|---|---|
| Peak 1 | 30.0 | 48.1 |
| Peak 2 | 65.5 | 1.0 |
| Peak 3 | 81.1 | 40.4 |
| Peak 4 | 85.9 | 0.7 |
| Soluble | < 30 | 9.7 |

Statistics
| Tn | 50.8 |
|---|---|
| Tw | 58.1 |
| r | 1.1 |
| R | 14.3 |
| RMS T | 20.1 |
| Median | 51.7 |
| SDBI | 22.3 |

DSC Comparative P*

CRYSTAF Report
LIMS #: 78657
Reference: 103975 G4
Crystaf ID: 151-05

|  | Temp (C) | Area (%) |
|---|---|---|
| Peak 1 |  |  |
| Peak 2 |  |  |
| Peak 3 |  |  |
| Peak 4 | 82.8 | 33.3 |
| Soluble | < 30 |  |

| Statistics | |
|---|---|
| Tn | 54.8 |
| Tw | 58.1 |
| r | 1.1 |
| R | 6.0 |
| RMS T | 15.8 |
| Median | 57.3 |
| SDBI | 24.6 |

Delta DSC-CRYSTAF Relationship with DSC Melt Enthalpy

- ◆ Random Ethylene Octene
- × Comparative copolymer examples with MMAO
- ○ Inventive copolymer examples

CATALYST COMPOSITION COMPRISING SHUTTLING AGENT FOR ETHYLENE MULTI-BLOCK COPOLYMER FORMATION

CROSS REFERENCE STATEMENT

This application is a continuation of U.S. Ser. No. 10/589,377, filed Aug. 14, 2006, which is the national stage entry of PCT/US05/08917, filed Mar. 17, 2005 which claims priority to U.S. Provisional Application No. 60/553,906, filed Mar. 17, 2004. For purposes of United States patent practice, the contents of this provisional application are herein incorporated by reference.

BACKGROUND OF THE INVENTION

The present invention relates to compositions for polymerizing one or more monomers or mixtures of monomers such as ethylene and one or more comonomers, to form an interpolymer product having unique physical properties, to a process for preparing such interpolymers, and to the resulting polymer products. In another aspect, the invention relates to methods of using these polymers in applications requiring unique combinations of physical properties. In still another aspect, the invention relates to the articles prepared from these polymers. The inventive polymers comprise two or more differing regions or segments (blocks) causing the polymer to possess unique physical properties. These multi-block copolymers and polymeric blends comprising the same are usefully employed in the preparation of solid articles such as moldings, films, sheets, and foamed objects by molding, extruding, or other processes, and are useful as components or ingredients in adhesives, laminates, polymeric blends, and other end uses. The resulting products are used in the manufacture of components for automobiles, such as profiles, bumpers and trim parts; packaging materials; electric cable insulation, and other applications.

It has long been known that polymers containing a block-type structure often have superior properties compared to random copolymers and blends. For example, triblock copolymers of styrene and butadiene (SBS) and hydrogenated versions of the same (SEBS) have an excellent combination of heat resistance and elasticity. Other block copolymers are also known in the art. Generally, block copolymers known as thermoplastic elastomers (TPE) have desirable properties due to the presence of "soft" or elastomeric block segments connecting "hard" either crystallizable or glassy blocks in the same polymer. At temperatures up to the melt temperature or glass transition temperature of the hard segments, the polymers demonstrate elastomeric character. At higher temperatures, the polymers become flowable, exhibiting thermoplastic behavior. Known methods of preparing block copolymers include anionic polymerization and controlled free radical polymerization. Unfortunately, these methods of preparing block copolymers require sequential monomer addition and batch processing and the types of monomers that can be usefully employed in such methods are relatively limited. For example, in the anionic polymerization of styrene and butadiene to form a SBS type block copolymer, each polymer chain requires a stoichiometric amount of initiator and the resulting polymers have extremely narrow molecular weight distribution, Mw/Mn, preferably from 1.0 to 1.3. Additionally, anionic and free-radical processes are relatively slow, resulting in poor process economics.

It would be desirable to produce block copolymers catalytically, that is, in a process wherein more than one polymer molecule is produced for each catalyst or initiator molecule. In addition, it would be highly desirable to produce block copolymers from olefin monomers such as ethylene, propylene, and higher alpha-olefins that are generally unsuited for use in anionic or free-radical polymerizations. In certain of these polymers, it is highly desirable that some or all of the polymer blocks comprise amorphous polymers such as a copolymer of ethylene and a comonomer, especially amorphous random copolymers comprising ethylene and an α-olefin having 3, and especially 4, or more carbon atoms. Finally, if would be highly desirable to be able to use a continuous process for production of block copolymers.

Previous researchers have stated that certain homogeneous coordination polymerization catalysts can be used to prepare polymers having a substantially "block-like" structure by suppressing chain-transfer during the polymerization, for example, by conducting the polymerization process in the absence of a chain transfer agent and at a sufficiently low temperature such that chain transfer by β-hydride elimination or other chain transfer processes is essentially eliminated. Under such conditions, the sequential addition of different monomers was said to result in formation of polymers having sequences or segments of different monomer content. Several examples of such catalyst compositions and processes are reviewed by Coates, Hustad, and Reinartz in *Angew. Chem., Int. Ed.*, 41, 2236-2257 (2002) as well as US-A-2003/0114623.

Disadvantageously, such processes require sequential monomer addition and result in the production of only one polymer chain per active catalyst center, which limits catalyst productivity. In addition, the requirement of relatively low process temperatures increases the process operating costs, making such processes unsuited for commercial implementation. Moreover, the catalyst cannot be optimized for formation of each respective polymer type, and therefore the entire process results in production of polymer blocks or segments of less than maximal efficiency and/or quality. For example, formation of a certain quantity of prematurely terminated polymer is generally unavoidable, resulting in the forming of blends having inferior polymer properties. Accordingly, under normal operating conditions, for sequentially prepared block copolymers having Mw/Mn of 1.5 or greater, the resulting distribution of block lengths is relatively inhomogeneous, not a most probable distribution. Finally, sequentially prepared block copolymers must be prepared in a batch process, limiting rates and increasing costs with respect to polymerization reactions carried out in a continuous process.

For these reasons, it would be highly desirable to provide a process for producing olefin copolymers in well defined blocks or segments in a process using coordination polymerization catalysts capable of operation at high catalytic efficiencies. In addition, it would be desirable to provide a process and resulting block or segmented copolymers wherein insertion of terminal blocks or sequencing of blocks within the polymer can be influenced by appropriate selection of process conditions. Finally, it would be desirable to provide a continuous process for producing multi-block copolymers.

The use of certain metal alkyl compounds and other compounds, such as hydrogen, as chain transfer agents to interrupt chain growth in olefin polymerizations is well known in the art. In addition, it is known to employ such compounds, especially aluminum alkyl compounds, as scavengers or as cocatalysts in olefin polymerizations. In *Macromolecules*, 33, 9192-9199 (2000) the use of certain aluminum trialkyl compounds as chain transfer agents in combination with certain paired zirconocene catalyst compositions resulted in polypropylene mixtures containing small quantities of polymer fractions containing both isotactic and atactic chain segments. In Liu and Rytter, *Macromolecular Rapid Comm.*, 22, 952-956 (2001) and Bruaseth and Rytter, *Macromolecules*, 36, 3026-3034 (2003) mixtures of ethylene and 1-hexene were polymerized by a similar catalyst composition containing trimethylaluminum chain transfer agent. In the latter reference, the authors summarized the prior art studies in the following manner (some citations omitted):

"Mixing of two metallocenes with known polymerization behavior can be used to control polymer microstructure. Several studies have been performed of ethene polymerization by mixing two metallocenes. Common observations were that, by combining catalysts which separately give polyethene with different Mw, polyethene with broader and in some cases bimodal MWD can be obtained. [S]oares and Kim (*J. Polym. Sci., Part A: Polym. Chem.*, 38, 1408-1432 (2000)) developed a criterion in order to test the MWD bimodality of polymers made by dual single-site catalysts, as exemplified by ethene/1-hexene copolymerization of the mixtures $Et(Ind)_2ZrCl_2/Cp_2HfCl_2$ and $Et(Ind)_2ZrCl_2$/CGC (constrained geometry catalyst) supported on silica. Heiland and Kaminsky (*Makromol. Chem.*, 193, 601-610 (1992)) studied a mixture of $Et-(Ind)_2ZrCl_2$ and the hafnium analogue in copolymerization of ethene and 1-butene.

These studies do not contain any indication of interaction between the two different sites, for example, by readsorption of a terminated chain at the alternative site. Such reports have been issued, however, for polymerization of propene. Chien et al. (*J. Polym. Sci., Part A: Polym. Chem.*, 37, 2439-2445 (1999), *Makromol.*, 30, 3447-3458 (1997)) studied propene polymerization by homogeneous binary zirconocene catalysts. A blend of isotactic polypropylene (i-PP), atactic polypropylene (a-PP), and a stereoblock fraction (1-PP-b-a-PP) was obtained with a binary system comprising an isospecific and an aspecific precursor with a borate and TIBA as cocatalyst. By using a binary mixture of isospecific and syndiospecific zirconocenes, a blend of isotactic polypropylene (i-PP), syndiotactic polypropylene (s-PP), and a stereoblock fraction (1-PP-b-s-PP) was obtained. The mechanism for formation of the stereoblock fraction was proposed to involve the exchange of propagating chains between the two different catalytic sites. Przybyla and Fink (*Acta Polym.*, 50, 77-83 (1999)) used two different types of metallocenes (isospecific and syndiospecific) supported on the same silica for propene polymerization. They reported that, with a certain type of silica support, chain transfer between the active species in the catalyst system occurred, and stereoblock PP was obtained. Lieber and Brintzinger (*Macromol.* 3, 9192-9199 (2000)) have proposed a more detailed explanation of how the transfer of a growing polymer chain from one type of metallocene to another occurs. They studied propene polymerization by catalyst mixtures of two different ansa-zirconocenes. The different catalysts were first studied individually with regard to their tendency toward alkyl-polymeryl exchange with the alkylaluminum activator and then pairwise with respect to their capability to produce polymers with a stereoblock structure. They reported that formation of stereoblock polymers by a mixture of zirconocene catalysts with different stereoselectivities is contingent upon an efficient polymeryl exchange between the Zr catalyst centers and the Al centers of the cocatalyst."

Brusath and Rytter then disclosed their own observations using paired zirconocene catalysts to polymerize mixtures of ethylene/1-hexene and reported the effects of the influence of the dual site catalyst on polymerization activity, incorporation of comonomer, and polymer microstructure using methylalumoxane cocatalyst.

Analysis of the foregoing results indicate that Rytter and coworkers likely failed to utilize combinations of catalyst, cocatalyst, and third components that were capable of readsorption of the polymer chain from the chain transfer agent onto both of the active catalytic sites, i.e., two-way readsorption. While indicating that chain termination due to the presence of trimethylaluminum likely occurred with respect to polymer formed from the catalyst incorporating minimal comonomer, and thereafter that polymeryl exchange with the more open catalytic site followed by continued polymerization likely occurred, evidence of the reverse flow of polymer ligands appeared to be lacking in the reference. In fact, in a later communication, Rytter, et. al., *Polymer*, 45, 7853-7861 (2004), it was reported that no chain transfer between the catalyst sites actually took place in the earlier experiments. Similar polymerizations were reported in WO98/34970.

In U.S. Pat. Nos. 6,380,341 and 6,169,151, use of a "fluxional" metallocene catalyst, that is a metallocene capable of relatively facile conversion between two stereoisomeric forms having differing polymerization characteristics such as differing reactivity ratios was said to result in production of olefin copolymers having a "blocky" structure. Disadvantageously, the respective stereoisomers of such metallocenes generally fail to possess significant difference in polymer formation properties and are incapable of forming both highly crystalline and amorphous block copolymer segments, for example, from a given monomer mixture under fixed reaction conditions. Moreover, because the relative ratio of the two "fluxional" forms of the catalyst cannot be varied, there is no ability, using "fluxional" catalysts, to vary polymer block composition or the ratio of the respective blocks. Finally, prior art methods for olefin block copolymerization have been incapable of readily controlling the sequencing of the various polymer blocks, and in particular controlling the nature of the terminating block or segment of a multi-block copolymer. For certain applications, it is desirable to produce polymers having terminal blocks that are highly crystalline, that are functionalized or more readily functionalized, or that possess other distinguishing properties. For example, it is believed that polymers wherein the terminal segments or blocks are crystalline or glassy possess improved abrasion resistance and thermal properties such as tensile strength, elastic recovery and compression set. In addition, polymers wherein the blocks having amorphous properties are internal or primarily connected between crystalline or glassy blocks, have improved elastomeric properties, such as improved retractive force and recovery, particularly at elevated temperatures.

In *JAGS*, 2004, 126, 10701-10712, Gibson, et al discuss the effects of "catalyzed living polymerization" on molecular weight distribution. The authors define catalyzed living polymerization in this manner:

" . . . if chain transfer to aluminum constitutes the sole transfer mechanism and the exchange of the growing polymer chain between the transition metal and the aluminum centers is very fast and reversible, the polymer chains will appear to be growing on the aluminum centers. This can then reasonably be described as a catalyzed chain growth reaction on aluminum . . . . An attractive manifestation of this type of chain growth reaction is a Poisson distribution of product molecular weights, as opposed to the Schulz-Flory distribution that arises when β-H transfer accompanies propagation."

The authors reported the results for the catalyzed living homopolymerization of ethylene using an iron containing catalyst in combination with $ZnEt_2$, $ZnMe_2$, or $Zn(i-Pr)_2$. Homoleptic alkyls of aluminum, boron, tin, lithium, magnesium and lead did not induce catalyzed chain growth. Using $GaMe_3$ as cocatalyst resulted in production of a polymer having a narrow molecular weight distribution. However, after analysis of time-dependent product distribution, the authors concluded this reaction was, "not a simple catalyzed chain growth reaction." The reference fails to disclose the use of two or more catalysts in combination with a chain shuttling agent to make multi-block copolymers. Similar processes employing single catalysts have been described in U.S. Pat. Nos. 5,210,338, 5,276,220, and 6,444,867.

Earlier workers have claimed to have formed block copolymers using a single Ziegler-Natta type catalyst in multiple reactors arranged in series, see for example U.S. Pat. Nos. 3,970,719 and 4,039,632. Additional Ziegler-Natta based processes and polymers are disclosed in U.S. Pat. Nos. 4,971,936; 5,089,573; 5,118,767; 5,118,768; 5,134,209; 5,229,477; 5,270,276; 5,270,410; 5,294,581; 5,543,458; 5,550,194; and 5,693,713, as well as in EP-A-470,171 and EP-A-500,530.

Despite the advances by the foregoing researchers, there remains a need in the art for a polymerization process that is capable of preparing block like copolymers, especially multi-block copolymers, and most especially linear multi-block copolymers, in high yield and selectivity. Moreover, it would be desirable if there were provided an improved process for preparing multi-block copolymers, especially linear multi-block copolymers, of two or more olefin monomers such as ethylene and one or more comonomers, by the use of a shuttling agent. In addition it would be desirable to provide such an improved process that is capable of preparing multi-block copolymers, especially linear multi-block copolymers, having a relatively narrow molecular weight distribution. It would further be desirable to provide an improved process for preparing copolymers having more than two segments or blocks. Furthermore, it would be desirable to provide a process for identifying combinations of catalysts and chain shuttling agents capable of making such multi-block copolymers. Even further, it would be desirable to provide a process for independent control of the order of the various polymer blocks, especially a process for preparing olefin block copolymers containing terminal blocks having high crystallinity and/or functionality. Finally, it would be desirable to provide an improved process for preparing any of the foregoing desirable polymer products in a continuous process, without required sequential addition of monomers. Highly desirably, such process allows for independent control of the quantity and/or identity of the shuttling agent(s) and/or catalysts used.

SUMMARY OF THE INVENTION

According to the present invention there are now provided a composition for use in the polymerization of an addition polymerizable monomer, preferably two or more addition polymerizable monomers, especially ethylene and at least one copolymerizable comonomer, to form a segmented copolymer (multi-block copolymer), said copolymer containing therein two or more, preferably three or more segments or blocks differing in one or more chemical or physical properties as further disclosed here in, the composition comprising the admixture or reaction product resulting from combining:

(A) a first olefin polymerization catalyst,
(B) a second olefin polymerization catalyst capable of preparing polymers differing in chemical or physical properties from the polymer prepared by catalyst (A) under equivalent polymerization conditions, and
(C) a chain shuttling agent; and preferably the admixture or reaction product resulting from combining:
(A) a first olefin polymerization catalyst having a high comonomer incorporation index,
(B) a second olefin polymerization catalyst having a comonomer incorporation index less than 95 percent, preferably less than 90 percent, more preferably less than 25 percent, and most preferably less than 10 percent of the comonomer incorporation index of catalyst (A), and
(C) a chain shuttling agent.

In another embodiment of the invention, there is provided a method for selecting an admixture of catalysts (A) and (B) and chain shuttling agent (C) capable of producing multi-block copolymers according to the invention, especially such copolymers comprising ethylene in polymerized form.

In a further embodiment of the present invention there is provided a process for preparing a segmented, copolymer, especially such copolymer comprising ethylene and optionally one or more addition polymerizable monomers other than ethylene, said process comprising contacting ethylene and optionally one or more addition polymerizable monomers other than ethylene under addition polymerization conditions with a composition comprising:

the admixture or reaction product resulting from combining:
(A) a first olefin polymerization catalyst having a high comonomer incorporation index,
(B) a second olefin polymerization catalyst having a comonomer incorporation index less than 90 percent, preferably less than 50 percent, most preferably less than 5 percent of the comonomer incorporation index of catalyst (A), and
(C) a chain shuttling agent.

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers according to the invention are formed in high efficiency.

In another embodiment of the invention there is provided a segmented copolymer (multi-block copolymer), especially such a copolymer comprising ethylene in polymerized form, said copolymer containing therein two or more, preferably three or more segments differing in comonomer content or density or other chemical or physical property. Highly preferably the copolymer possesses a molecular weight distribution, Mw/Mn, of less than 3.0, preferably less than 2.8. Most preferably, the polymers of the invention are ethylene multi-block copolymers.

In yet another embodiment of the invention, there are provided functionalized derivatives of the foregoing segmented or multi-block copolymers.

In a still further embodiment of the present invention, there is provided a polymer mixture comprising: (1) an organic or inorganic polymer, preferably a homopolymer of ethylene or of propylene and/or a copolymer of ethylene or propylene and a copolymerizable comonomer, and (2) a multi-block copolymer according to the present invention or prepared according to the process of the present invention. In a desirable embodiment component (1) is a matrix polymer comprising high density polyethylene or isotactic polypropylene and component (2) is an elastomeric multi-block copolymer. In a preferred embodiment, component (2) comprises occlusions of the matrix polymer formed during compounding of components (1) and (2).

DETAILED DESCRIPTION OF THE INVENTION

Figure 1:
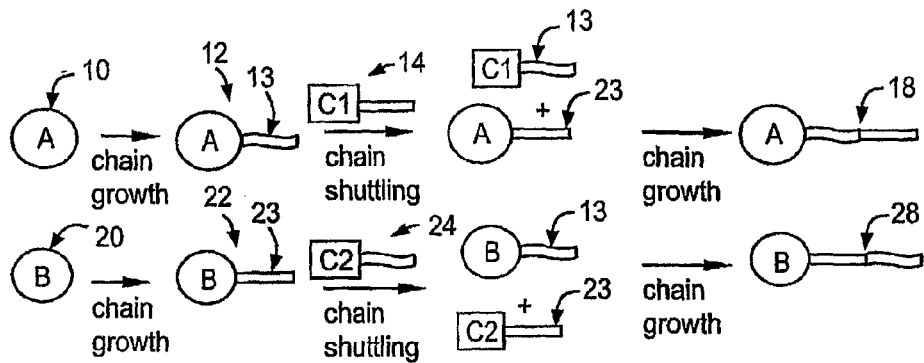
FIG. 1 is a schematic representation of the process of polymer chain shuttling involving two catalyst sites.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. Compared to block copolymers of the prior art, including copolymers produced by sequential monomer addition, fluxional catalysts, or anionic polymerization techniques, the copolymers of the invention are characterized by unique distributions of both polymer polydispersity (PDI or Mw/Mn), block length distribution, and/or block number distribution, due, in a preferred embodiment, to the effect of the shuttling agent(s) in combination with multiple catalysts. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers desirably possess PDI from 1.0 to 2.9, preferably from 1.3 to 2.5, more preferably from 1.4 to 2.0, and most preferably from 1.4 to 1.8.

The term "ethylene multi-block copolymer" means a multi-block copolymer comprising ethylene and one or more copolymerizable comonomers, wherein ethylene comprises a plurality of the polymerized monomer units of at least one block or segment in the polymer, preferably at least 90 mole percent, more preferably at least 95 mole percent, and most preferably at least 98 mole percent of said block. Based on total polymer weight, the ethylene multi-block copolymers of the present invention preferably have an ethylene content from 25 to 97 percent, more preferably from 40 to 96 percent, even more preferably from 55 to 95 percent, and most preferably from 65 to 85 percent.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether- or an alkane-solvent is less than 10 percent, preferably less than 7 percent, more preferably less than 5 percent and most preferably less than 2 percent of the total polymer weight.

In addition, the multi-block copolymers of the invention desirably possess a PDI fitting a Schutz-Flory distribution rather than a Poisson distribution. The use of the present polymerization process results in a product having both a polydisperse block distribution as well as a polydisperse distribution of block sizes. This ultimates in the formation of polymer products having improved and distinguishable physical properties. The theoretical benefits of a polydisperse block distribution have been previously modeled and discussed in Potemkin, *Physical Review E* (1998) 57(6), p. 6902-6912, and Dobrynin, *J. Chem. Phys.* (1997) 107(21), p 9234-9238.

In a further embodiment, the polymers of the invention, especially those made in a continuous, solution polymerization reactor, possess a most probable distribution of block lengths. Most preferred polymers according to the invention are multi-block copolymers containing 4 or more blocks or segments including terminal blocks.

The following mathematical treatment of the resulting polymers is based on theoretically derived parameters that are believed to apply to the present invented polymers and demonstrate that, especially in a steady-state, continuous, well-mixed reactor, the block lengths of the resulting polymer prepared using 2 or more catalysts will each conform to a most probable distribution, derived in the following manner, wherein $p_i$ is the probability of propagation with respect to block sequences from catalyst i. The theoretical treatment is based on standard assumptions and methods known in the art and used in predicting the effects of polymerization kinetics on molecular architecture, including the use of mass action reaction rate expressions that are not affected by chain or block lengths. Such methods have been previously disclosed in W. H. Ray, *J. Macromol. Sci., Rev. Macromol. Chem.*, C8, 1 (1972) and A. E. Hamielec and J. F. MacGregor, "Polymer Reaction Engineering", K. H. Reichert and W. Geisler, Eds., Hanser, Munich, 1983. In addition it is assumed that adjacent sequences formed by the same catalyst form a single block. For catalyst i, the fraction of sequences of length n is given by $X_i[n]$, where n is an integer from 1 to infinity representing the number of monomer units in the block.

$X_i[n]=(1-p_i)p_i^{(n-1)}$ most probable distribution of block lengths $$N_i = \frac{1}{1 - p_i}$$

number average block length

Each catalyst has a probability of propagation ($p_i$) and forms a polymer segment having a unique average block length and distribution. In a most preferred embodiment, the probability of propagation is defined as:

$$p_i = \frac{Rp[i]}{Rp[i] + Rt[i] + Rs[i] + [C_i]}$$

for each catalyst i={1, 2 . . . }, where,

Rp[i]=Rate of monomer consumption by catalyst i, (moles/L),

Rt[i]=Total rate of chain transfer and termination for catalyst i, (moles/L),

Rs[i]=Rate of chain shuttling with dormant polymer to other catalysts, (moles/L), and

[$C_i$]=Concentration of catalyst i (moles/L).

Dormant polymer chains refers to polymer chains that are attached to a CSA.

The overall monomer consumption or polymer propagation rate, Rp[i], is defined using an apparent rate constant, $\overline{k_{pi}}$, multiplied by a total monomer concentration, [M], as follows:

$Rp[i]=\theta\overline{k_{pi}}[M][C_i]$

The total chain transfer rate is given below including values for chain transfer to hydrogen ($H_2$), beta hydride elimination, and chain transfer to chain shuttling agent (CSA). The reactor residence time is given by $\theta$ and each subscripted k value is a rate constant.

$Rt[i]=\theta k_{H2i}[H_2][C_i]+\theta k_{\beta i}[C_i]+\theta k_{ai}[CSA][C_i]$ For a dual catalyst system, the rate of chain shuttling of polymer between catalysts 1 and 2 is given as follows:

$Rs[1]=Rs[2]=\theta k_{a1}[CSA]\theta k_{a2}[C_1][C_2]$.

If more than 2 catalysts are employed then added terms and complexity in the theoretical relation for Rs[i] result, but the ultimate conclusion that the resulting block length distributions are most probable is unaffected.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylselenogroup is within the scope of the term heteroalkyl. Examples of suitable heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing (4δ+2)π-electrons, wherein δ is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (e.g., $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

The term, "comonomer incorporation index", refers to the percent comonomer incorporated into a copolymer prepared under representative ethylene/comonomer polymerization conditions by the catalyst under consideration in the absence of other polymerization catalysts, ideally under steady-state, continuous solution polymerization conditions in a hydrocarbon diluent at 100° C., 4.5 MPa ethylene pressure (reactor pressure), greater than 92 (more preferably greater than 95) percent ethylene conversion, and greater than 0.01 percent comonomer conversion. The selection of metal complexes or catalyst compositions having the greatest difference in comonomer incorporation indices results in copolymers from two or more monomers having the largest difference in block or segment properties, such as density.

In certain circumstances the comonomer incorporation index may be determined directly, for example by the use of NMR spectroscopic techniques. Often, however, any difference in comonomer incorporation must be indirectly determined. For polymers formed from multiple monomers this may be accomplished by various techniques based on monomer reactivities.

For copolymers produced by a given catalyst, the relative amounts of comonomer and monomer in the copolymer and hence the copolymer composition is determined by relative rates of reaction of comonomer and monomer. Mathematically the molar ratio of comonomer to monomer is given by $$\frac{F_2}{F_1} = \left(\frac{[\text{comonomer}]}{[\text{monomer}]}\right)_{polymer} = \frac{R_{p2}}{R_{p1}} \qquad (1)$$

Here $R_{p2}$ and $R_{p1}$ are the rates of polymerization of comonomer and monomer respectively and $F_2$ and $F_1$ are the mole fractions of each in the copolymer. Because $F_1+F_2=1$ we can rearrange this equation to $$F_2 = \frac{R_{p2}}{R_{p1} + R_{p2}} \qquad (2)$$

The individual rates of polymerization of comonomer and monomer are typically complex functions of temperature, catalyst, and monomer/comonomer concentrations. In the limit as comonomer concentration in the reaction media drops to zero, $R_{p2}$ drops to zero, $F_2$ becomes zero and the polymer consists of pure monomer. In the limiting case of no monomer in the reactor $R_{p1}$ becomes zero and $F_2$ is one (provided the comonomer can polymerize alone).

For most homogeneous catalysts the ratio of comonomer to monomer in the reactor largely determines polymer composition as determined according to either the Terminal Copolymerization Model or the Penultimate Copolymerization Model.

For random copolymers in which the identity of the last monomer inserted dictates the rate at which subsequent monomers insert, the terminal copolymerization model is employed. In this model insertion reactions of the type

$$\ldots M_iC^* + M_j \xrightarrow{k_{ij}} \ldots M_iM_jC^* \qquad (3)$$

where C* represents the catalyst, $M_i$ monomer i, and $k_{ij}$ is the rate constant having the rate equation $$R_{p_{ij}} = k_{ij}[\ldots M_iC^*][M_j] \qquad (4)$$

The comonomer mole fraction (i=2) in the reaction media is defined by the equation:

$$f_2 = \frac{[M_2]}{[M_1] + [M_2]} \qquad (5)$$

A simplified equation for comonomer composition can be derived as disclosed in George Odian, *Principles of Polymerization*, Second Edition, John Wiley and Sons, 1970, as follows:

$$F_2 = \frac{r_1(1-f_2)^2 + (1-f_2)f_2}{r_1(1-f_2)^2 + 2(1-f_2)f_2 + r_2 f_2^2}. \quad (6)$$

From this equation the mole fraction of comonomer in the polymer is solely dependent on the mole fraction of comonomer in the reaction media and two temperature dependent reactivity ratios defined in terms of the insertion rate constants as:

$$r_1 = \frac{k_{11}}{k_{12}} \quad r_2 = \frac{k_{22}}{k_{21}}. \quad (7)$$

Alternatively, in the penultimate copolymerization model, the identities of the last two monomers inserted in the growing polymer chain dictate the rate of subsequent monomer insertion. The polymerization reactions are of the form

$$\ldots M_i M_j C^* + M_k \xrightarrow{k_{ijk}} \ldots M_i M_j M_k C^* \quad (8)$$

and the individual rate equations are:

$$R_{p_{ijk}} = k_{ijk}[\ldots M_i M_j = C^*][M_k] \quad (9).$$

The comonomer content can be calculated (again as disclosed in George Odian, Supra.) as:

$$\frac{(1-F_2)}{F_2} = \frac{1 + \frac{r_1' X(r_1 X + 1)}{(r_1' X + 1)}}{1 + \frac{r_2'(r_2 + X)}{X(r_2' + X)}} \quad (10)$$

where X is defined as:

$$X = \frac{(1-f_2)}{f_2} \quad (11)$$

and the reactivity ratios are defined as:

$$r_1 = \frac{k_{111}}{k_{112}} \quad r_1' = \frac{k_{211}}{k_{212}} \quad (12)$$

$$r_2 = \frac{k_{222}}{k_{221}} \quad r_2' = \frac{k_{122}}{k_{121}}.$$

For this model as well the polymer composition is a function only of temperature dependent reactivity ratios and comonomer mole fraction in the reactor. The same is also true when reverse comonomer or monomer insertion may occur or in the case of the interpolymerization of more than two monomers.

Reactivity ratios for use in the foregoing models may be predicted using well known theoretical techniques or empirically derived from actual polymerization data. Suitable theoretical techniques are disclosed, for example, in B. G. Kyle, *Chemical and Process Thermodynamics*, Third Addition, Prentice-Hall, 1999 and in Redlich-Kwong-Soave (RKS) Equation of State, *Chemical Engineering Science*, 1972, pp 1197-1203. Commercially available software programs may be used to assist in deriving reactivity ratios from experimentally derived data. One example of such software is Aspen Plus from Aspen Technology, Inc., Ten Canal Park, Cambridge, Mass. 02141-2201 USA.

Based on the foregoing theoretical considerations, the present invention may alternatively be described as a composition for use in the polymerization of two or more addition polymerizable monomers, especially ethylene and at least one copolymerizable comonomer, to form a high molecular weight, segmented copolymer (multi-block copolymer), said copolymer containing therein two or more, preferably three or more segments or blocks differing in one or more chemical or physical properties as further disclosed here in, the composition comprising the admixture or reaction product resulting from combining:

(A) a first olefin polymerization catalyst, (B) a second olefin polymerization catalyst capable of preparing polymers differing in chemical or physical properties from the polymer prepared by catalyst (A) under equivalent polymerization conditions, and (C) a chain shuttling agent; and wherein the:

$r_1$ of the a first olefin polymerization catalyst ($r_{1A}$), and $r_1$ of the a second olefin polymerization catalyst ($r_{1B}$), are selected such that the ratio ($r_{1A}/r_{1B}$) under the polymerization conditions is 0.5 or less, preferably 0.25 or less, more preferably 0.125 or less, still more preferably 0.08 or less, most preferably 0.04 or less.

Additionally, there is now provided a process, preferably a solution process and most preferably a continuous solution process for use in the polymerization of two or more addition polymerizable monomers, especially ethylene and at least one copolymerizable comonomer, to form a high molecular weight, segmented copolymer (multi-block copolymer), said copolymer containing therein two or more, preferably three or more segments or blocks differing in one or more chemical or physical properties as further disclosed here in, the process comprising the steps of combining two or more addition polymerizable monomers, especially ethylene and at least one copolymerizable comonomer under polymerization conditions with the composition comprising the admixture or reaction product resulting from combining:

(A) a first olefin polymerization catalyst, (B) a second olefin polymerization catalyst capable of preparing polymers differing in chemical or physical properties from the polymer prepared by catalyst (A) under equivalent polymerization conditions, and (C) a chain shuttling agent; and recovering the polymer product, wherein:

$r_1$ of the a first olefin polymerization catalyst ($r_{1A}$), and $r_1$ of the a second olefin polymerization catalyst ($r_{1B}$), are selected such that the ratio ($r_{1A}/r_{1B}$) under the polymerization conditions is 0.5 or less, preferably 0.25 or less, more preferably 0.125 or less, still more preferably 0.08 or less, most preferably 0.04 or less.

Further there is now provided a composition for use in the polymerization two or more addition polymerizable monomers (referred to as monomer and comonomer(s) respectively), especially ethylene and at least one copolymerizable comonomer, to form a high molecular weight, segmented copolymer (multi-block copolymer), said copolymer containing therein two or more, preferably three or more segments or blocks differing in one or more chemical or physical properties as further disclosed here in, the composition comprising the admixture or reaction product resulting from combining:

(A) a first olefin polymerization catalyst, (B) a second olefin polymerization catalyst capable of preparing polymers differing in chemical or physical properties from the polymer prepared by catalyst (A) under equivalent polymerization conditions, and (C) a chain shuttling agent; wherein:

the comonomer content in mole percent of the copolymer resulting from the first olefin polymerization catalyst ($F_1$), and the comonomer content in mole percent of the copolymer resulting from the second olefin polymerization catalyst ($F_2$), are selected such that the ratio ($F_1/F_2$) under the polymerization conditions is 2 or more, preferably 4 or more, more preferably 10 or more, still more preferably 15 or more, and most preferably 20 or more.

Additionally, there is now provided a process, preferably a solution process, more preferably a continuous solution process for use in the polymerization of two or more addition polymerizable monomers (referred to as monomer and comonomer(s) respectively), especially ethylene and at least one copolymerizable comonomer, to form a high molecular weight, segmented copolymer (multi block copolymer), said copolymer containing therein two or more, preferably three or more segments or blocks differing in one or more chemical or physical properties as further disclosed here in, the process comprising the steps of combining under polymerization conditions:

(A) a first olefin polymerization catalyst, (B) a second olefin polymerization catalyst capable of preparing polymers differing in chemical or physical properties from the polymer prepared by catalyst (A) under equivalent polymerization conditions, and (C) a chain shuttling agent; wherein:

the comonomer content in mole percent of the copolymer resulting from the first olefin polymerization catalyst ($F_1$), and the comonomer content in mole percent of the copolymer resulting from the second olefin polymerization catalyst ($F_2$), are selected such that the ratio ($F_1/F_2$) under the polymerization conditions is 2 or more, preferably 4 or more, more preferably 10 or more, still more preferably 15 or more, and most preferably 20 or more, under polymerization conditions, and recovering the polymer product.

Monomers

Suitable monomers for use in preparing the polymers of the present invention include ethylene and one or more addition polymerizable monomers other than ethylene. Examples of suitable comonomers include straight-chain or branched α-olefins of 3 to 30, preferably 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono or poly alkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinylchloride, 1,2-difluoroethylene, 1,2-dichloroethylene, tetrafluoroethylene, and 3,3,3-trifluoro-1-propene.

Chain Shuttling Agents

The term, "shuttling agent" refers to a compound or mixture of compounds employed in the composition of the present invention that is capable of causing polymeryl exchange between at least two active catalyst sites of the catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 and 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, i.e., the rate of exchange starting from the catalyst B active site to catalyst A active site via the shuttling agent. Desirably, the intermediate formed between the shuttling agent and the polymeryl chain is sufficiently stable that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is equivalent to or faster than the rate of polymer termination, even up to 10 or even 100 times faster than the rate of polymer termination. This permits polymer block formation on the same time scale as polymer propagation.

By selecting different combinations of catalysts having differing comonomer incorporation rates as well as differing reactivities, and by pairing various shuttling agents or mixtures of agents with these catalyst combinations, polymer products having segments of different densities or comonomer concentrations, different block lengths, and different numbers of such segments or blocks in each copolymer can be prepared. For example, if the activity of the shuttling agent is low relative to the catalyst polymer chain propagation rate of one or more of the catalysts, longer block length multi-block copolymers and polymer blends may be obtained. Contrariwise, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various ethylene homopolymers and/or copolymers can be obtained.

A suitable composition comprising Catalyst A, Catalyst B, and a chain shuttling agent can be selected for this invention by the following multi-step procedure specially adapted for block differentiation based on comonomer incorporation:

I. One or more addition polymerizable, preferably olefin monomers are polymerized using a mixture comprising a potential catalyst and a potential chain shuttling agent. This polymerization test is desirably performed using a batch or semi-batch reactor (that is, without resupply of catalyst or shuttling agent), preferably with relatively constant monomer concentration, operating under solution polymerization conditions, typically using a molar ratio of catalyst to chain shuttling agent from 1:5 to 1:500. After forming a suitable quantity of polymer, the reaction is terminated by addition of a catalyst poison and the polymer's properties (Mw, Mn, and Mw/Mn or PDI) measured.

II. The foregoing polymerization and polymer testing are repeated for several different reaction times, providing a series of polymers having a range of yields and PDI values.

III. Catalyst/shuttling agent pairs demonstrating significant polymer transfer both to and from the shuttling agent are characterized by a polymer series wherein the minimum PDI is less than 2.0, more preferably less than 1.5, and most preferably less than 1.3. Furthermore, if chain shuttling is occurring, the Mn of the polymer will increase, preferably nearly linearly, as conversion is increased. Most preferred catalyst/shuttling agent pairs are those giving polymer Mn as a function of conversion (or polymer yield) fitting a line with a statistical precision ($R^2$) of greater than 0.95, preferably greater than 0.99.

Steps I-III are then carried out for one or more additional pairings of potential catalysts and/or putative shuttling agents.

A suitable composition comprising Catalyst A, Catalyst B, and one or more chain shuttling agents according to the invention is then selected such that the two catalysts each undergo chain shuttling with one or more of the chain shuttling agents, and Catalyst A has a higher comonomer incorporation index (or is otherwise capable of selectively forming polymer) compared to Catalyst B under the reaction conditions chosen. Most preferably, at least one of the chain shuttling agents undergoes polymer transfer in both the forward and reverse directions (as identified in the foregoing test) with both Catalyst A and Catalyst B. In addition, it is preferable that the chain shuttling agent does not reduce the catalyst activity (measured in weight of polymer produced per weight of catalyst per unit time) of either catalyst (compared to activity in the absence of a shuttling agent) by more than 60 percent, more preferably such catalyst activity is not reduced by more than 20 percent, and most preferably catalyst activity of at least one of the catalysts is increased compared to the catalyst activity in the absence of a shuttling agent.

Alternatively, it is also possible to detect desirable catalyst/shuttling agent pairs by performing a series of polymerizations under standard batch reaction conditions and measuring the resulting number average molecular weights, PDI and polymer yield or production rate. Suitable shuttling agents are characterized by lowering of the resultant Mn without significant broadening of PDI or loss of activity (reduction in yield or rate).

The foregoing tests are readily adapted to rapid throughput screening techniques using automated reactors and analytic probes and to formation of polymer blocks having different distinguishing properties. For example, a number of potential shuttling agent candidates can be pre-identified or synthesized in situ by combination of various organometal compounds with various proton sources and the compound or reaction product added to a polymerization reaction employing an olefin polymerization catalyst composition. Several polymerizations are conducted at varying molar ratios of shuttling agent to catalyst. As a minimum requirement, suitable shuttling agents are those that produce a minimum PDI of less than 2.0 in variable yield experiments as described above, while not significantly adversely affecting catalyst activity, and preferably improving catalyst activity, as above described.

Regardless of the method for identifying, a priori, a shuttling agent, the term is meant to refer to a compound that is capable of preparing the presently identified multi-block copolymers or usefully employed under the polymerization conditions herein disclosed. Highly desirably, multi-block copolymers having an average number of blocks or segments per average chain (as defined as the average number of blocks of different composition divided by the Mn of the polymer) greater than 3.0 more preferably greater than 3.5, even more preferably greater than 4.0, and less than 25, preferably less than 15, more preferably less than 10.0, most preferably less than 8.0 are formed according to the invention.

Suitable shuttling agents for use herein include Group 1, 2, 12 or 13 metal compounds or complexes containing at least one $C_{1-20}$ hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum and dialkyl zinc compounds, especially triethylaluminum, tri(i-propyl)aluminum, tri(i-butyl)aluminum, tri(n-hexyl)aluminum, tri(n-octyl)aluminum, triethylgallium, or diethylzinc. Additional suitable shuttling agents include the reaction product or mixture formed by combining the foregoing organometal compound, preferably a tri($C_{1-8}$)alkyl aluminum or di($C_{1-8}$)alkyl zinc compound, especially triethylaluminum, tri(i-propyl)aluminum, tri(i-butyl)aluminum, tri(n-hexyl)aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl)amine, 2,6-di(t-butyl)phenol, ethyl(1-naphthyl)amine, bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations most desired for use in the present invention as shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl) siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts and may be undesirable for use for that reason as well. Accordingly, the activity of the chain shuttling agent desirably is balanced with the catalytic activity of the catalysts to achieve the desired polymer properties. In some embodiments of the invention, best results may be obtained by use of shuttling agents having a chain shuttling activity (as measured by a rate of chain transfer) that is less than the maximum possible rate.

Generally however, preferred shuttling agents possess the highest rates of polymer transfer as well as the highest transfer efficiencies (reduced incidences of chain termination). Such shuttling agents may be used in reduced concentrations and still achieve the desired degree of shuttling. In addition, such shuttling agents result in production of the shortest possible polymer block lengths. Highly desirably, chain shuttling agents with a single exchange site are employed due to the fact that the effective molecular weight of the polymer in the reactor is lowered, thereby reducing viscosity of the reaction mixture and consequently reducing operating costs.

Catalysts

Suitable catalysts for use herein include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based on metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

Metal complexes for use herein having high comonomer incorporation index (Catalyst A) include complexes of transition metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15, preferably 3-10, more preferably 4-8, and most preferably Group 4 of the Periodic Table of the Elements;

K independently each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3 iπ-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, trimethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzenyl ligands are anionic ligands which are boron containing analogues to benzene. They are previously known in the art having been described by G. Herberich, et al., in *Organometallics,* 14, 1, 471-480 (1995). Preferred boratabenzenyl ligands correspond to the formula:

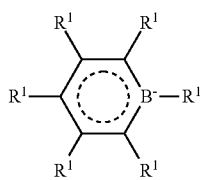

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

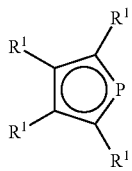

wherein $R^1$ is as previously defined.

Preferred transition metal complexes for use herein correspond to the formula: $MK_kX_xZ_z$, or a dimer thereof, wherein:

M is a Group 4 metal;

K is a group containing delocalized π-electrons through which K is bound to M, said K group containing up to 50 atoms not counting hydrogen atoms, optionally two K groups may be joined together forming a bridged structure, and further optionally one K may be bound to X or Z;

X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

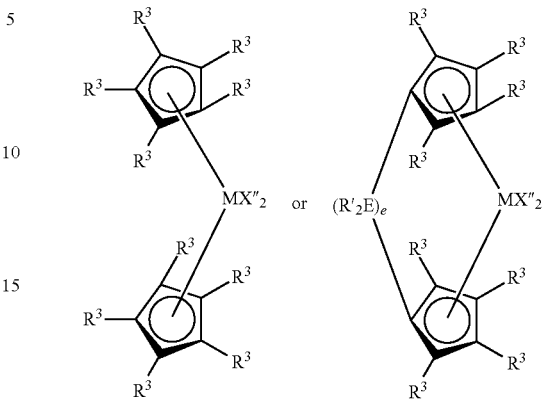

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl(cyclopentadienyl)(octahydrofluoren-1-yl)silane, dimethyl(cyclopentadienyl)(tetrahydrofluoren-1-yl)silane, (1,1,2,2-tetramethy)-1,2-bis(cyclopentadienyl)disilane, (1,2-bis(cyclopentadienyl)ethane, and dimethyl(cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula suitable for use in the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl, bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdim ethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdichloride,
dimethylsilylbis(cyclopentadienyl)zirconiumdimethyl,
dimethylsilylbis(tetramethylcyclopentadienyl)titanium (III) allyl
dimethylsilylbis(t-butylcyclopentadienyl)zirconiumdichloride,
dimethylsilylbis(n-butylcyclopentadienyl)zirconiumdichloride,
(dimethylsilylbis(tetramethylcyclopentadienyl)titanium(III) 2-(dimethylamino)benzyl,
(dimethylsilylbis(n-butylcyclopentadienyl)titanium(III) 2-(dimethylamino)benzyl,
dimethylsilylbis(indenyl)zirconiumdichloride,
dimethylsilylbis(indenyl)zirconiumdimethyl,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium (II) 1,4-diphenyl-1,3-butadiene,
dimethylsilylbis(4,5,6,7-tetrahydroinden-1-yl)zirconium-dichloride,
dimethylsilylbis(4,5,6,7-tetrahydroinden-1-yl)zirconium-dimethyl,
dimethylsilylbis(tetrahydroindenyl)zirconium(II) 1,4-diphenyl-1,3-butadiene,
dimethylsilylbis(tetramethylcyclopentadienyl)zirconium dimethyl
dimethylsilylbis(fluorenyl)zirconiumdimethyl,
dimethylsilylbis(tetrahydrofluorenyl)zirconium bis(trimethylsilyl),
ethylenebis(indenyl)zirconiumdichloride,
ethylenebis(indenyl)zirconiumdimethyl,
ethylenebis(4,5,6,7-tetrahydroindenyl)zirconiumdichloride,
ethylenebis(4,5,6,7-tetrahydroindenyl)zirconiumdimethyl,
(isopropylidene)(cyclopentadienyl)(fluorenyl)zirconium-dibenzyl, and
dimethylsilyl(tetramethylcyclopentadienyl)(fluorenyl)zirconium dimethyl.

A further class of metal complexes utilized in the present invention corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

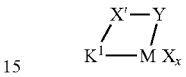

wherein:

M is titanium or zirconium, preferably titanium in the +2, +3, or +4 formal oxidation state;

$K^1$ is a delocalized, $\pi$-bonded ligand group optionally substituted with from 1 to 5 $R^2$ groups, $R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;

x is 1 or 2;

Y is —O—, —S—, —NR'—, —PR'—; and

X' is $SiR'_2$, $CR'_2$, $SiR'_2SiR'_2$, $CR'_2CR'_2$, $CR'=CR'$, $CR'_2SiR'_2$, or $GeR'_2$, wherein R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

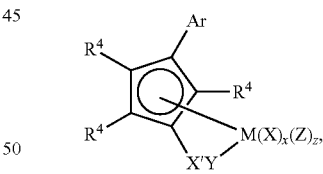

wherein,

Ar is an aryl group of from 6 to 30 atoms not counting hydrogen;

$R^4$ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylene-phosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6{}_2$, $CR^6{}_2$, $SiR^6{}_2SiR^6{}_2$, $CR^6{}_2CR^6{}_2$, $CR^6=CR^6$, $CR^6{}_2SiR^6{}_2$, $BR^6$, $BR^6L''$, or $GeR^6{}_2$;

Y is —O—, —S—, —$NR^5$—, —$PR^5$—; —$NR^5{}_2$, or —$PR^5{}_2$;

$R^5$, independently each occurrence, is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently each occurrence, is hydrogen, or a member selected from hydrocarbyl, hydrocarbyloxy, silyl, halogenated alkyl, halogenated aryl, —$NR^5{}_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 60 atoms not counting hydrogen, or two X groups are joined together thereby forming a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium (II) 1,3-diphenyl-1,3-butadiene;
(3-(pyrrol-1-yl)cyclopentadien-1-yl)dimethyl(t-butylamido)silanetitanium dichloride,
(3-(pyrrol-1-yl)cyclopentadien-1-yl)dimethyl(t-butylamido)silanetitanium dimethyl,
(3-(pyrrol-1-yl)cyclopentadien-1-yl))dimethyl(t-butylamido)silanetitanium (II) 1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium (II) 1,4-diphenyl-1,3-butadiene;
(3,4-diphenylcyclopentadien-1-yl)dimethyl(t-butylamido)silanetitanium dichloride,
(3,4-diphenylcyclopentadien-1-yl)dimethyl(t-butylamido)silanetitanium dimethyl,
(3,4-diphenylcyclopentadien-1-yl)dimethyl(t-butylamido)silanetitanium (II) 1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II) 1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-4-methoxyphenyl)-4-phenylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and
(2,3,4,5-tetraphenylcyclopentadien-1-yl)dimethyl(t-butylamido)silanetitanium (II) 1,4-diphenyl-1,3-butadiene.

Additional examples of suitable metal complexes for use as catalyst (A) herein are polycyclic complexes corresponding to the formula:

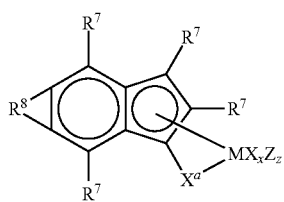

where M is titanium in the +2, +3 or +4 formal oxidation state;

$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one 6-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

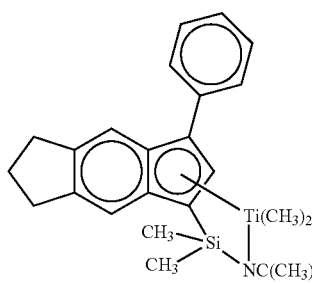

or

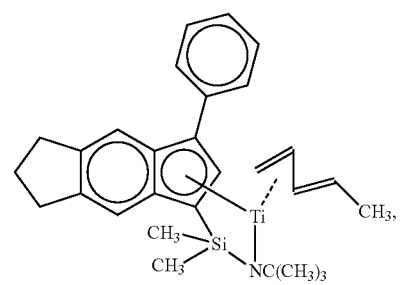

2,3-dimethyl-substituted s-indecenyl complexes corresponding to the formulas:

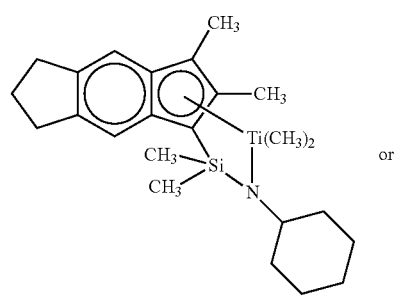

or

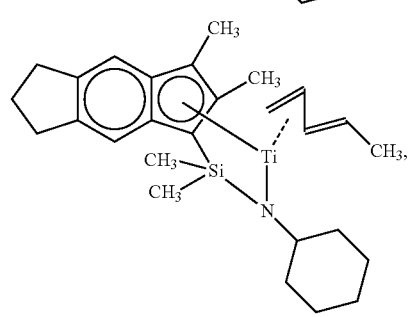

or 2-methyl-substituted s-indecenyl complexes corresponding to the formula:

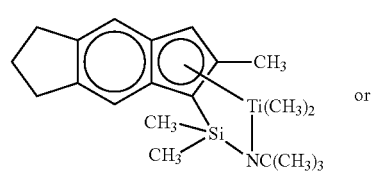

or

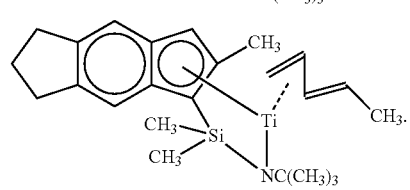

Additional examples of metal complexes that are usefully employed as catalyst (A) according to the present invention include those of the formula:

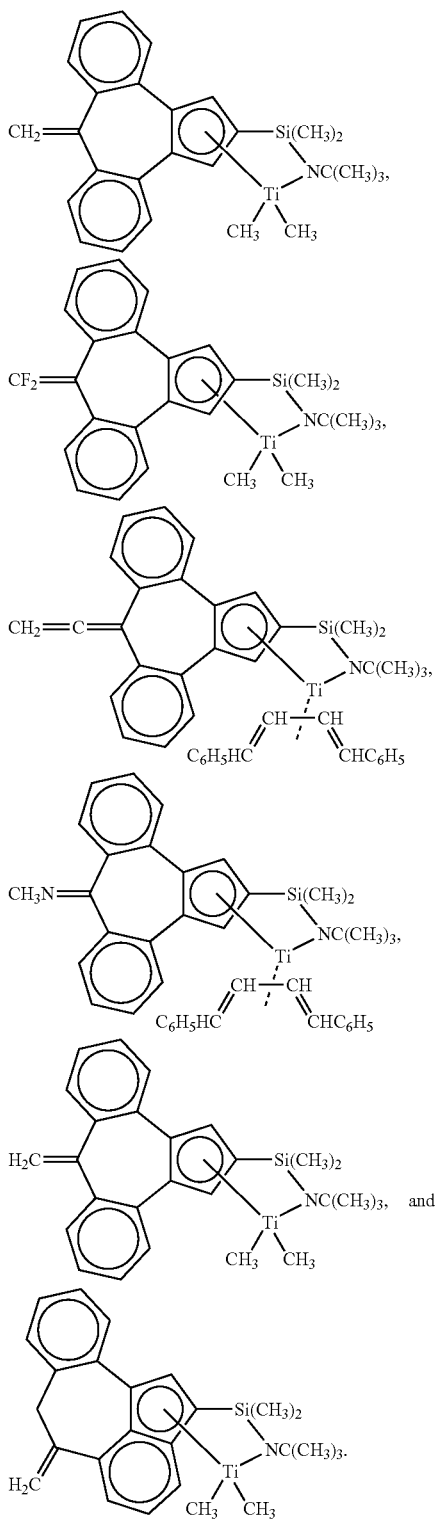

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene,
(8-difluoromethylene-1,8-dihydrodibenzo[e,h]azulen-1-yl)-N-(1,1-dimethylethyl)dimethylsilanamide titanium (II) 1,3-pentadiene,
(8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene,
(8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl,
(8-difluoromethylene-1,8-dihydrodibenzo[e,h]azulen-2-yl)-N-(1,1-dimethylethyl)dimethylsilanamide titanium (IV) dibenzyl, and mixtures thereof, especially mixtures of positional isomers.

Further illustrative examples of metal complexes for use according to the present invention correspond to the formula:

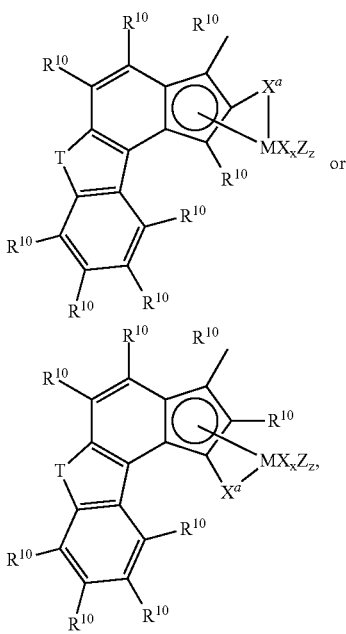

where M is titanium in the +2, +3 or +4 formal oxidation state;

T is —NR$^9$— or —O—;

R$^9$ is hydrocarbyl, silyl, germyl, dihydrocarbylboryl, or halohydrocarbyl or up to 10 atoms not counting hydrogen;

R$^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R$^{10}$ group having up to 40 atoms not counting hydrogen atoms, and optionally two or more of the foregoing adjacent R$^{10}$ groups may together form a divalent derivative thereby forming a saturated or unsaturated fused ring;

X$^a$ is a divalent moiety lacking in delocalized π-electrons, or such a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and z is 0 or 1.

Highly preferably T is =N(CH$_3$), X is halo or hydrocarbyl, x is 2, X' is dimethylsilane, z is 0, and R$^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two R$^{10}$ groups may be joined together.

Illustrative metal complexes of the foregoing formula that may be employed in the practice of the present invention further include the following compounds:

(t-butylamido)dimethyl-[6,7]benzo-[4,5:2',3'](1-methylisoindol)-(3H)-indene-2-yl)silanetitanium (II) 1,4-diphenyl-1,3-butadiene, (t-butylamido)dimethyl-[6,7]benzo-[4,5:2',3'](1-methylisoindol)-(3H)-indene-2-yl)silanetitanium (II) 1,3-pentadiene, (t-butylamido)dimethyl-[6,7]-benzo-[4,5:2',3'](1-methylisoindol)-(3H)-indene-2-yl)silanetitanium (III) 2-(N,N-dimethylamino)benzyl, (t-butylamido)dimethyl-[6,7]benzo-[4,5:2',3'](1-methylisoindol)-(3H)-indene-2-yl)silanetitanium (IV) dichloride, (t-butylamido)dimethyl-[6,7]benzo-[4,5:2',3'](1-methylisoindol)-(3H)-indene-2-yl)silanetitanium (IV) dimethyl, (t-butylamido)dimethyl-[6,7]benzo-[4,5:2',3'](1-methylisoindol)-(3H)-indene-2-yl)silanetitanium (IV) dibenzyl, (t-butylamido)dimethyl-[6,7]benzo-[4,5:2',3'](1-methylisoindol)-(3H)-indene-2-yl)silanetitanium (IV) bis(trimethylsilyl), (cyclohexylamido)dimethyl-[6,7]benzo-[4,5:2',3'](1-methylisoindol)-(3H)-indene-2-yl)silanetitanium (II) 1,4-diphenyl-1,3-butadiene, (cyclohexylamido)dimethyl-[6,7]benzo-[4,5:2',3'](1-methylisoindol)-(3H)-indene-2-yl)silanetitanium (II) 1,3-pentadiene, (cyclohexylamido)dimethyl-[6,7]benzo-[4,5:2',3'](1-methylisoindol)-(3H)-indene-2-yl)silanetitanium (III) 2-(N,N-dimethylamino)benzyl, (cyclohexylamido)dimethyl-[6,7]benzo-[4,5:2',3'](1-methylisoindol)-(3H)-indene-2-yl)silanetitanium (IV) dichloride, (cyclohexylamido)dimethyl-[6,7]benzo-[4,5:2',3'](1-methylisoindol)-(3H)-indene-2-yl)silanetitanium (IV) dimethyl, (cyclohexylamido)dimethyl-[6,7]benzo-[4,5:2',3'](1-methylisoindol)-(3H)-indene-2-yl)silanetitanium (IV) dibenzyl, (cyclohexylamido)dimethyl-[6,7]benzo-[4,5:2',3'](1-methylisoindol)-(3H)-indene-2-yl)silanetitanium (IV) bis(trimethylsilyl), (t-butylamido)di(p-methylphenyl)-[6,7]-benzo-[4,5:2',3'](1-methylisoindol)-(3H)-indene-2-yl)silanetitanium (II) 1,4-diphenyl-1,3-butadiene, (t-butylamido)di(p-methylphenyl)-[6,7]benzo-[4,5:2',3'](1-methylisoindol)-(3H)-indene-2-yl)silanetitanium (II) 1,3-pentadiene, (t-butylamido)di(p-methylphenyl)-[6,7]benzo-[4,5:2',3'](1-methylisoindol)-(3H)-indene-2-yl)silanetitanium (III) 2-(N,N-dimethylamino)benzyl, (t-butylamido)di(p-methylphenyl)-[6,7]benzo-[4,5:2',3'](1-methylisoindol)-(3H)-indene-2-yl)silanetitanium (IV) dichloride, (t-butylamido)di(p-methylphenyl)[6,7]benzo-[4,5:2',3'](1-methylisoindol)-(3H)-indene-2-yl)silanetitanium (IV) dimethyl, (t-butylamido)di(p-methylphenyl)-[6,7]benzo-[4,5:2',3'](1-methylisoindol)-(3H)-indene-2-yl)silanetitanium (IV) dibenzyl, (t-butylamido)di(p-methylphenyl)[6,7]benzo-[4,5:2',3'](1-methylisoindol)-(3H)-indene-2-yl)silanetitanium (IV) bis(trimethylsilyl),
(cyclohexylamido)di(p-methylphenyl)[6,7]benzo-[4,5:2',3'](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2',3'](1-methylisoindol)-(3H)-indene-2-yl)silanetitanium (II) 1,3-pentadiene,
(cyclohexylamido)di(p-methylphenyl)[6,7]benzo-[4,5:2',3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2',3'](1-methylisoindol)-(3H)-indene-2-yl)silanetitanium (IV) dichloride,
(cyclohexylamido)di(p-methylphenyl)[6,7]benzo-[4,5:2',3'](1-methylisoindol)-(3H)-indene-2-yl)silanetitanium (IV) dimethyl,
(cyclohexylamido)di(p-methylphenyl)-[6,7]-benzo-[4,5:2',3'](1-methylisoindol)-(3H)-indene-2-yl)silanetitanium (IV) dibenzyl; and
(cyclohexylamido)di(p-methylphenyl)-[6,7]benzo-[4,5:2',3'](1-methylisoindol)-(3H)-indene-2-yl)silanetitanium (IV) bis(trimethylsilyl).

Illustrative Group 4 metal complexes that may be employed in the practice of the present invention further include:
(tert-butylamido)(1,1-dimethyl-2,3,4,9,10-η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl)dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (II) 1,4-diphenyl-1,3-butadiene,
(tert-butylamido)(tetramethyl-$\eta^5$-cyclopentadienyl)dimethylsilanetitanium (II) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene
(tert-butylamido)(2,3-dimethylindenyl)dimethylsilanetitanium (IV) dimethyl
(tert-butylamido)(2,3-dimethylindenyl)dimethylsilanetitanium (IV) dibenzyl
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-η-1,4,5,6,7,8-hexahydronaphthalen-4-yl)dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitaniumdimethyl
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl)ethanediyltitanium (IV) dimethyl, and
1-(tert-butylamido)-2-(tetramethyl-$\eta^5$-cyclopentadienyl)ethanediyl-titanium (II) 1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed as catalyst (A) are complexes of polyvalent Lewis bases, such as compounds corresponding to the formula:

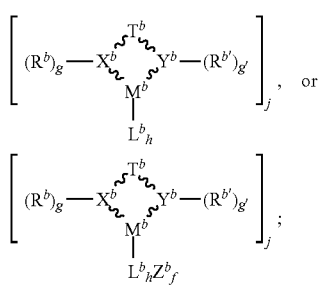

preferably

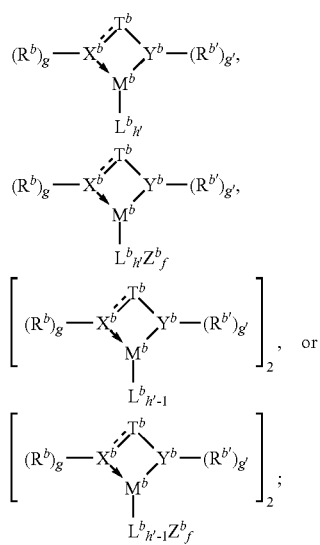

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b\prime}$ independently each occurrence are hydrogen or $C_{1-50}$ hydrocarbyl groups optionally containing one or more heteroatoms or inertly substituted derivative thereof. Non-limiting examples of suitable $R^b$ and $R^{b\prime}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable Rb and Rb' groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_{1-20}$ alkyl, $C_{7-20}$ aralkyl, and chloride;

h is an integer from 1 to 6, preferably from 1 to 4, more preferably from 1 to 3, and j is 1 or 2, with the value h×j selected to provide charge balance;

$Z^b$ is a neutral ligand group coordinated to $M^b$, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b\prime}$ may be joined together to form a single or multiple ring structure;

h is an integer from 1 to 6, preferably from 1 to 4, more preferably from 1 to 3;

∿∿ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_{1-8}$ straight chain alkyl groups.

At the same time, in this embodiment $R^{b\prime}$ preferably has relatively high steric hindrance with respect to $Y^b$. Non-limiting examples of suitable $R^{b\prime}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b\prime}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

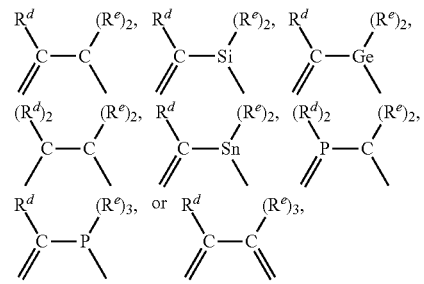

wherein

Each $R^d$ is $C_{1-10}$ hydrocarbyl group, preferably methyl, ethyl, n-propyl, i-propyl, t-butyl, phenyl, 2,6-dimethylphenyl, benzyl, or tolyl. Each $R^e$ is $C_{1-10}$ hydrocarbyl, preferably methyl, ethyl, n-propyl, i-propyl, t-butyl, phenyl, 2,6-dimethylphenyl, benzyl, or tolyl. In addition, two or more $R^d$ or $R^e$ groups, or mixtures of Rd and Re groups may together form a polyvalent derivative of a hydrocarbyl group, such as, 1,4- butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes include:

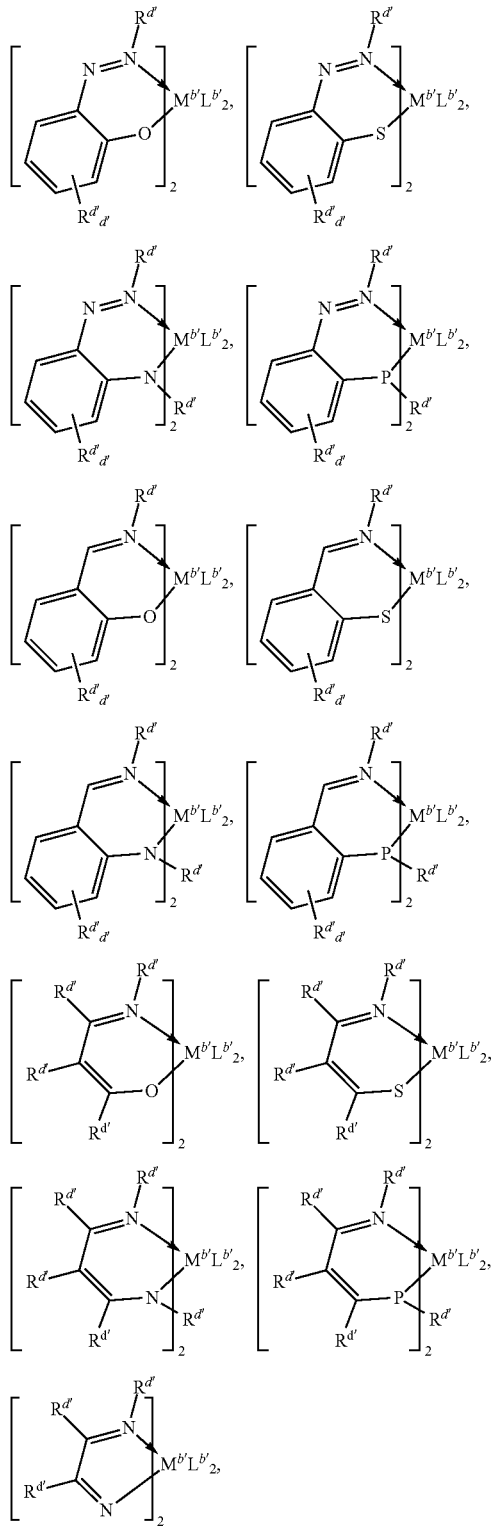

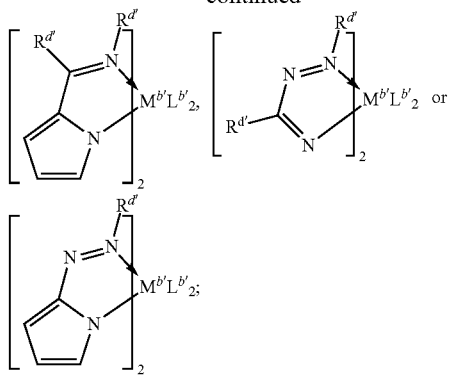

-continued

wherein $R^{d'}$ each occurrence is independently selected from the group consisting of hydrogen and $C_{1-50}$ hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention especially include Group 4 metal derivatives, especially hafnium derivatives of hydrocarbylamine substituted heteroaryl compounds corresponding to the formula:

$$\begin{array}{c} T^1 \\ N \diagdown \diagdown R^{12} \\ R^{11} \cdots M^1 X^1_{x'} \end{array}$$

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Preferred metal complexes correspond to the formula:

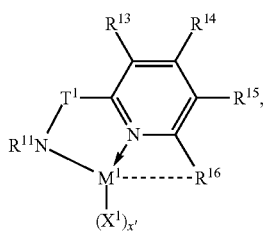

wherein

M$^1$, X$^1$, x', R$^{11}$ and T$^1$ are as previously defined,

R$^{13}$, R$^{14}$, R$^{15}$ and R$^{16}$ are hydrogen, halo, or an alkyl, cycloalkyl, heteroalkyl, heterocycloalkyl, aryl, or silyl group of up to 20 atoms not counting hydrogen, or adjacent R$^{13}$, R$^{14}$, R$^{15}$ or R$^{16}$ groups may be joined together thereby forming fused ring derivatives, and bonds, optional bonds and electron pair donative interactions are represented by lines, dotted lines and arrows respectively.

More preferred examples of the foregoing metal complexes correspond to the formula:

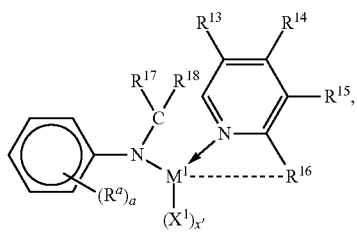

wherein

M', X$^1$, and x' are as previously defined,

R$^{13}$, R$^{14}$, R$^{15}$ and R$^{16}$ are as previously defined, preferably R$^{13}$, R$^{14}$, and R$^{15}$ are hydrogen, or C$_{1-4}$ alkyl, and R$^{16}$ is C$_{6-20}$ aryl, most preferably naphthalenyl;

R$^a$ independently each occurrence is C$_{1-4}$ alkyl, and a is 1-5, most preferably R$^a$ in two ortho-positions to the nitrogen is isopropyl or t-butyl;

R$^{17}$ and R$^{18}$ independently each occurrence are hydrogen, halogen, or a C$_{1-20}$ alkyl or aryl group, most preferably one of R$^{17}$ and R$^{18}$ is hydrogen and the other is a C$_{6-20}$ aryl group, especially 2-isopropyl, phenyl or a fused polycyclic aryl group, most preferably an anthracenyl group, and bonds, optional bonds and electron pair donative interactions are represented by lines, dotted lines and arrows respectively.

Highly preferred metal complexes for use herein as catalyst (A) correspond to the formula:

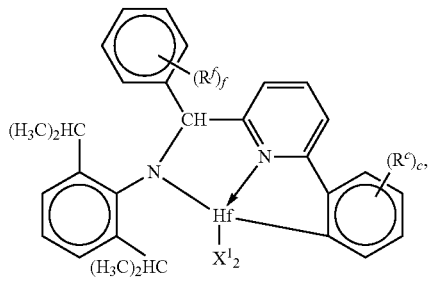

wherein X$^1$ each occurrence is halide, N,N-dimethylamido, or C$_{1-4}$ alkyl, and preferably each occurrence X$^1$ is methyl;

R$^f$ independently each occurrence is hydrogen, halogen, C$_{1-20}$ alkyl, or C$_{6-20}$ aryl, or two adjacent R$^f$ groups are joined together thereby forming a ring, and f is 1-5; and R$^c$ independently each occurrence is hydrogen, halogen, C$_{1-20}$ alkyl, or C$_{6-20}$ aryl, or two adjacent R$^c$ groups are joined together thereby forming a ring, and c is 1-5.

Most highly preferred examples of metal complexes for use as catalyst (A) according to the present invention are complexes of the following formulas:

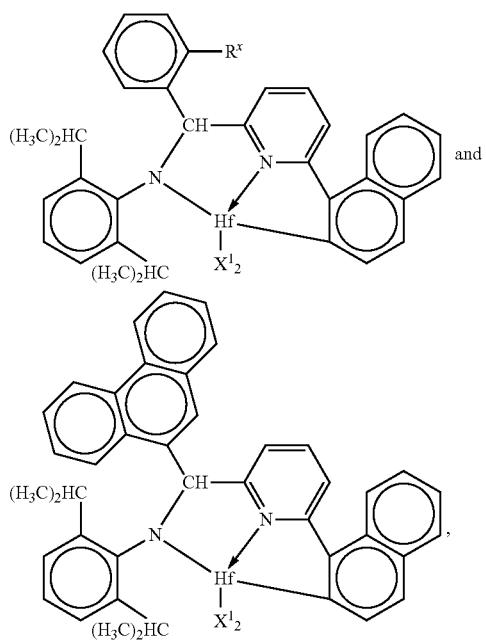

wherein R$^x$ is C$_{1-4}$ alkyl or cycloalkyl, preferably methyl, isopropyl, t-butyl or cyclohexyl; and X$^1$ each occurrence is halide, N,N-dimethylamido, or C$_{1-4}$ alkyl, preferably methyl.

Examples of metal complexes usefully employed as catalyst (A) according to the present invention include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropyl-phenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)
   (α-naphthalen-2-diyl(6-pyridin-2-diyl)methane)]hafnium
   di(N,N-dimethylamido); and
[N-(2,6-di(1-methylethyl)phenyl)amido)(phenanthren-5-yl)
   (α-naphthalen-2-diyl(6-pyridin-2-diyl)methane)]hafnium
   dichloride.

Under the reaction conditions used to prepare the metal complexes used in the present invention, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes of polyvalent Lewis bases for use herein include compounds corresponding to the formula:

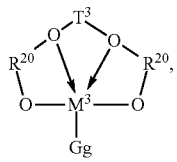

where:
$R^{20}$ is an aromatic or inertly substituted aromatic group containing from 5 to 20 atoms not counting hydrogen, or a polyvalent derivative thereof;
$T^3$ is a hydrocarbylene or silane group having from 1 to 20 atoms not counting hydrogen, or an inertly substituted derivative thereof;
$M^3$ is a Group 4 metal, preferably zirconium or hafnium;
G is an anionic, neutral or dianionic ligand group; preferably a halide, hydrocarbyl or dihydrocarbylamide group having up to 20 atoms not counting hydrogen;
g is a number from 1 to 5 indicating the number of such G groups; and
bonds and electron donative interactions are represented by lines and arrows respectively.

Preferably, such complexes correspond to the formula:

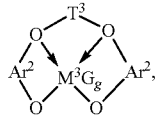

wherein:
$T^3$ is a divalent bridging group of from 2 to 20 atoms not counting hydrogen, preferably a substituted or unsubstituted, $C_{3-6}$ alkylene group; and
$Ar^2$ independently each occurrence is an arylene or an alkyl- or aryl-substituted arylene group of from 6 to 20 atoms not counting hydrogen;
$M^3$ is a Group 4 metal, preferably hafnium or zirconium;
G independently each occurrence is an anionic, neutral or dianionic ligand group;
g is a number from 1 to 5 indicating the number of such X groups; and
electron donative interactions are represented by arrows.
Preferred examples of metal complexes of foregoing formula include the following compounds:

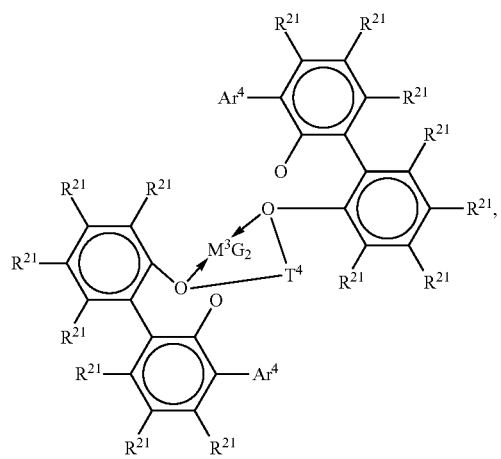

where $M^3$ is Hf or Zr;
$Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and
$T^4$ independently each occurrence comprises a $C_{3-6}$ alkylene group, a $C_{3-6}$ cycloalkylene group, or an inertly substituted derivative thereof;
$R^{21}$ independently each occurrence is hydrogen, halo, hydrocarbyl, trihydrocarbylsilyl, or trihydrocarbylsilylhydrocarbyl of up to 50 atoms not counting hydrogen; and
G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Especially preferred are compounds of the formula:

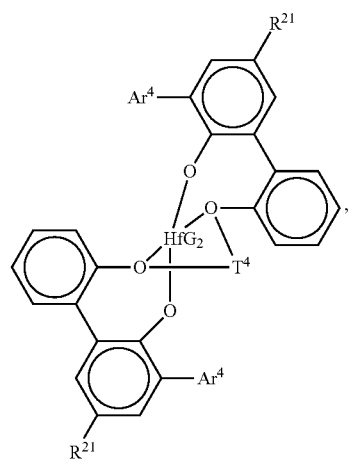

wherein $Ar^4$ is 3,5-di(isopropyl)phenyl, 3,5-di(isobutyl)phenyl, dibenzo-1H-pyrrole-1-yl, or anthracen-5-yl,
$R^{21}$ is hydrogen, halo, or $C_{1-4}$ alkyl, especially methyl
$T^4$ is propan-1,3-diyl or butan-1,4-diyl, and
G is chloro, methyl or benzyl.

A most highly preferred metal complex of the foregoing formula is:

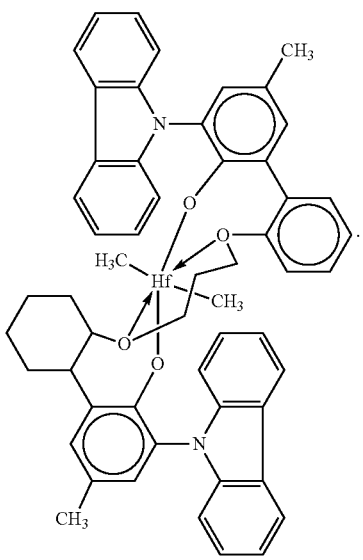

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and US 2004/0220050.

Catalysts having high comonomer incorporation properties are also known to reincorporate in situ prepared long chain olefins resulting incidentally during the polymerization through β-hydride elimination and chain termination of growing polymer, or other process. The concentration of such long chain olefins is particularly enhanced by use of continuous solution polymerization conditions at high conversions, especially ethylene conversions of 95 percent or greater, more preferably at ethylene conversions of 97 percent or greater. Under such conditions a small but detectable quantity of olefin terminated polymer may be reincorporated into a growing polymer chain, resulting in the formation of long chain branches, that is, branches of a carbon length greater than would result from other deliberately added comonomer. Moreover, such chains reflect the presence of other comonomers present in the reaction mixture. That is, the chains may include short chain or long chain branching as well, depending on the comonomer composition of the reaction mixture. Long chain branching of olefin polymers is further described in U.S. Pat. Nos. 5,272,236, 5,278,272, and 5,665,800. In one aspect of the invention, the level of long chain branching in the product is significantly suppressed or eliminated altogether by the use of chain shuttling agents that cause essentially all of the polymer chains to be terminated with the chain shuttling agent, and not by the formation of vinyl groups which can be reincorporated to form a long chain branch. In this embodiment, the resulting polymer block is highly linear, leading to advantaged properties.

Alternatively, and more preferably, branching, including hyper-branching, may be induced in a particular segment of the present multi-block copolymers by the use of specific catalysts known to result in "chain-walking" in the resulting polymer. For example, certain homogeneous bridged bis indenyl- or partially hydrogenated bis indenyl-zirconium catalysts, disclosed by Kaminski, et al., *J. Mol. Catal. A: Chemical*, 102 (1995) 59-65; Zambelli, et al., *Macromolecules*, 1988, 21, 617-622; or Dias, et al., *J. Mol. Catal. A: Chemical*, 185 (2002) 57-64 may be used to prepare branched copolymers from single monomers, including ethylene. Higher transition metal catalysts, especially nickel and palladium catalysts are also known to lead to hyper-branched polymers (the branches of which are also branched) as disclosed in Brookhart, et al., *J. Am. Chem. Soc.*, 1995, 117, 64145-6415.

In one embodiment of the invention, the presence of such branching (long chain branching, 1,3-addition, or hyper-branching) in the polymers of the invention can be confined to only the blocks or segments resulting from activity of catalyst A. Accordingly, in one embodiment of the invention a multi-block copolymer containing blocks or segments differing in the presence of such branching in combination with other segments or blocks substantially lacking such branching (especially high density or highly crystalline polymer blocks), can be produced from a single monomer containing reaction mixture, that is, without the addition of a deliberately added comonomer. Highly preferably, in a specific embodiment of the invention, a multi-block copolymer comprising alternating unbranched, ethylene homopolymer segments and branched polyethylene segments, especially ethylene/propylene copolymer segments, may be prepared from an initial reaction mixture consisting essentially of ethylene as the addition polymerizable monomer. The presence of such branching in the multi-block copolymers of the invention can be detected by certain physical properties of the resulting copolymers, such as reduced surface imperfections during melt extrusion (reduced melt fracture), reduced melting point, Tg, for the amorphous segments compared to a non-branched polymer segment, and/or the presence of 1,3-addition sequences or hyper-branching as detected by NMR techniques. The quantity of the foregoing types of branching present in the polymers of the invention (as a portion of the blocks or segments containing the same), is normally in the range from 0.01 to 10 branches per 1,000 carbons.

Suitable metal compounds for use as catalyst (B) include the foregoing metal compounds mentioned with respect to catalyst (A) as well as other metal compounds, with the proviso, in one embodiment of the invention, that they incorporate comonomer relatively poorly compared to catalyst (A). Accordingly, in addition to the previously identified metal complexes, the following additional metal complexes may be utilized.

Group 4-10 derivatives corresponding to the formula:

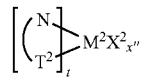

wherein $M^2$ is a metal of Groups 4-10 of the Periodic Table of the elements, preferably Group 4 metals, Ni(II) or Pd(II), most preferably zirconium;

$T^2$ is a nitrogen, oxygen or phosphorus containing group;

$X^2$ is halo, hydrocarbyl, or hydrocarbyloxy;

t is one or two;

x" is a number selected to provide charge balance;

and $T^2$ and N are linked by a bridging ligand.

Such catalysts have been previously disclosed in J. Am. Chem. Soc., 118, 267-268 (1996), J. Am. Chem. Soc., 117, 6414-6415 (1995), and Organometallics, 16, 1514-1516, (1997), among other disclosures.

Preferred examples of the foregoing metal complexes for use as catalyst (B) are aromatic diimine or aromatic dioxyimine complexes of Group 4 metals, especially zirconium, corresponding to the formula:

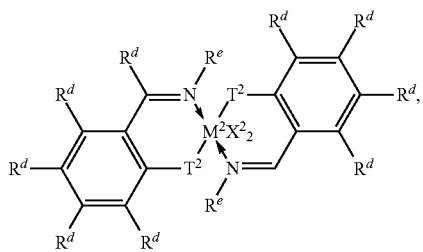

wherein;

$M^2$, $X^2$ and $T^2$ are as previously defined;

$R^d$ independently each occurrence is hydrogen, halogen, or $R^e$; and $R^e$ independently each occurrence is $C_{1-20}$ hydrocarbyl or a heteroatom-, especially a F, N, S or P-substituted derivative thereof, more preferably $C_{1-10}$ hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Most preferred examples of the foregoing metal complexes for use as catalyst (B) are aromatic dioxyimine complexes of zirconium, corresponding to the formula:

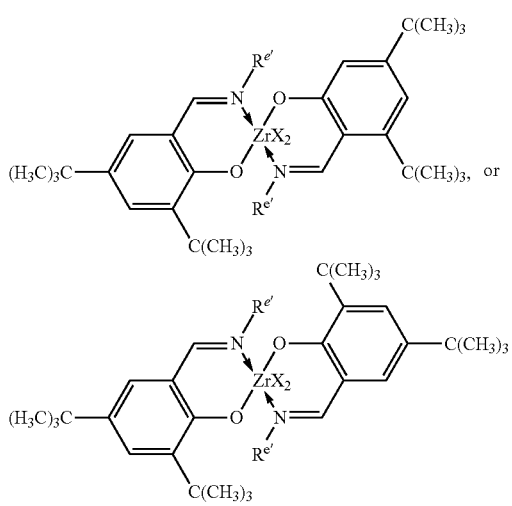

wherein;

$X^2$ is as previously defined, preferably $C_{1-10}$ hydrocarbyl, most preferably methyl or benzyl; and $R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes for use as catalyst (B) also include certain phosphinimine complexes are disclosed in EP-A-890581. These complexes correspond to the formula:

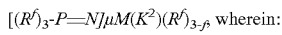

$R^f$ is a monovalent ligand or two $R^f$ groups together are a divalent ligand, preferably $R^f$ is hydrogen or $C_{1-4}$ alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

The skilled artisan will appreciate that in other embodiments of the invention, the criterion for selecting a combination of catalyst (A) and (B) may be any other distinguishing property of the resulting polymer blocks, such as combinations based on tacticity (isotactic/syndiotactic, isotactic/atactic or syndiotactic/atactic), regio-error content, or combinations thereof.

Cocatalysts

Each of the metal complex catalysts (A) and (B) (also interchangeably referred to herein as procatalysts) may be activated to form the active catalyst composition by combination with a cocatalyst, preferably a cation forming cocatalyst, a strong Lewis acid, or a combination thereof. In a preferred embodiment, the shuttling agent is employed both for purposes of chain shuttling and as the cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. No. 5,153,157, U.S. Pat. No. 5,064,802, U.S. Pat. No. 5,321,106, U.S. Pat. No. 5,721,185, U.S. Pat. No. 5,350,723, U.S. Pat. No. 5,425,872, U.S. Pat. No. 5,625,087, U.S. Pat. No. 5,883,204, U.S. Pat. No. 5,919,983, U.S. Pat. No. 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, A⁻. As used herein, the term "noncoordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_g^+(A)^{g-}$$

wherein:
L* is a neutral Lewis base;
(L*–H)⁺ is a conjugate Bronsted acid of L*;
$A^{g-}$ is a noncoordinating, compatible anion having a charge of g–, and
g is an integer from 1 to 3.

More preferably $A^{g-}$ corresponds to the formula: $[M'Q_4]^-$;
wherein:
M' is boron or aluminum in the +3 formal oxidation state; and
Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is K. Activating cocatalysts comprising boron which are particularly useful in the preparation of catalysts of this invention may be represented by the following general formula:

$$(L^*-H)^+(BQ_4)^-;$$

wherein:
L* is as previously defined;
B is boron in a formal oxidation state of 3; and
Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred (L*–H)⁺ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

$$(Ox^{h+})_g(A^{g-})_h,$$

wherein:
$Ox^{h+}$ is a cationic oxidizing agent having a charge of h+;
h is an integer from 1 to 3; and
$A^{g-}$ and g are as previously defined.

Examples of cationic oxidizing agents include: ferrocenium, hydrocarbyl-substituted ferrocenium, $Ag^+$, or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$[C]^+A^-$ wherein:

$[C]^+$ is a $C_{1-20}$ carbenium ion; and $A^-$ is a noncoordinating, compatible anion having a charge of $-1$. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$(Q^1{}_3Si)^+A^-$ wherein:

$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide; imidazolinide, substituted imidazolinide, benzimidazolide, or substituted benzimidazolide anions) may be depicted as follows:

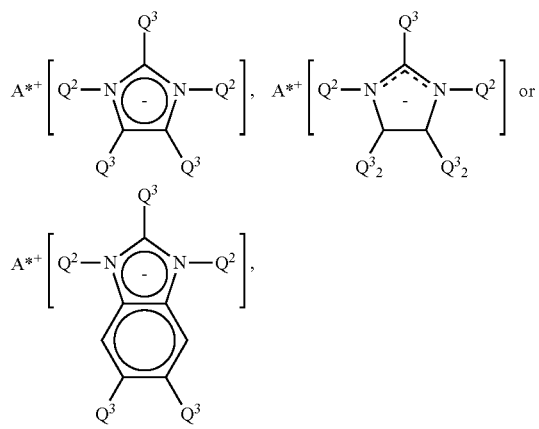

wherein:

$A^{*+}$ is a cation, especially a proton containing cation, and preferably is a trihydrocarbyl ammonium cation containing one or two $C_{10-40}$ alkyl groups, especially a methyldi($C_{14-20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl)imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide, bis(tris(pentafluorophenyl)alumane)-4,5-bis(undecyl)imidazolinide,
bis(tris(pentafluorophenyl)alumane)-4,5-bis(heptadecyl) imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2, 2',2"-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775. All of the foregoing catalyst activators as well as any other know activator for transition metal complex catalysts may be employed alone or in combination according to the present invention, however, for best results alumoxane containing cocatalysts are avoided.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

The process of the invention employing catalyst A, catalyst B, one or more cocatalysts, and chain shuttling agent C may be further elucidated by reference to FIG. 1, where there are illustrated activated catalyst site A, 10, which under polymerization conditions forms a polymer chain, 13, attached to the active catalyst site, 12. Similarly, active catalyst site B, 20, produces a differentiated polymer chain, 23, attached to the active catalyst site, 22. A chain shuttling agent C1, attached to a polymer chain produced by active catalyst B, 14, exchanges its polymer chain, 23, for the polymer chain, 13, attached to catalyst site A. Additional chain growth under polymerization conditions causes formation of a multi-block copolymer, 18, attached to active catalyst site A. Similarly, chain shuttling agent C2, attached to a polymer chain produced by active catalyst site A, 24, exchanges its polymer chain, 13, for the polymer chain, 23, attached to catalyst site B. Additional chain growth under polymerization conditions causes formation of a multi-block copolymer, 28, attached to active catalyst site B. The growing multi-block copolymers are repeatedly exchanged between active catalyst A and active catalyst B by means of shuttling agent C resulting in formation of a block or segment of differing properties whenever exchange to the opposite active catalyst site occurs. The growing polymer chains may be recovered while attached to a chain shuttling agent and functionalized if desired. Alternatively, the resulting polymer may be recovered by scission from the active catalyst site or the shuttling agent, through use of a proton source or other killing agent.

It is believed (without wishing to be bound by such belief), that the composition of the respective segments or blocks, and especially of the end segments of the polymer chains, may be influenced through selection of process conditions or other process variables. In the polymers of the invention, the nature of the end segments is determined by the relative rates of chain transfer or termination for the respective catalysts as well as by the relative rates of chain shuttling. Possible chain termination mechanisms include, but are not limited to, β-hydrogen elimination, β-hydrogen transfer to monomer, β-methyl elimination, and chain transfer to hydrogen or other chain-terminating reagent such as an organosilane or chain functionalizing agent. Accordingly, when a low concentration of chain shuttling agent is used, the majority of polymer chain ends will be generated in the polymerization reactor by one of the foregoing chain termination mechanisms and the relative rates of chain termination for catalyst (A) and (B) will determine the predominant chain terminating moiety. That is, the catalyst having the fastest rate of chain termination will produce relatively more chain end segments in the finished polymer.

In contrast, when a high concentration of chain shuttling agent is employed, the majority of the polymer chains within the reactor and upon exiting the polymerization zone are attached or bound to the chain shuttling agent. Under these reaction conditions, the relative rates of chain transfer of the polymerization catalysts and the relative rate of chain shuttling of the two catalysts primarily determines the identity of the chain terminating moiety. If catalyst (A) has a faster chain transfer and/or chain shuttling rate than catalyst (B), then the majority of the chain end segments will be those produced by catalyst (A).

At intermediate concentrations of chain shuttling agent, all three of the aforementioned factors are instrumental in determining the identity of the final polymer block. The foregoing methodology may be expanded to the analysis of multi-block polymers having more than two block types and for controlling the average block lengths and block sequences for these polymers. For example, using a mixture of catalysts 1, 2, and 3 with a chain shuttling agent, for which each catalyst type makes a different type of polymer block, produces a linear block copolymer with three different block types. Furthermore, if the ratio of the shuttling rate to the propagation rate for the three catalysts follows the order 1>2>3, then the average block length for the three block types will follow the order 3>2>1, and there will be fewer instances of 2-type blocks adjacent to 3-type blocks than 1-type blocks adjacent to 2-type blocks.

It follows that a method exists for controlling the block length distribution of the various block types. For example, by selecting catalysts 1, 2, and 3 (wherein 2 and 3 produce substantially the same polymer block type), and a chain shuttling agent, and the shuttling rate follows the order 1>2>3, the resulting polymer will have a bimodal distribution of block lengths made from the 2 and 3 catalysts.

During the polymerization, the reaction mixture comprising one or more monomers is contacted with the activated catalyst composition according to any suitable polymerization conditions. The process is characterized by use of elevated temperatures and pressures. Hydrogen may be employed as a chain transfer agent for molecular weight control according to known techniques if desired. As in other similar polymerizations, it is highly desirable that the monomers and solvents employed be of sufficiently high purity that catalyst deactivation does not occur. Any suitable technique for monomer purification such as devolatilization at reduced pressure, contacting with molecular sieves or high surface area alumina, or a combination of the foregoing processes may be employed. The skilled artisan will appreciate that the ratio of chain shuttling agent to one or more catalysts and or monomers in the process of the present invention may be varied in order to produce polymers differing in one or more chemical or physical properties.

Supports may be employed in the present invention, especially in slurry or gas-phase polymerizations. Suitable supports include solid, particulated, high surface area, metal oxides, metalloid oxides, or mixtures thereof (interchangeably referred to herein as an inorganic oxide). Examples include: talc, silica, alumina, magnesia, titania, zirconia, $Sn_2O_3$, aluminosilicates, borosilicates, clays, and mixtures thereof. Suitable supports preferably have a surface area as determined by nitrogen porosimetry using the B.E.T. method from 10 to 1000 $m^2/g$, and preferably from 100 to 600 $m^2/g$. The average particle size typically is from 0.1 to 500 μm, preferably from 1 to 200 μm, more preferably 10 to 100 μm.

In one embodiment of the invention the present catalyst composition and optional support may be spray dried or otherwise recovered in solid, particulated form to provide a composition that is readily transported and handled. Suitable methods for spray drying a liquid containing slurry are well known in the art and usefully employed herein. Preferred techniques for spray drying catalyst compositions for use herein are described in U.S. Pat. Nos. 5,648,310 and 5,672,669.

The polymerization is desirably carried out as a continuous polymerization, preferably a continuous, solution polymerization, in which catalyst components, shuttling agent(s), monomers, and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous.

The catalyst compositions can be advantageously employed in a high pressure, solution, slurry, or gas phase polymerization process. For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512. A solution process to prepare the novel polymers of the present invention, especially a continuous solution process is preferably carried out at a temperature between 80° C. and 250° C., more preferably between 100° C. and 210° C., and most preferably between 110° C. and 210° C. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes employing two or more active polymerization catalyst species, allows the use of elevated reactor temperatures which results in the economical production of multi-block or segmented copolymers in high yields and efficiencies. Both homogeneous and plug-flow type reaction conditions may be employed. The latter conditions are preferred where tapering of the block composition is desired.

Both catalyst compositions (A) and (B) may be prepared as a homogeneous composition by addition of the requisite metal complexes to a solvent in which the polymerization will be conducted or in a diluent compatible with the ultimate reaction mixture. The desired cocatalyst or activator and the shuttling agent may be combined with the catalyst composition either prior to, simultaneously with, or after combination with the monomers to be polymerized and any additional reaction diluent.

At all times, the individual ingredients as well as any active catalyst composition must be protected from oxygen and moisture. Therefore, the catalyst components, shuttling agent and activated catalysts must be prepared and stored in an oxygen and moisture free atmosphere, preferably a dry, inert gas such as nitrogen.

Without limiting in any way the scope of the invention, one means for carrying out such a polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_{4-10}$ hydrocarbons or mixtures thereof, especially alkanes such as hexane or mixtures of alkanes, as well as one or more of the monomers employed in the polymerization.

Catalysts (A) and (B) along with cocatalyst and chain shuttling agent are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate is controlled by the rate of catalyst addition. The ethylene content of the polymer product is determined by the ratio of ethylene to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, as is well known in the art. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, catalyst or shuttling agent gradient established between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Although not as desired, the catalyst composition may also be prepared and employed as a heterogeneous catalyst by adsorbing the requisite components on an inert inorganic or organic particulated solid, as previously disclosed. In a preferred embodiment, a heterogeneous catalyst is prepared by co-precipitating the metal complex and the reaction product of an inert inorganic compound and an active hydrogen containing activator, especially the reaction product of a tri ($C_{1-4}$ alkyl)aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or part as the diluent. As with a solution polymerization, the α-olefin comonomer or a mixture of different α-olefin monomers may be used in whole or part as the diluent. Most preferably at least a major part of the diluent comprises the α-olefin monomer or monomers to be polymerized.

Preferably for use in gas phase polymerization processes, the support material and resulting catalyst has a median particle diameter from 20 to 200 μm, more preferably from 30 μm to 150 μm, and most preferably from 50 μm to 100 μm. Preferably for use in slurry polymerization processes, the support has a median particle diameter from 1 μm to 200 μm, more preferably from 5 μm to 100 μm, and most preferably from 10 μm to 80 μm.

Suitable gas phase polymerization process for use herein are substantially similar to known processes used commercially on a large scale for the manufacture of polypropylene, ethylene/α-olefin copolymers, and other olefin polymers. The gas phase process employed can be, for example, of the type which employs a mechanically stirred bed or a gas fluidized bed as the polymerization reaction zone. Preferred is the process wherein the polymerization reaction is carried out in a vertical cylindrical polymerization reactor containing a fluidized bed of polymer particles supported or suspended above a perforated plate or fluidization grid, by a flow of fluidization gas.

The gas employed to fluidize the bed comprises the monomer or monomers to be polymerized, and also serves as a heat exchange medium to remove the heat of reaction from the bed. The hot gases emerge from the top of the reactor, normally via a tranquilization zone, also known as a velocity reduction zone, having a wider diameter than the fluidized bed and wherein fine particles entrained in the gas stream have an opportunity to gravitate back into the bed. It can also be advantageous to use a cyclone to remove ultra-fine particles from the hot gas stream. The gas is then normally recycled to the bed by means of a blower or compressor and one or more heat exchangers to strip the gas of the heat of polymerization.

A preferred method of cooling of the bed, in addition to the cooling provided by the cooled recycle gas, is to feed a volatile liquid to the bed to provide an evaporative cooling effect, often referred to as operation in the condensing mode. The volatile liquid employed in this case can be, for example, a volatile inert liquid, for example, a saturated hydrocarbon having 3 to 8, preferably 4 to 6, carbon atoms. In the case that the monomer or comonomer itself is a volatile liquid, or can be condensed to provide such a liquid, this can suitably be fed to the bed to provide an evaporative cooling effect. The volatile liquid evaporates in the hot fluidized bed to form gas which mixes with the fluidizing gas. If the volatile liquid is a monomer or comonomer, it will undergo some polymerization in the bed. The evaporated liquid then emerges from the reactor as part of the hot recycle gas, and enters the compression/heat exchange part of the recycle loop. The recycle gas is cooled in the heat exchanger and, if the temperature to which the gas is cooled is below the dew point, liquid will precipitate from the gas. This liquid is desirably recycled continuously to the fluidized bed. It is possible to recycle the precipitated liquid to the bed as liquid droplets carried in the recycle gas stream. This type of process is described, for example in EP-89691; U.S. Pat. No. 4,543,399; WO-94/25495 and U.S. Pat. No. 5,352,749. A particularly preferred method of recycling the liquid to the bed is to separate the liquid from the recycle gas stream and to reinject this liquid directly into the bed, preferably using a method which generates fine droplets of the liquid within the bed. This type of process is described in WO-94/28032.

The polymerization reaction occurring in the gas fluidized bed is catalyzed by the continuous or semi-continuous addition of catalyst composition according to the invention. The catalyst composition may be subjected to a prepolymerization step, for example, by polymerizing a small quantity of olefin monomer in a liquid inert diluent, to provide a catalyst composite comprising supported catalyst particles embedded in olefin polymer particles as well.

The polymer is produced directly in the fluidized bed by polymerization of the monomer or mixture of monomers on the fluidized particles of catalyst composition, supported catalyst composition or prepolymerized catalyst composition within the bed. Start-up of the polymerization reaction is achieved using a bed of preformed polymer particles, which are preferably similar to the desired polymer, and conditioning the bed by drying with inert gas or nitrogen prior to introducing the catalyst composition, the monomers and any other gases which it is desired to have in the recycle gas stream, such as a diluent gas, hydrogen chain transfer agent, or an inert condensable gas when operating in gas phase condensing mode. The produced polymer is discharged continuously or semi-continuously from the fluidized bed as desired.

The gas phase processes most suitable for the practice of this invention are continuous processes which provide for the continuous supply of reactants to the reaction zone of the reactor and the removal of products from the reaction zone of the reactor, thereby providing a steady-state environment on the macro scale in the reaction zone of the reactor. Products are readily recovered by exposure to reduced pressure and optionally elevated temperatures (devolatilization) according to known techniques. Typically, the fluidized bed of the gas phase process is operated at temperatures greater than 50° C., preferably from 60° C. to 110° C., more preferably from 70° C. to 110° C.

Examples of gas phase processes which are adaptable for use in the process of this invention are disclosed in U.S. Pat. Nos. 4,588,790; 4,543,399; 5,352,749; 5,436,304; 5,405,922; 5,462,999; 5,461,123; 5,453,471; 5,032,562; 5,028,670; 5,473,028; 5,106,804; 5,556,238; 5,541,270; 5,608,019; and 5,616,661.

As previously mentioned, functionalized derivatives of multi-block copolymers are also included within the present invention. Examples include metallated polymers wherein the metal is the remnant of the catalyst or chain shuttling agent employed, as well as further derivatives thereof, for example, the reaction product of a metallated polymer with an oxygen source and then with water to form a hydroxyl terminated polymer. In another embodiment, sufficient air or other quench agent is added to cleave some or all of the shuttling agent-polymer bonds thereby converting at least a portion of the polymer to a hydroxyl terminated polymer. Additional examples include olefin terminated polymers formed by β-hydride elimination and ethylenic unsaturation in the resulting polymer.

In one embodiment of the invention the multi-block copolymer may be functionalized by maleation (reaction with maleic anhydride or its equivalent), metallation (such as with an alkyl lithium reagent, optionally in the presence of a Lewis base, especially an amine, such as tetramethylethylenediamine), or by incorporation of a diene or masked olefin in a copolymerization process. After polymerization involving a masked olefin, the masking group, for example a trihydrocarbylsilane, may be removed thereby exposing a more readily functionalized remnant. Techniques for functionalization of polymers are well known, and disclosed for example in U.S. Pat. No. 5,543,458, and elsewhere.

Because a substantial fraction of the polymeric product exiting the reactor is terminated with the chain shuttling agent, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, ketone, ester, nitrile, and other functionalized terminated polymer products. Examples of suitable reaction techniques that are adaptable for use here in are described in Negishi, "Orgaonmetallics in Organic Synthesis", Vol. 1 and 2, (1980), and other standard texts in organometallic and organic synthesis.

Polymer Products

Utilizing the present process, novel polymers, especially olefin interpolymers, including multi-block copolymers of one or more olefin monomers, are readily prepared. Highly desirably, the polymers are interpolymers comprising in polymerized form ethylene and at least one $C_{3-20}$ α-olefin comonomer, and optionally one or more additional copolymerizable comonomers. Preferred α-olefins are $C_{3-8}$ α-olefins. Suitable comonomers are selected from diolefins, cyclic olefins, and cyclic diolefins, halogenated vinyl compounds, and vinylidene aromatic compounds. More particularly the present invented polymers include the following specific embodiments.

In a first embodiment, the invention is an interpolymer having at least one melting point, $T_m$, in degrees Celcius and density, $d^*$, in grams/cubic centimeter, wherein the numerical values of the variables correspond to the relationship:

$T_m > -2002.9 + 4538.5(d^*) - 2422.2(d^*)^2$, and wherein the interpolymer has a $M_w/M_n$ from 1.7 to 3.5.

In a second embodiment, the invention is an interpolymer having at least one melting point, $T_m$, in degrees Celcius and density, $d^*$, in grams/cubic centimeter, wherein the numerical values of the variables correspond to the relationship:

$T_m > -6288.1 + 13141(d^*) - 6720.3(d^*)^2$.

In a third embodiment, the invention is an interpolymer having at least one melting point, $T_m$, in degrees Celcius and density, $d^*$, in grams/cubic centimeter, wherein the numerical values of the variables correspond to the relationship:

$T_m > 858.91 - 1825.3(d^*) + 1112.8(d^*)^2$.

Figure 2:
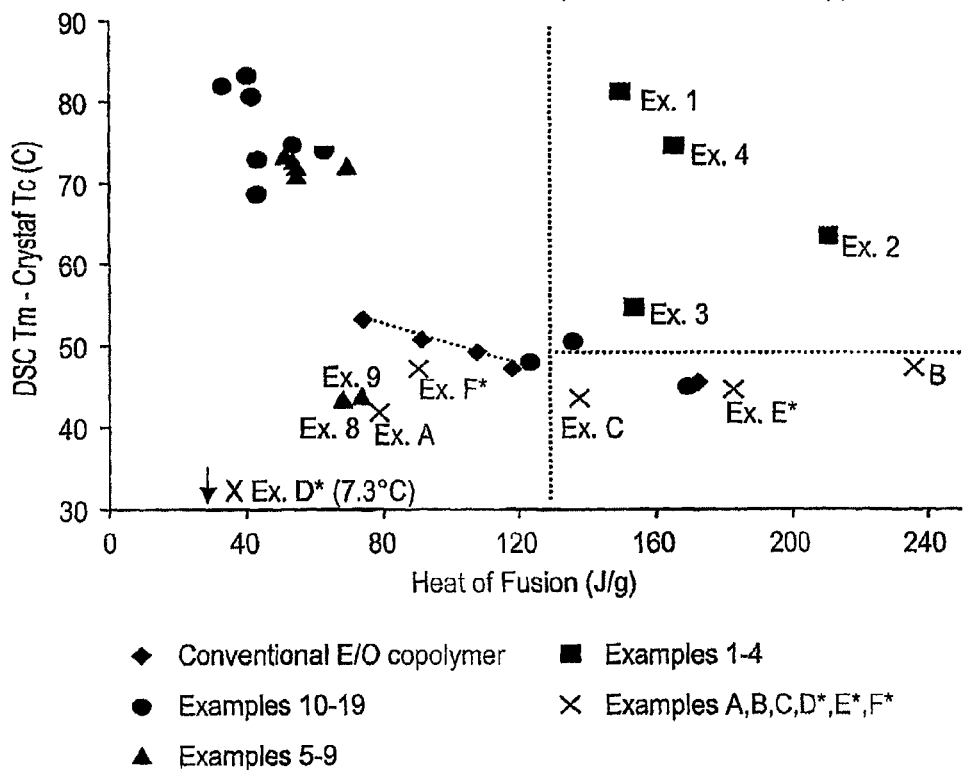
FIG. 2 shows plots of delta DSC-CRYSTAF as a function of DSC Melt Enthalpy for Examples 1-19, Comparative polymers A-F, and conventional ethylene/octene copolymers.

In a fourth embodiment, the invention comprises an interpolymer comprising in polymerized form ethylene and a $C_{3-8}$ α-olefin, said interpolymer having a delta quantity (tallest DSC peak minus tallest CRYSTAF peak) greater than the quantity, y*, defined by the equation:

$y^* > -0.1299(\Delta H) + 62.81$, preferably the equation:

$y^* > -0.1299(\Delta H) + 64.38$, and more preferably the equation:

$y^* > -0.1299(\Delta H) + 65.95$, at a heat of fusion up to 130 J/g, wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably still, the highest CRYSTAF peak comprises at least 10 percent of the cumulative polymer. FIGS. 3-27 and 36-49 show the DSC and CRYSTAF curves for many examples of the invention as well as many comparative polymers Peaks used for calculating the delta quantity, y*, are identified in each figure along with integrated area under the curve (indicating percentage of cumulative polymer). FIGS. 2 and 50 shows plotted data for examples of the invention as well as comparative examples. Integrated peak areas and peak temperatures are calculated by the computerized drawing program supplied by the instrument maker. The diagonal line shown for the random ethylene octene comparative polymers corresponds to the equation y*=−0.1299 (ΔH)+62.81.

In a fifth embodiment, the invention is an interpolymer having a tensile strength above 10 MPa, preferably a tensile strength ≥11 MPa, more preferably a tensile strength ≥13 MPa and an elongation at break of at least 600 percent, more preferably at least 700 percent, highly preferably at least 800 percent, and most highly preferably at least 900 percent at a crosshead separation rate of 11 cm/minute.

In a sixth embodiment, the invention is an interpolymer having a delta quantity (tallest DSC peak temperature (measured from the baseline) minus tallest CRYSTAF peak temperature (i.e., highest numerical value of dW/dT)) greater than 48° C. and a heat of fusion greater than or equal to 130 J/gm, wherein the CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C. More preferably still, the highest CRYSTAF peak comprises at least 10 percent of the cumulative polymer. FIGS. 3-27 and 36-49 show the DSC and CRYSTAF curves for many examples of the invention as well as many comparative polymers Peaks used for calculating the delta quantity, y*, are identified in each figure along with integrated area under the curve (indicating percentage of cumulative polymer). In FIGS. 2 and 50 the vertical line illustrates ΔH=130 J/g and the horizontal line illustrates y*=48° C.

In a seventh embodiment, the invention is an interpolymer having a storage modulus ratio, G'(25° C.)/G'(100° C.), of from 1 to 50, preferably from 1 to 20, more preferably from 1 to 10, and a 70° C. compression set of less than 80 percent, preferably less than 70 percent, especially less than 60 percent, down to a compression set of 0 percent.

In an eighth embodiment, the invention is an interpolymer having a heat of fusion of less than 85 J/g and a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In a ninth embodiment, the invention is a uncrosslinked, elastomeric, interpolymer comprising in polymerized form at least 50 mole percent ethylene, having a 70° C. compression set of less than 80 percent, preferably less than 70 percent, most preferably less than 60 percent.

In a tenth embodiment, the invention is an olefin interpolymer, preferably comprising ethylene and one or more copolymerizable comonomers in polymerized form characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C. when fractionated using TREF, characterized in that said fraction has a molar comonomer content higher, preferably at least 5 percent higher, more preferably at least 10 percent higher, than that of a comparable random ethylene interpolymer fraction eluting between the same temperatures, wherein said comparable random ethylene interpolymer comprises the same comonomer(s), and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Comonomer content may be measured using any suitable technique, with techniques based on nuclear magnetic resonance (NMR) spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said blocked interpolymers have at least one such fraction having a higher molar comonomer content than a corresponding fraction of the comparable interpolymer.

Preferably, for interpolymers of ethylene and 1-octene, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 54:
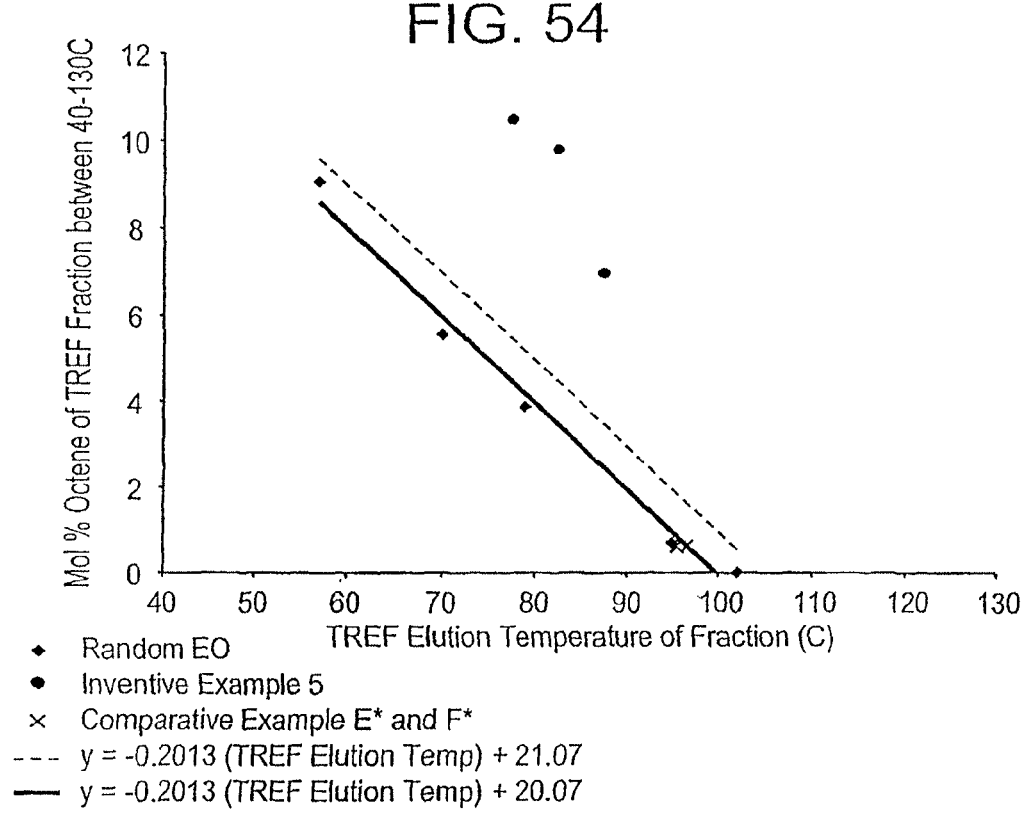
FIG. 54 is a plot of octene content of TREF fractionated ethylene/1-octene copolymer fractions versus TREF elution temperature of the fraction for the polymer of Example 5 and comparative polymers E and F.

FIG. 54 graphically depicts the foregoing embodiment of the invention for blocked interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several blocked ethylene/1-octene interpolymers of the invention (multi-block copolymers). All of the blocked interpolymer fractions have significantly higher 1-octene content than either line at equivalent elution temperatures. This result is characteristic of the multi-block copolymers of the invention and is believed to be due to the presence of differentiated blocks within the polymer chains, having both crystalline and amorphous nature.

Figure 55:
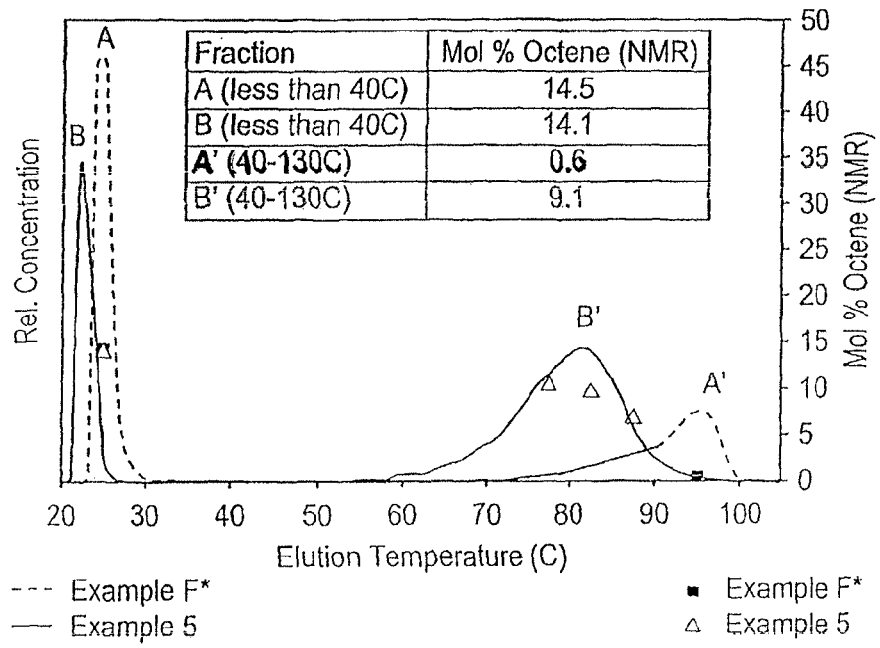
FIG. 55 is a plot of octene content of TREF fractionated ethylene/1-octene copolymer fractions versus TREF elution temperature of the fraction for the polymer of Example 5 and for comparative F.

FIG. 55 graphically displays the TREF curve and comonomer contents of polymer fractions for Example 5 and comparative F. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan will appreciate that an appropriate calibration curve may be constructed for interpolymers comprising different comonomers and a line used as a comparison fitted to the TREF values obtained from comparative interpolymers of the same monomers, preferably random copolymers madeusing a metallocene or other homogeneous catalyst composition. Blocked interpolymers corresponding to the present invention are characterized by a molar comonomer content greater than the value determined from the calibration curve at the same TREF elution temperature, preferably at least 5 percent greater, more preferably at least 10 percent greater.

For copolymers of ethylene and an α-olefin, the inventive polymers preferably possess a PDI of at least 1.7, more preferably at least 2.0, and most preferably at least 2.6, up to a maximum value of 5.0, more preferably up to a maximum of 3.5, and especially up to a maximum of 2.7, a heat of fusion of 80 J/g or less, an ethylene content of at least 50 weight percent, a glass transition temperature, $T_g$, of less than −25° C., more preferably less than −30° C., and/or one and only one $T_m$.

Figure 35:
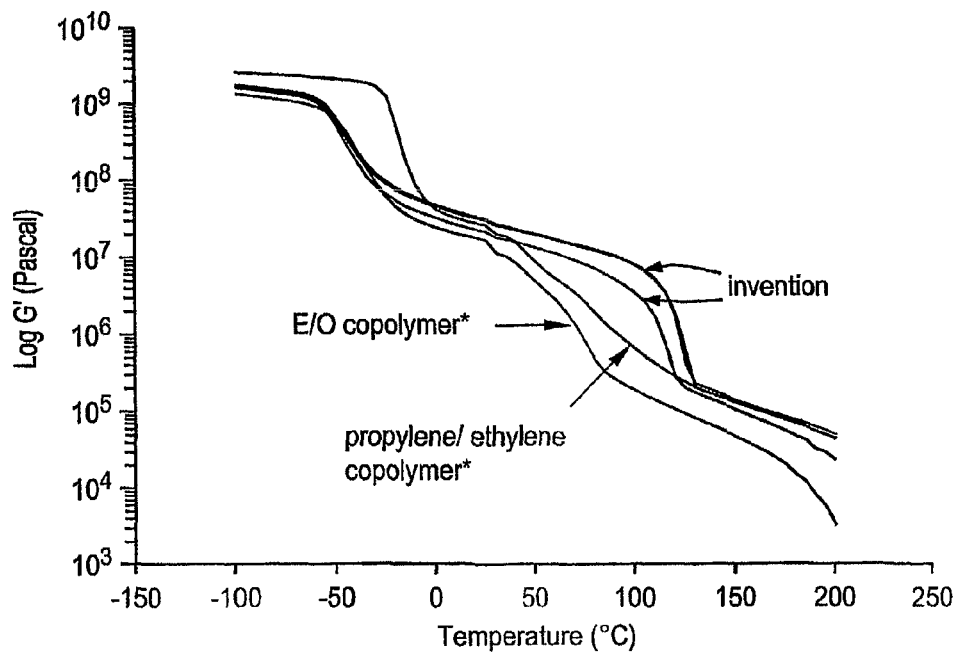
FIG. 35 is a graph of storage modulus as a function of temperature for comparative ethylene/1-octene- and propylene/ethylene-copolymers and for two ethylene/1-octene multi-block copolymers of the invention made with differing quantities of chain shuttling agent.

The polymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the present polymers can have a thermomechanical analysis penetration depth of 1 mm at a temperature of at least 104° C. as well as a flexural modulus of at least 3 kpsi (20 MPa). The inventive interpolymers may be further characterized as having a 70° C. compression set of less than 80 percent, preferably less than 70 percent, most preferably less than 60 percent. The inventive polymers further may be characterized as having an abrasion resistance (or volume loss) of less than 90 mm$^3$. Further, the inventive polymers can have, alone or in combination with any other properties herein disclosed, a storage modulus, G', such that log (G') is greater than or equal to 400 kPa, preferably greater than or equal to 1.0 MPa, at a temperature of 100° C. Moreover, the olefin polymers of the invention possess a relatively flat storage modulus as a function of temperature in the range from 0 to 100° C. (illustrated in FIG. 35) that is characteristic of block copolymers, and here-to-before unknown for an all olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.). Additionally, the polymers of the invention can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. The invented polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the invented polymers can be from 0.80 to 0.99 g/cm$^3$ and preferably for ethylene containing polymers from 0.85 g/cm$^3$ to 0.97 g/cm$^3$.

The polymers of the invention may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the polymers of the invention have better (higher) heat resistance as measured by melting point, higher TMA penetration temperature, higher high-temperature tensile strength, and/or higher high-temperature torsion storage modulus as determined by dynamic mechanical analysis. Compared to a random copolymer comprising the same monomers and monomer content, the inventive polymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Figure 28:
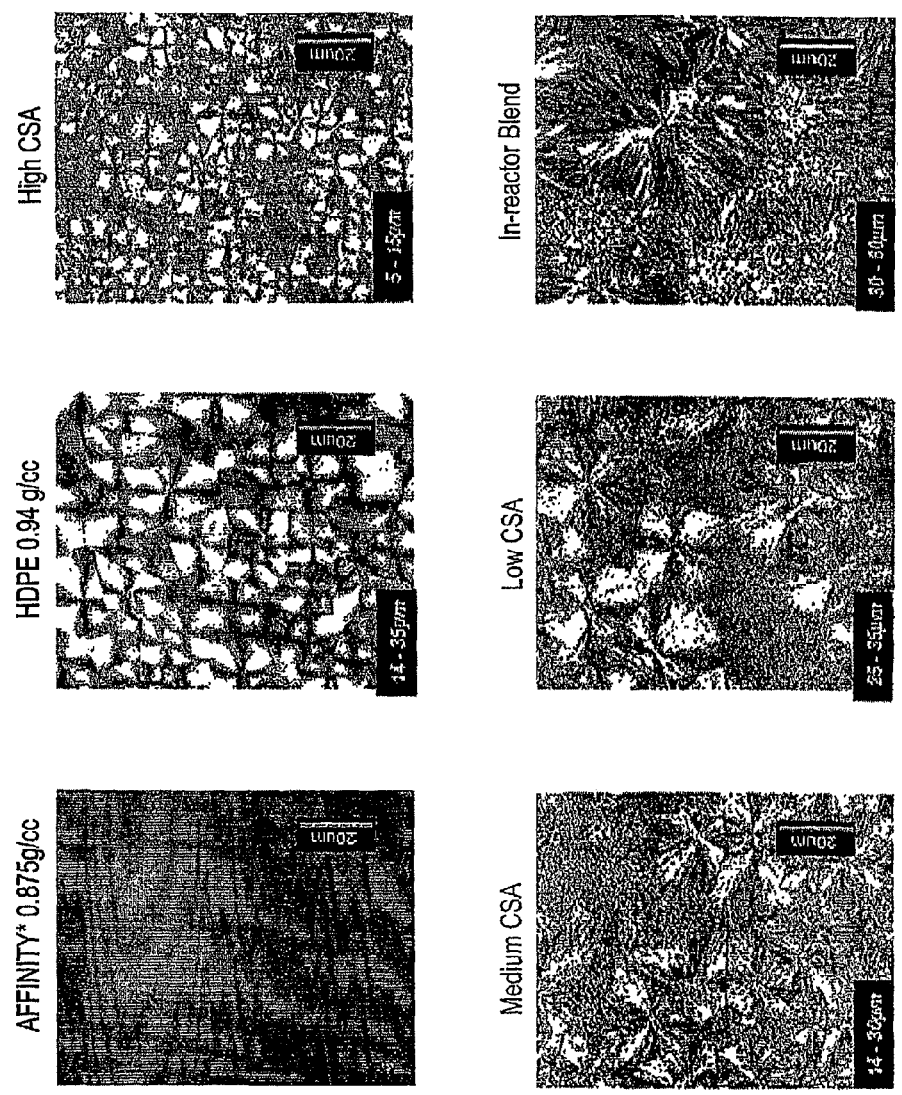
FIG. 28 is a low resolution micrograph showing crystal structure of various comparative polymers as well as polymers prepared by use of varying amounts of chain shuttling agent according to the invention.
Figure 29:
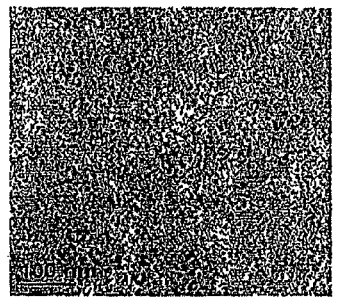
FIG. 29 is a high resolution micrograph showing the morphology of a comparative ethylene/1-octene copolymer as well as three multi-block copolymers prepared according to the invention.
Figure 29:
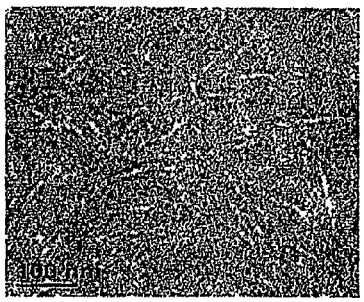
Figure 29:
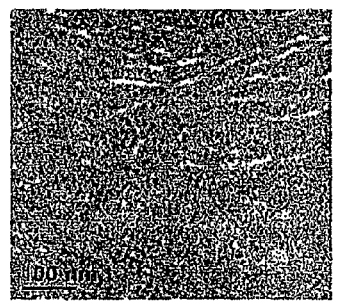
Figure 29:
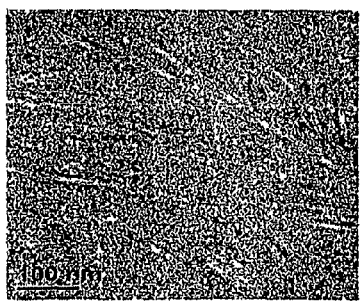

The present polymers also exhibit a unique crystallization and branching distribution relationship. That is, the present polymers have a relatively large difference between the tallest peak temperature measured using CRYSTAF and DSC as a function of heat of fusion, especially as compared to random copolymers comprising the same monomers and monomer level or physical blends of polymers, such as a blend of a high density polymer and a lower density copolymer, at equivalent overall density. It is believed that this unique feature of the invented polymers is due to the unique distribution of the comonomer in blocks within the polymer backbone. In particular, the polymer desirably comprises alternating blocks of differing comonomer content (including homopolymers blocks). The polymers desirably comprise a distribution in number and/or block size of polymer blocks of differing density or comonomer content, which is a Schultz-Flory type of distribution. In addition, the inventive polymers also have a peak melting point and crystallization temperature profile that, uniquely, is independent of polymer density/modulus morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3. The unique crystalline morphology of the invented polymers is believed to result in good barrier properties due to increased tortuosity of the crystalline morphology, which makes the polymers suitable for use in gasketing and sealing applications, such as bottle cap liners and films for produce, meat, and food packaging. FIG. 28 contains low resolution optical micrographs of pressed films showing the microcrystalline structure of three multi-block copolymers of the present invention (all having about 0.88 density) but made with differing levels of chain shuttling agent showing varied spherulitic structure as well as three comparative polymers, a substantially linear ethylene/1-octene copolymer (Affinity™ copolymer of 0.875 g/cm$^3$ density, available from The Dow Chemical Company), a linear polyethylene having density of 0.94 g/cm$^3$, and a polyethylene blend made with dual catalysts in a single reactor (in-reactor blend). FIG. 29 contains four high resolution scanning electron micrographs (100 nm scale), three taken of the above samples of the invented polymers made with high, medium and low levels of chain shuttling agent in the reactor, as well as a comparative photomicrograph of the substantially linear ethylene/1-octene copolymer (Affinity™ copolymer of 0.875 g/cm$^3$ density). Comparison of the three photographs of polymers of the invention generally show a reduction in lamellae thickness and length with increasing levels of chain shuttling agent.

Moreover, the present polymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to the invention, and the resulting crystalline blocks are highly, or substantially completely, linear, possessing little or no long chain branching.

Another surprising benefit of the invention is that polymers wherein chain ends are highly crystalline can be selectively prepared. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

Figure 34:
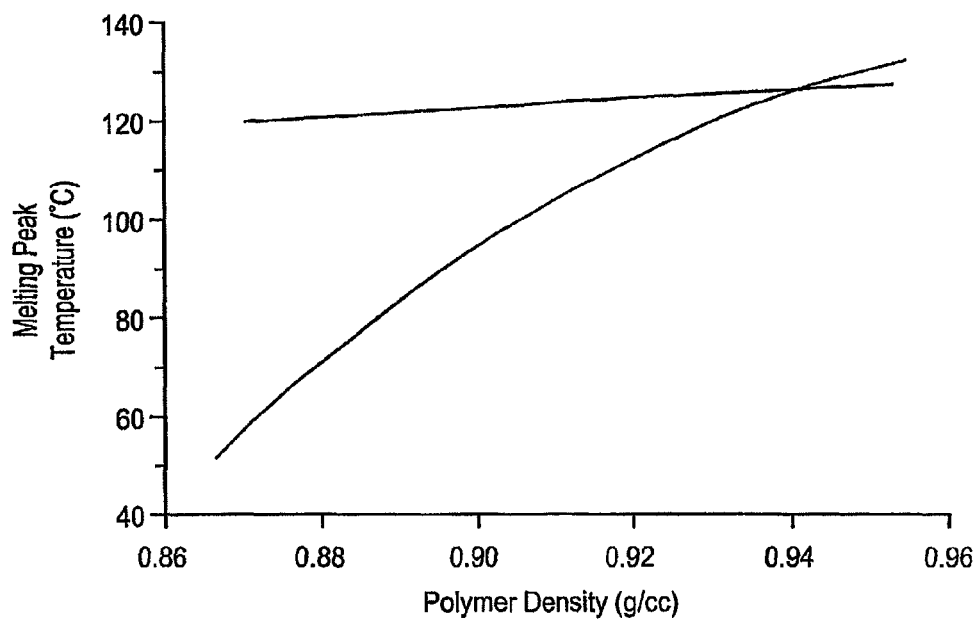
FIG. 34 is a graph of peak melting temperature versus density for multi-block ethylene/1-octene copolymers of the invention (line) as well as for typical conventional ethylene/1-octene copolymers (curve).

The ability of the present multi-block copolymers made from ethylene and a comonomer such as 1-octene to retain high melting temperature properties is illustrated by reference to FIG. 34, which is a graph of crystalline melting point as a function of density (comonomer content). At lower densities, crystalline melt temperatures are not significantly reduced compared to those of higher density multi-block copolymers according to the invention (line), whereas conventional random copolymers typically follow a well known curve reflecting loss of peak crystalline melt temperature as density is reduced.

Other highly desirable compositions according to the present invention are elastomeric interpolymers of ethylene, a $C_{3-20}$ α-olefin, especially propylene, and optionally one or more diene monomers. Preferred α-olefins for use in this embodiment of the present invention are designated by the formula $CH_2$=CHR*, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes containing from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

Desirably, the polymers of the invention made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers of this embodiment of the invention have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250.

More preferably, such polymers have an ethylene content from 65 to 75 percent, a diene content from 0 to 6 percent, and an α-olefin content from 20 to 35 percent.

The polymer may be oil extended with from 5 to about 75 percent, preferably from 10 to 60 percent, more preferably from 20 to 50 percent, based on total composition weight, of a processing oil. Suitable oils include any oil that is conventionally used in manufacturing extended EPDM rubber formulations. Examples include both naphthenic- and paraffinic-oils, with paraffinic oils being preferred.

Highly desirably a curable EPDM rubber formulation is prepared by incorporation of one or more curing agents along with conventional accelerators or other adjuvants. Suitable curing agents are sulfur based. Examples of suitable sulfur based curing agents include, but are not limited to, sulfur, tetramethylthiuram disulfide (TMTD), dipentamethylenethiuram tetrasulfide (DPTT), 2-mercaptobenzothiazole (MBT), 2-mercaptobenzothiazolate disulfide (MBTS), zinc-2-mercaptobenozothiazolate (ZMBT), zinc diethyldithiocarbamatezinc (ZDEC), zinc dibutyldithiocarbamate (ZDBC), dipentamethylenethiuram tetrasulfide (DPTT), N-t-butylbenzothiazole-2-sulfanamide (TBBS), and mixtures thereof. A preferred cure system includes a combination of sulfur, MBT and TMTD. Desirably, the foregoing components are employed in amounts from 0.1 to 5 percent, based on total composition weight.

A preferred elastomer composition according to this embodiment of the invention may also include carbon black. Preferably, the carbon black is present in the amount of from 10 to 80 percent, more preferably from 20 to 60 percent, based on total composition weight.

Additional components of the present formulations usefully employed according to the present invention include various other ingredients in amounts that do not detract from the properties of the resultant composition. These ingredients include, but are not limited to, activators such as calcium or magnesium oxide; fatty acids such as stearic acid and salts thereof; fillers and reinforcers such as calcium or magnesium carbonate, silica, and aluminum silicates; plasticizers such as dialkyl esters of dicarboxylic acids; antidegradants; softeners; waxes; and pigments.

Applications and End Uses

The polymers of the invention can be useful employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the present polymers, include blends with other natural or synthetic polymers, additives, reinforcing agents, ignition resistant additives, antioxidants, stabilizers, colorants, extenders, crosslinkers, blowing agents, and plasticizers. Of particular utility are multi-component fibers such as core/sheath fibers, having an outer surface layer, comprising at least in part, one or more polymers of the invention.

Fibers that may be prepared from the present polymers or blends include staple fibers, tow, multicomponent, sheath/core, twisted, and monofilament. Suitable fiber forming processes include spinbonded, melt blown techniques, as disclosed in U.S. Pat. Nos. 4,430,563, 4,663,220, 4,668,566, and 4,322,027, gel spun fibers as disclosed in U.S. Pat. No. 4,413,110, woven and nonwoven fabrics, as disclosed in U.S. Pat. No. 3,485,706, or structures made from such fibers, including blends with other fibers, such as polyester, nylon or cotton, thermoformed articles, extruded shapes, including profile extrusions and co-extrusions, calendared articles, and drawn, twisted, or crimped yarns or fibers. The new polymers described herein are also useful for wire and cable coating operations, as well as in sheet extrusion for vacuum forming operations, and forming molded articles, including the use of injection molding, blow molding process, or rotomolding processes. Compositions comprising the olefin polymers can also be formed into fabricated articles such as those previously mentioned using conventional polyolefin processing techniques which are well known to those skilled in the art of polyolefin processing.

Dispersions (both aqueous and non-aqueous) can also be formed using the present polymers or formulations comprising the same. Frothed foams comprising the invented polymers can also be formed, as disclosed in PCT application No. 2004/027593, filed Aug. 25, 2004. The polymers may also be crosslinked by any known means, such as the use of peroxide, electron beam, silane, azide, or other cross-linking technique. The polymers can also be chemically modified, such as by grafting (for example by use of maleic anhydride (MAH), silanes, or other grafting agent), halogenation, amination, sulfonation, or other chemical modification.

Additives and adjuvants may be included in any formulation comprising the present polymers. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers according to the invention.

Suitable polymers for blending with the polymers of the invention include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler Natta LLDPE, metallocene PE, including multiple reactor PE ("in reactor" blends of Ziegler-Natta PE and metallocene PE, such as products disclosed in U.S. Pat. Nos. 6,545,088, 6,538,070, 6,566,446, 5,844,045, 5,869,575, and 6,448,341, ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example polymers available under the trade designation VERSIFY™ available from The Dow Chemical Company and VISTAMAXX™ available from ExxonMobil can also be useful as components in blends comprising the present polymers.

Suitable end uses for the foregoing products include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

In a highly desired embodiment of the invention thermoplastic compositions comprising a thermoplastic matrix polymer, especially isotactic polypropylene, and an elastomeric multi-block copolymer of ethylene and a copolymerizable comonomer according to the invention, are uniquely capable of forming core-shell type particles having hard crystalline or semi-crystalline blocks in the form of a core surrounded by soft or elastomeric blocks forming a "shell" around the occluded domains of hard polymer. These particles are formed and dispersed within the matrix polymer by the forces incurred during melt compounding or blending. This highly desirable morphology is believed to result due to the unique physical properties of the multi-block copolymers which enable compatible polymer regions such as the matrix and higher comonomer content elastomeric regions of the multi-block copolymer to self-assemble in the melt due to thermodynamic forces. Shearing forces during compounding are believed to produce separated regions of matrix polymer encircled by elastomer. Upon solidifying, these regions become occluded elastomer particles encased in the polymer matrix.

Particularly desirable blends are thermoplastic polyolefin blends (TPO), thermoplastic elastomer blends (TPE), thermoplastic vulcanisites (TPV) and styrenic polymer blends. TPE and TPV blends may be prepared by combining the invented multi-block polymers, including functionalized or unsaturated derivatives thereof with an optional rubber, including conventional block copolymers, especially an SBS block copolymer, and optionally a crosslinking or vulcanizing agent. TPO blends are generally prepared by blending the invented multi-block copolymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779.

Suitable conventional block copolymers for this application desirably possess a Mooney viscosity (ML 1+4 @ 100° C.) in the range from 10 to 135, more preferably from 25 to 100, and most preferably from 30 to 80. Suitable polyolefins especially include linear or low density polyethylene, polypropylene (including atactic, isotactic, syndiotactic and impact modified versions thereof) and poly(4-methyl-1-pentene). Suitable styrenic polymers include polystyrene, rubber modified polystyrene (HIPS), styrene/acrylonitrile copolymers (SAN), rubber modified SAN (ABS or AES) and styrene maleic anhydride copolymers.

The blends may be prepared by mixing or kneading the respective components at a temperature around or above the melt point temperature of one or both of the components. For most multiblock copolymers, this temperature may be above 130° C., most generally above 145° C., and most preferably above 150° C. Typical polymer mixing or kneading equipment that is capable of reaching the desired temperatures and melt plastifying the mixture may be employed. These include mills, kneaders, extruders (both single screw and twin-screw), Banbury mixers, calendars, and the like. The sequence of mixing and method may depend on the final composition. A combination of Banbury batch mixers and continuous mixers may also be employed, such as a Banbury mixer followed by a mill mixer followed by an extruder. Typically, a TPE or TPV composition will have a higher loading of cross-linkable polymer (typically the conventional block copolymer containing unsaturation) compared to TPO compositions. Generally, for TPE and TPV compositions, the weight ratio of block copolymer to multi-block copolymer maybe from about 90:10 to 10:90, more preferably from 80:20 to 20:80, and most preferably from 75:25 to 25:75. For TPO applications, the weight ratio of multi-block copolymer to polyolefin may be from about 49:51 to about 5:95, more preferably from 35:65 to about 10:90. For modified styrenic polymer applications, the weight ratio of multi-block copolymer to polyolefin may also be from about 49:51 to about 5:95, more preferably from 35:65 to about 10:90. The ratios may be changed by changing the viscosity ratios of the various components. There is considerable literature illustrating techniques for changing the phase continuity by changing the viscosity ratios of the constituents of a blend and a person skilled in this art may consult if necessary.

The blend compositions may contain processing oils, plasticizers, and processing aids. Rubber processing oils have a certain ASTM designation and paraffinic, napthenic or aromatic process oils are all suitable for use. Generally from 0 to 150 parts, more preferably 0 to 100 parts, and most preferably from 0 to 50 parts of oil per 100 parts of total polymer are employed. Higher amounts of oil may tend to improve the processing of the resulting product at the expense of some physical properties. Additional processing aids include conventional waxes, fatty acid salts, such as calcium stearate or zinc stearate, (poly)alcohols including glycols, (poly)alcohol ethers, including glycol ethers, (poly)esters, including (poly) glycol esters, and metal salt-, especially Group 1 or 2 metal or zinc-, salt derivatives thereof.

It is known that non-hydrogenated rubbers such as those comprising polymerized forms of butadiene or isoprene, including block copolymers (here-in-after diene rubbers), have lower resistance to UV, ozone, and oxidation, compared to mostly or highly saturated rubbers. In applications such as tires made from compositions containing higher concentrations of diene based rubbers, it is known to incorporate carbon black to improve rubber stability, along with anti-ozone additives and anti-oxidants. Multi-block copolymers according to the present invention possessing extremely low levels of unsaturation, find particular application as a protective surface layer (coated, coextruded or laminated) or weather resistant film adhered to articles formed from conventional diene elastomer modified polymeric compositions.

For conventional TPO, TPV, and TPE applications, carbon black is the additive of choice for UV absorption and stabilizing properties. Representative examples of carbon blacks include ASTM N110, N121, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and average pore volumes ranging from 10 to 150 $cm^3/100$ g. Generally, smaller particle sized carbon blacks are employed, to the extent cost considerations permit. For many such applications the present multi-block copolymers and blends thereof require little or no carbon black, thereby allowing considerable design freedom to include alternative pigments or no pigments at all. Multi-hued tires or tires matching the color of the vehicle are one possibility.

Compositions, including thermoplastic blends according to the invention may also contain anti-ozonants or anti-oxidants that are known to a rubber chemist of ordinary skill. The anti-ozonants may be physical protectants such as waxy materials that come to the surface and protect the part from oxygen or ozone or they may be chemical protectors that react with oxygen or ozone. Suitable chemical protectors include styrenated phenols, butylated octylated phenol, butylated di(dimethylbenzyl) phenol, p-phenylenediamines, butylated reaction products of p-cresol and dicyclopentadiene (DCPD), polyphenolic anitioxidants, hydroquinone derivatives, quinoline, diphenylene antioxidants, thioester antioxidants, and blends thereof. Some representative trade names of such products are Wingstay™ S antioxidant, Polystay™ 100 antioxidant, Polystay™ 100 AZ antioxidant, Polystay™ 200 antioxidant, Wingstay™ L antioxidant, Wingstay™ LHLS antioxidant, Wingstay™ K antioxidant, Wingstay™ 29 antioxidant, Wingstay™ SN-1 antioxidant, and Irganox™ antioxidants. In some applications, the anti-oxidants and anti-ozonants used will preferably be non-staining and non-migratory.

For providing additional stability against UV radiation, hindered amine light stabilizers (HALS) and UV absorbers may be also used. Suitable examples include Tinuvin™ 123, Tinuvin™ 144, Tinuvin™ 622, Tinuvin™ 765, Tinuvin™ 770, and Tinuvin™ 780, available from Ciba Specialty Chemicals, and Chemisorb™ T944, available from Cytex Plastics, Houston Tex., USA. A Lewis acid may be additionally included with a HALS compound in order to achieve superior surface quality, as disclosed in U.S. Pat. No. 6,051,681.

For some compositions, additional mixing process may be employed to pre-disperse the anti-oxidants, anti-ozonants, carbon black, UV absorbers, and/or light stabilizers to form a masterbatch, and subsequently to form polymer blends there from.

Suitable crosslinking agents (also referred to as curing or vulcanizing agents) for use herein include sulfur based, peroxide based, or phenolic based compounds. Examples of the foregoing materials are found in the art, including in U.S. Pat. Nos. 3,758,643, 3,806,558, 5,051,478, 4,104,210, 4,130,535, 4,202,801, 4,271,049, 4,340,684, 4,250,273, 4,927,882, 4,311,628 and 5,248,729.

When sulfur based curing agents are employed, accelerators and cure activators may be used as well. Accelerators are used to control the time and/or temperature required for dynamic vulcanization and to improve the properties of the resulting cross-linked article. In one embodiment, a single accelerator or primary accelerator is used. The primary accelerator(s) may be used in total amounts ranging from about 0.5 to about 4, preferably about 0.8 to about 1.5, phr, based on total composition weight. In another embodiment, combinations of a primary and a secondary accelerator might be used with the secondary accelerator being used in smaller amounts, such as from about 0.05 to about 3 phr, in order to activate and to improve the properties of the cured article. Combinations of accelerators generally produce articles having properties that are somewhat better than those produced by use of a single accelerator. In addition, delayed action accelerators may be used which are not affected by normal processing temperatures yet produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents may be used in combination therewith. Suitable coagents include trimethylolpropane triacrylate (TMPTA), trimethylolpropane trimethacrylate (TMPTMA), triallyl cyanurate (TAC), triallyl isocyanurate (TAIC), among others. Use of peroxide crosslinkers and optional coagents used for partial or complete dynamic vulcanization are known in the art and disclosed for example in the publication, "Peroxide Vulcanization of Elastomer", Vol. 74, No 3, July-August 2001.

When the multi-block copolymer containing composition is at least partially crosslinked, the degree of crosslinking may be measured by dissolving the composition in a solvent for specified duration, and calculating the percent gel or unextractable component. The percent gel normally increases with increasing crosslinking levels. For cured articles according to the invention, the percent gel content is desirably in the range from 5 to 100 percent.

The multi-block copolymers of the invention as well as blends thereof possess improved processability compared to prior art compositions, due, it is believed, to lower melt viscosity. Thus, the composition or blend demonstrates an improved surface appearance, especially when formed into a molded or extruded article. At the same time, the present compositions and blends thereof uniquely possess improved melt strength properties, thereby allowing the present multi-block copolymers and blends thereof, especially TPO blends, to be usefully employed in foam and thermoforming applications where melt strength is currently inadequate.

Thermoplastic compositions according to the invention may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titanias. Silane based or other coupling agents may also be employed for better filler bonding.

The thermoplastic compositions of this invention, including the foregoing blends, may be processed by conventional molding techniques such as injection molding, extrusion molding, thermoforming, slush molding, over molding, insert molding, blow molding and other techniques. Films, including multi-layer films, may be produced by cast or tentering processes, including blown film processes.

Testing Methods

In the foregoing characterizing disclosure and the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400–600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30'C at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg Of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Abrasion Resistance

Abrasion resistance is measured on compression molded plaques according to ISO 4649. The average value of 3 measurements is reported. Plaques for the test are 6.4 mm thick and compression molded using a hot press (Carver Model #4095-4PR1001R). The pellets are placed between polytetrafluoroethylene sheets, heated at 190° C. at 55 psi (380 kPa) for 3 minutes, followed by 1.3 MPa for 3 minutes, and then 2.6 MPa for 3 minutes. Next the plaques are cooled in the press with running cold water at 1.3 MPa for 1 minute and removed for testing.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 mL/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)):

$M_{polyethylene} = 0.431(M_{polystyrene})$.

Polyetheylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter x 3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Pellet Blocking Strength

Pellets (150 g) are loaded into a 2″ (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available form Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data is collected using a JEOL Eclipse™ 400 MHz spectrometer or a Varian Unity Plus™ 400 MHz spectrometer, corresponding to a $^{13}$C resonance frequency of 100.5 MHz. The data is acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989).

Atomic Force Microscopy (AFM)

Sections are collected from the sample material using a Leica UCT™ microtome with a FC cryo-chamber operated at −80° C. A diamond knife is used to section all sample material to a thickness of 120 nm. Sections are placed on freshly cleaved mica surfaces, and mounted on standard AFM specimen metal support disks with a double carbon tape. The sections are examined with a DI NanoScope IV™ Multi-Mode AFM, in tapping mode with phase detection. Nanosensor tips are used in all experiments.

Specific Embodiments

The following specific embodiments of the invention and combinations thereof are especially desirable and hereby delineated in order to provide detailed disclosure for the appended claims.

1. A composition comprising the admixture or reaction product resulting from combining:
    (A) a first olefin polymerization catalyst,
    (B) a second olefin polymerization catalyst capable of preparing polymers differing in chemical or physical properties from the polymer prepared by catalyst (A) under equivalent polymerization conditions, and
    (C) a chain shuttling agent.

1a. A composition comprising the admixture or reaction product resulting from combining:
    (A) a first olefin polymerization catalyst having a high comonomer incorporation index,
    (B) a second olefin polymerization catalyst having a comonomer incorporation index less than 95 percent, preferably less than 90 percent, more preferably less than 25 percent, and most preferably less than 10 percent of the comonomer incorporation index of catalyst (A), and
    (C) a chain shuttling agent.

2. A method for selecting an admixture of catalysts (A) and (B) and chain shuttling agent (C) according to embodiment 1) or 1a) that is capable of producing a multi-block copolymer by contacting an olefin monomer or mixture of monomers with said admixture under olefin polymerization conditions.

3. A process for preparing a multi-block copolymer comprising contacting one or more addition polymerizable monomers under addition polymerization conditions with a composition comprising:
    the admixture or reaction product resulting from combining:
    (A) a first olefin polymerization catalyst,
    (B) a second olefin polymerization catalyst capable of preparing polymers differing in chemical or physical properties from the polymer prepared by catalyst (A) under equivalent polymerization conditions, and
    (C) a chain shuttling agent.

3a. A process for preparing a multi-block copolymer comprising contacting one or more addition polymerizable monomers under addition polymerization conditions with a composition comprising:
    the admixture or reaction product resulting from combining:
    (A) a first olefin polymerization catalyst having a high comonomer incorporation index,
    (B) a second olefin polymerization catalyst having a comonomer incorporation index less than 90 percent, preferably less than 50 percent, most preferably less than 5 percent of the comonomer incorporation index of catalyst (A), and
    (C) a chain shuttling agent.

4. A multi-block copolymer comprising in polymerized form one or more addition polymerizable monomers, said copolymer containing therein two or more, preferably three or more segments or blocks differing in comonomer content, crystallinity, tacticity, homogeneity, density, melting point or glass transition temperature, preferably said copolymer possessing a molecular weight distribution, Mw/Mn, of less than 3.0, more preferably less than 2.8.

4a. A multi-block copolymer comprising in polymerized form ethylene and one or more copolymerizable comonomers, said copolymer containing therein two or more, preferably three or more segments or blocks differing in comonomer content, crystallinity, tacticity, homogeneity, density, melting point or glass transition temperature, preferably said copolymer possessing a molecular weight distribution, Mw/Mn, of less than 3.0, more preferably less than 2.8.

5. A functionalized derivative of the multi-block copolymer of embodiment 4.

6. A functionalized derivative of the multi-block copolymer of embodiment 4a.

7. An olefin interpolymer having at least one melting point, $T_m$, in degrees Celcius and density, $d^*$, in grams/cubic centimeter, wherein the numerical values of the variables correspond to the relationship:

$$T_m > -2002.9 + 4538.5(d^*) - 2422.2(d^*)^2, \text{ and wherein the interpolymer has a } M_w/M_n \text{ from 1.7 to 3.5.}$$

8. An interpolymer comprising in polymerized form ethylene and a $C_{3-8}$ α-olefin having at least one melting point, $T_m$, in degrees Celcius and density, $d^*$, in grams/cubic centimeter, wherein the numerical values of the variables correspond to the relationship:

$$T_m > -2002.9 + 4538.5(d^*) - 2422.2(d^*)^2.$$

9. A multi-block copolymer comprising in polymerized form ethylene and one or more copolymerizable comonomers having at least one melting point, $T_m$, in degrees Celcius and density, $d^*$, in grams/cubic centimeter wherein the numerical values of the variables correspond to the relationship:

$$T_m > -2002.9 + 4538.5(d^*) - 2422.2(d^*)^2.$$

10. An olefin interpolymer having a Mw/Mn from 1.7 to 3.5,
a delta quantity (tallest DSC peak minus tallest CRYSTAF peak) greater than the quantity, $y^*$, defined by the equation:

$$y^* > -0.1299(\Delta H) + 62.81, \text{ preferably the equation:}$$

$$y^* > -0.1299(\Delta H) + 64.38, \text{ and more preferably the equation:}$$

$$y^* > -0.1299(\Delta H) + 65.95,$$

and a heat of fusion up to 130 J/g,
wherein the CRYSTAF peak is determined using at least 5 percent of the cumulative polymer, and if less than 5 percent of the polymer has an identifiable CRYSTAF peak, then the CRYSTAF temperature is 30° C., and ΔH is the numerical value of the heat of fusion in J/g.

10a. An interpolymer comprising in polymerized form ethylene and a $C_{3-8}$ α-olefin, said interpolymer having a delta quantity (tallest DSC peak minus tallest CRYSTAF peak) greater than the quantity, $y^*$, defined by the equation:

$$y^* > -0.1299(\Delta H) + 62.81, \text{ preferably the equation:}$$

$$y^* > -0.1299(\Delta H) + 64.38, \text{ and more preferably the equation:}$$

$$y^* > -0.1299(\Delta H) + 65.95,$$

and a heat of fusion up to 130 J/g,
wherein the CRYSTAF peak is determined using at least 5 percent of the cumulative polymer, and if less than 5 percent of the polymer has an identifiable CRYSTAF peak, then the CRYSTAF temperature is 30° C., and ΔH is the numerical value of the heat of fusion in J/g.

10b. A multi-block copolymer having a delta quantity (tallest DSC peak minus tallest CRYSTAF peak) greater than the quantity, $y^*$, defined by the equation:

$$y^* > -0.1299(\Delta H) + 62.81, \text{ preferably the equation:}$$

$$y^* > -0.1299(\Delta H) + 64.38, \text{ and more preferably the equation:}$$

$$y^* > -0.1299(\Delta H) + 65.95,$$

and a heat of fusion up to 130 J/g,
wherein the CRYSTAF peak is determined using at least 5 percent of the cumulative polymer, and if less than 5 percent of the polymer has an identifiable CRYSTAF peak, then the CRYSTAF temperature is 30° C., and ΔH is the numerical value of the heat of fusion in J/g.

11. An olefin interpolymer having a tensile strength above 10 MPa, preferably a tensile strength ≥11 MPa, more preferably a tensile strength ≥13 MPa and an elongation at break of at least 600 percent, more preferably at least 700 percent, highly preferably at least 800 percent, and most highly preferably at least 900 percent at a crosshead separation rate of 11 cm/minute.

11a. A multi-block copolymer comprising in polymerized form ethylene and one or more copolymerizable comonomers having a tensile strength above 10 MPa, preferably a tensile strength ≥11 MPa, more preferably a tensile strength ≥13 MPa and an elongation at break of at least 600 percent, more preferably at least 700 percent, highly preferably at least 800 percent, and most highly preferably at least 900 percent at a crosshead separation rate of 11 cm/minute.

12. An olefin interpolymer having a delta quantity (tallest DSC peak (measured from the baseline) minus tallest CRYSTAF peak) greater than 48° C. and a heat of fusion greater than or equal to 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

12a. A multi-block copolymer comprising in polymerized form ethylene and one or more copolymerizable comonomers having a delta quantity (tallest DSC peak (measured from the baseline) minus tallest CRYSTAF peak) greater than 48° C. and a heat of fusion greater than or equal to 130 J/g, wherein the CRYSTAF peak is determined using at least 5 percent of the cumulative polymer, and if less than 5 percent of the polymer has an identifiable CRYSTAF peak, then the CRYSTAF temperature is 30° C.

13. An olefin interpolymer having a storage modulus ratio, G'(25° C.)/G'(100° C.), of from 1 to 50, preferably from 1 to 20, more preferably from 1 to 10, and a 70° C. compression set of less than 80 percent, preferably less than 70 percent, especially less than 60 percent, down to a compression set of 0 percent.

13a. A multi-block copolymer comprising in polymerized form ethylene and one or more copolymerizable comonomers having a storage modulus ratio, G'(25° C.)/G'(100° C.), of from 1 to 50, preferably from 1 to 20, more preferably from 1 to 10, and a 70° C. compression set of less than 80 percent, preferably less than 70 percent, especially less than 60 percent, down to a compression set of 0 percent.

14. An olefin interpolymer having a heat of fusion of less than 85 J/g, preferably less than 80 J/g, and a pellet blocking strength of equal to or less than 100 lbs/ft² (4800 Pa), preferably equal to or less than 50 lbs/ft² (2400 Pa), especially equal to or less than 5 lbs/ft² (240 Pa), and as low as 0 lbs/ft² (0 Pa).

14a. A multi-block copolymer comprising in polymerized form ethylene and one or more copolymerizable comonomers having a heat of fusion of less than 85 J/g, preferably less than 80 J/g, and a pellet blocking strength of equal to or less than 100 lbs/ft² (4800 Pa), preferably equal to or less than 50 lbs/ft² (2400 Pa), especially equal to or less than 5 lbs/ft² (240 Pa), and as low as 0 lbs/ft² (0 Pa).

15. An uncrosslinked, elastomeric, olefin interpolymer comprising in polymerized form at least 50 mole percent ethylene, having a 70° C. compression set of less than 80 percent, preferably less than 70 percent, most preferably less than 60 percent.

15a. An uncrosslinked, elastomeric, multi-block copolymer comprising in polymerized form at least 50 mole percent ethylene, having a 70° C. compression set of less than 80 percent, preferably less than 70 percent, most preferably less than 60 percent.

16. A polymer according to any one of embodiments 4-15, 4a, 5a, 10a-15a, 10b, or preparable by the method of embodiment 3 or 3a containing a single crystalline melting point (Tm) as measured by DSC.

17. A polymer according to any one of embodiments 4-15, 4a, 5a, 10a-15a, 10b, or preparable by the method of embodiment 3 or 3a having a thermomechanical analysis penetration depth of 1 mm at a temperature of at least 90° C., preferably a temperature of at least 100° C., and a flexural modulus of from 3 kpsi (20 MPa) to 13 kpsi (90 MPa).

18. A polymer according to embodiment 16 having a thermomechanical analysis penetration depth of 1 mm at a temperature of at least 90° C., preferably a temperature of at least 100° C., and a flexural modulus of from 3 kpsi (20 MPa) to 13 kpsi (90 MPa).

19. A polymer according to any one of embodiments 4-15, 4a, 5a, 10a-15a, 10b, or preparable by the method of embodiment 3 or 3a having an abrasion resistance volume loss according to ISO 4649 of less than 90 mm$^3$.

20. A polymer according to embodiment 16 having an abrasion resistance volume loss according to ISO 4649 of less than 90 mm$^3$.

21. A polymer according to embodiment 17 having an abrasion resistance volume loss according to ISO 4649 of less than 90 mm$^3$.

22. A polymer according to embodiment 18 having an abrasion resistance volume loss according to ISO 4649 of less than 90 mm$^3$.

23. A polymer according to any one of embodiments 4-15, 4a, 5a, 10a-15a, 10b, or preparable by the method of embodiment 3 or 3a having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

24. A polymer according to embodiment 16 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

25. A polymer according to embodiment 17 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

26. A polymer according to embodiment 18 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

27. A polymer according to embodiment 19 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

28. A polymer according to embodiment 20 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

29. A polymer according to embodiment 21 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

30. A polymer according to embodiment 22 having an abrasion resistance volume loss according to ISO 4649 of less than 90 mm$^3$ and having a storage modulus, G', such that log (G') is greater than or equal to 0.4 MPa, preferably greater than or equal to 1.0 MPa, at a temperature of 100° C.

31. A crosslinked derivative of a polymer according to any one of embodiments 4-15, 4a, 5a, 10a-15a, 10b, or preparable by the method of embodiment 3 or 3a.

32. A crosslinked derivative of a polymer according to embodiment 16.

33. A crosslinked derivative of a polymer according to embodiment 17.

34. A crosslinked derivative of a polymer according to embodiment 18.

35. A crosslinked derivative of a polymer according to embodiment 19.

36. A crosslinked derivative of a polymer according to embodiment 20.

37. A crosslinked derivative of a polymer according to embodiment 21.

38. A crosslinked derivative of a polymer according to embodiment 22.

39. A crosslinked derivative of a polymer according to embodiment 23.

40. A crosslinked derivative of a polymer according to embodiment 24.

41. A crosslinked derivative of a polymer according to embodiment 25.

42. A crosslinked derivative of a polymer according to embodiment 26.

43. A crosslinked derivative of a polymer according to embodiment 27.

44. A crosslinked derivative of a polymer according to embodiment 28.

45. A crosslinked derivative of a polymer according to embodiment 29.

46. A crosslinked derivative of a polymer according to embodiment 30.

47. A polymer according to any one of embodiments 4-15, 4a, 5a, 10a-15a, 10b, or preparable by the method of embodiment 3 or 3a, or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

48. A polymer according to embodiment 16 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

49. A polymer according to embodiment 17 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

50. A polymer according to embodiment 18 or a composition comprising the same in the form of a film, at least one 51. A polymer according to embodiment 19 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

52. A polymer according to embodiment 20 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

53. A polymer according to embodiment 21 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

54. A polymer according to embodiment 22 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

55. A polymer according to embodiment 23 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

56. A polymer according to embodiment 24 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

57. A polymer according to embodiment 25 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

58. A polymer according to embodiment 26 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

59. A polymer according to embodiment 27 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

60. A polymer according to embodiment 28 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

61. A polymer according to embodiment 29 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

62. A polymer according to embodiment 30 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

63. A polymer according to embodiment 31 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

64. A polymer according to embodiment 32 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

65. A polymer according to embodiment 33 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

66. A polymer according to embodiment 34 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

67. A polymer according to embodiment 35 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

68. A polymer according to embodiment 36 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

69. A polymer according to embodiment 37 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

70. A polymer according to embodiment 38 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

71. A polymer according to embodiment 39 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

72. A polymer according to embodiment 40 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

73. A polymer according to embodiment 41 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

74. A polymer according to embodiment 42 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

75. A polymer according to embodiment 43 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

76. A polymer according to embodiment 44 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

77. A polymer according to embodiment 45 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

78. A polymer according to embodiment 46 or a composition comprising the same in the form of a film, at least one layer of a multilayer film, at least one layer of a laminated article, a foamed article, a fiber, a nonwoven fabric, an injection molded article, a blow molded article, a roto-molded article, or an adhesive.

79. A composition according to embodiment 1 or 1a wherein the shuttling agent is a trihydrocarbyl aluminum- or dihydrocarbyl zinc-compound containing from 1 to 12 carbons in each hydrocarbyl group.

80. A composition according to embodiment 79 wherein the shuttling agent is triethylaluminum or diethylzinc.

81. A composition according to embodiment 1 or 1a wherein catalyst (A) comprises a complex comprising a transition metal selected from Groups 4-8 of the Periodic Table of the Elements and one or more delocalized, π-bonded ligands or polyvalent Lewis base ligands.

82. A composition according to embodiment 81 wherein catalyst (A) corresponds to the formula:

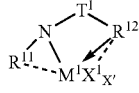

wherein:
$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

83. A composition according to embodiment 82 wherein catalyst (B) corresponds to the formula:

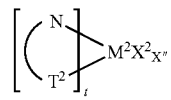

wherein
$M^2$ is a metal of Groups 4-10 of the Periodic Table of the elements;
$T^2$ is a nitrogen, oxygen or phosphorus containing group;
$X^2$ is halo, hydrocarbyl, or hydrocarbyloxy;
t is one or two;
x" is a number selected to provide charge balance;
and $T^2$ and N are linked by a bridging ligand.

84. A process according to embodiment 3 or 3a which is a continuous process.

85. A process according to embodiment 84 which is a solution process.

86. A process according to embodiment 85 wherein ethylene and one or more copolymerizable comonomers are polymerized.

87. A process according to embodiment 86 wherein the ethylene conversion in the reactor is at least 95 percent.

88. A process according to embodiment 84 wherein catalyst (A) corresponds to the formula:

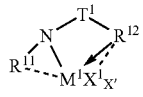

wherein:
$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

89. A process according to embodiment 88 wherein catalyst (B) corresponds to the formula:

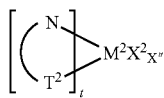

wherein

M² is a metal of Groups 4-10 of the Periodic Table of the elements;

T² is a nitrogen, oxygen or phosphorus containing group;

X² is halo, hydrocarbyl, or hydrocarbyloxy;

t is one or two;

x" is a number selected to provide charge balance;

and T² and N are linked by a bridging ligand.

90. A multi-block copolymer comprising in polymerized form ethylene and a copolymerizable comonomer.

91. An olefin polymer having a relatively flat storage modulus characterized in that log G' (in Pascals) decreases by less than one order of magnitude between 50 and 100° C.

92. A process according to embodiment 3 or 3a in which the ratio of chain shuttling agent to one or more catalysts and or monomers is varied in order to produce polymers differing in one or more chemical or physical properties.

93. A polymer mixture comprising: (1) an organic or inorganic polymer, preferably a homopolymer of ethylene or propylene and/or a copolymer of ethylene and a copolymerizable comonomer, and (2) a polymer according to any one of embodiments 4-15, 4a, 5a, 10a-15a, 10b, or preparable by the method of embodiment 3 or 3a.

94. A polymer mixture according to embodiment 93 wherein component (1) is an organic thermoplastic polymer.

95. A polymer mixture according to embodiment 94 wherein component (1) is a propylene homopolymer.

96. A polymer mixture according to embodiment 95 wherein component (1) is highly isotactic polypropylene.

97. A polymer mixture according to embodiment 93 wherein component (2) is an elastomeric copolymer of ethylene and one or more copolymerizable comonomers.

98. A polymer mixture according to embodiment 94 wherein component (2) is an elastomeric copolymer of ethylene and one or more copolymerizable comonomers.

99. A polymer mixture according to embodiment 95 wherein component (2) is an elastomeric copolymer of ethylene and one or more copolymerizable comonomers.

100. A polymer mixture according to embodiment 96 wherein component (2) is an elastomeric copolymer of ethylene and one or more copolymerizable comonomers.

101. A polymer mixture according to embodiment 93 wherein component (2) is an elastomeric copolymer of ethylene and one or more copolymerizable comonomers in the form of particles containing occlusions of component (1) therein.

102. A polymer mixture according to embodiment 94 wherein component (2) is an elastomeric copolymer of ethylene and one or more copolymerizable comonomers in the form of particles containing occlusions of component (1) therein.

103. A polymer mixture according to embodiment 95 wherein component (2) is an elastomeric copolymer of ethylene and one or more copolymerizable comonomers in the form of particles containing occlusions of component (1) therein.

104. A polymer mixture according to embodiment 96 wherein component (2) is an elastomeric copolymer of ethylene and one or more copolymerizable comonomers in the form of particles containing occlusions of component (1) therein.

105. A polymer mixture according to embodiment 93 wherein component (2) is an elastomeric copolymer of ethylene and one or more copolymerizable comonomers in the form of particles containing occlusions of component (1) therein, said occlusions being formed upon melt blending of components (1) and (2).

106. A polymer mixture according to embodiment 94 wherein component (2) is an elastomeric copolymer of ethylene and one or more copolymerizable comonomers in the form of particles containing occlusions of component (1) therein, said occlusions being formed upon melt blending of components (1) and (2).

107. A polymer mixture according to embodiment 95 wherein component (2) is an elastomeric copolymer of ethylene and one or more copolymerizable comonomers in the form of particles containing occlusions of component (1) therein, said occlusions being formed upon melt blending of components (1) and (2).

108. A polymer mixture according to embodiment 96 wherein component (2) is an elastomeric copolymer of ethylene and one or more copolymerizable comonomers in the form of particles containing occlusions of component (1) therein, said occlusions being formed upon melt blending of components (1) and (2).

109. A process for preparing a polymer mixture comprising: (1) an organic or inorganic thermoplastic polymer, preferably a homopolymer of ethylene or propylene and/or a copolymer of ethylene and a copolymerizable comonomer, and (2) an elastomeric polymer in the form of particles containing occlusions of component (1) therein, said process comprising melt blending components (1) and (2) under shearing conditions so as to form occlusions of component (1) in dispersed particles of component (2).

110. The process of claim 109 wherein component (1) is isotactic polypropylene.

111. The process of claim 110 wherein component (2) is a copolymer of ethylene and a copolymerizable comonomer.

The skilled artisan will appreciate that the invention disclosed herein may be practiced in the absence of any component, step or ingredient which has not been specifically disclosed.

EXAMPLES

The following examples are provided as further illustration of the invention and are not to be construed as limiting. The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from Exxon Mobil Chemicals Inc. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

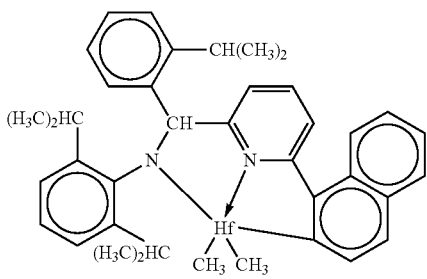

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

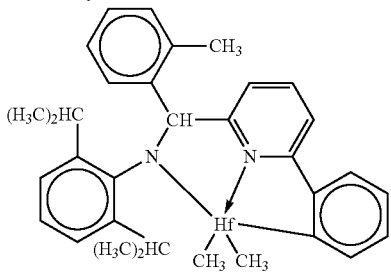

Catalyst (A3) is bis[N,N'''-(2,4,6-tri(methylphenyl)amido) ethylenediamine]hafnium dibenzyl.

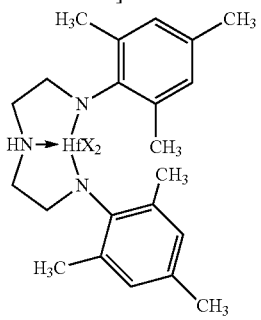

X = CH$_2$C$_6$H$_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

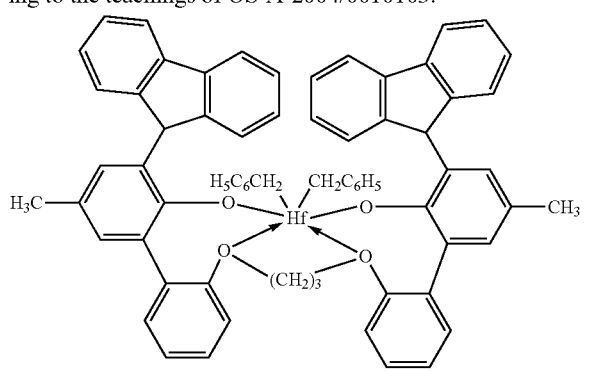

Catalyst (B1) 1,2-bis-(3,5-di-t-butylphenylene)(1-(N-(1-methylethyl)immino)methyl)(2-oxoyl) zirconium dibenzyl

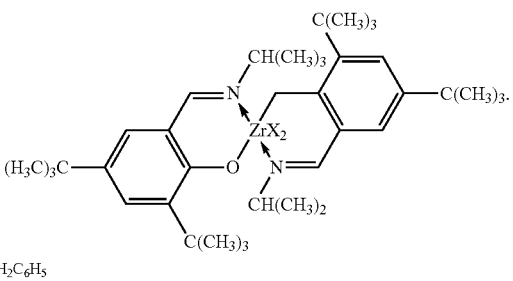

X = CH$_2$C$_6$H$_5$

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min. Solvent is removed under reduced pressure to yield the desired product as a reddish-brown solid.

Catalyst (B2) is 1,2-bis-(3,5-di-t-butylphenylene)(1-(N-(2-methylcyclohexyl)-immino)methyl)(2-oxoyl) zirconium dibenzyl

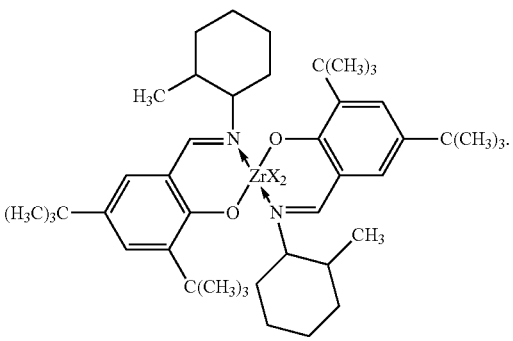

X = CH$_2$C$_6$H$_5$

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Catalyst (C1) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

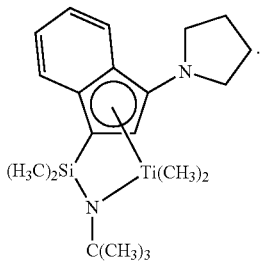

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

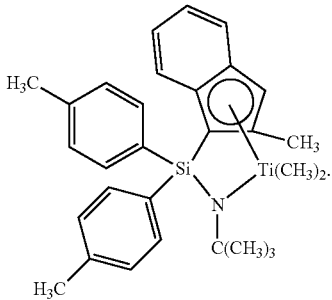

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

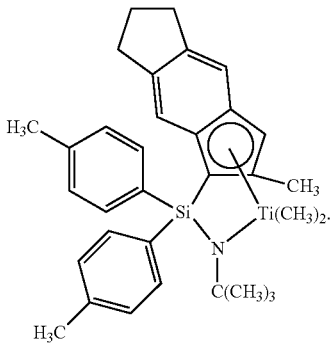

Catalyst (D1) is bis(dimethyldisiloxane)(indene-1-yl)zirconium dichloride available from Sigma-Aldrich:

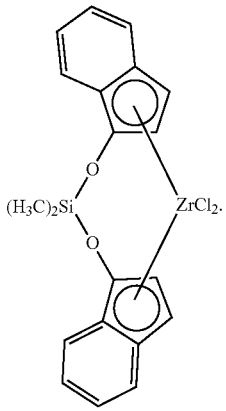

Cocatalyst 1 A mixture of methyldi(C$_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B(C$_6$F$_5$)$_4$], substantially as disclosed in U.S. Pat. No. 5,919,983, Ex. 2.

Cocatalyst 2 Mixed C$_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) (SA19), and ethylzinc (t-butoxide) (SA20).

Examples 1-4, Comparative A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) comprised of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

of fusion of 160.1 J/g. The corresponding CRYSTAF curve shows the tallest peak at 66.1° C. with a peak area of 71.8 percent. The difference between the DSC Tm and the Tcrystaf is 54.6° C.

Figure 6:
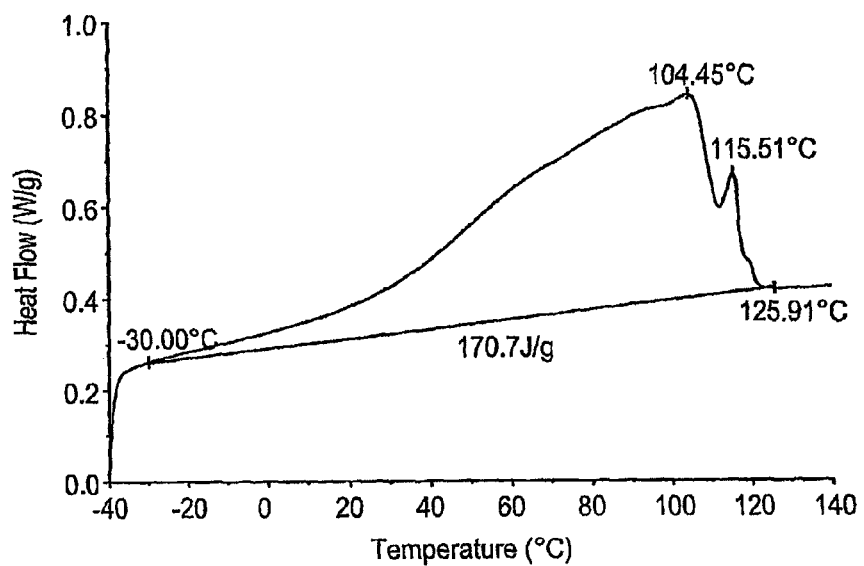
Figure 6:
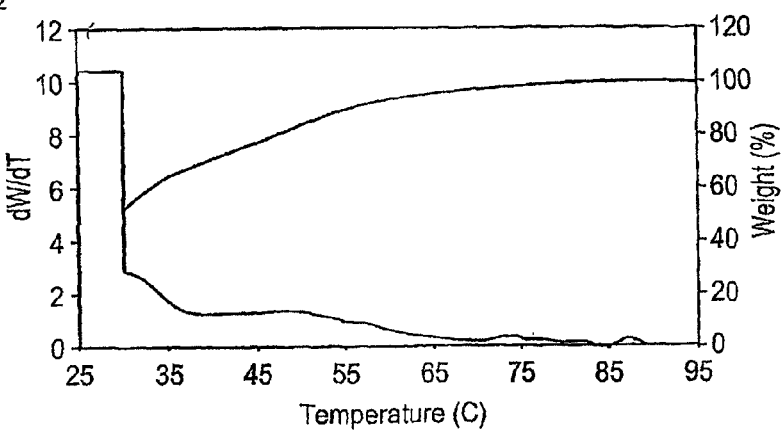

The DSC curve in FIG. 6 for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

Figure 22:
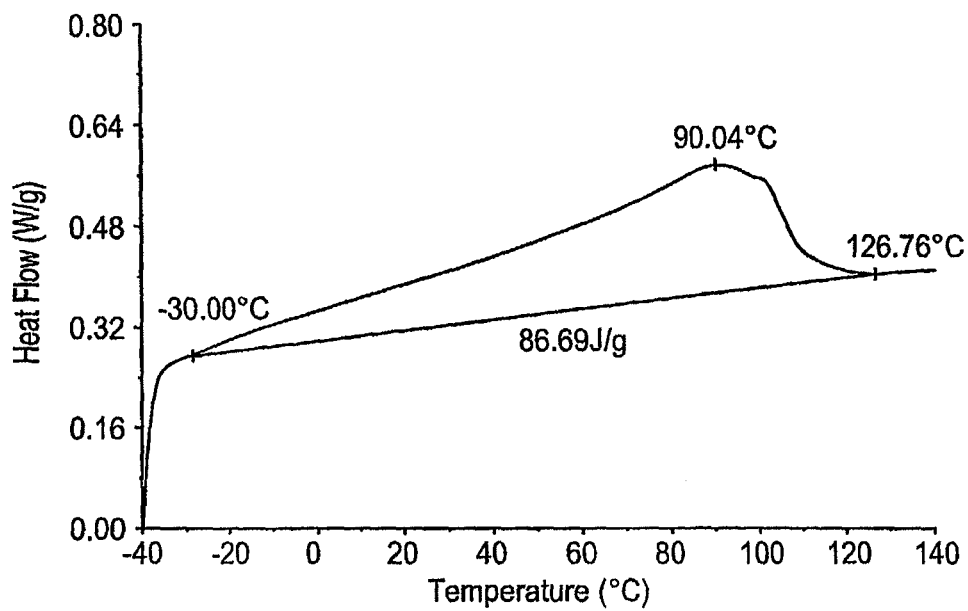
Figure 22:
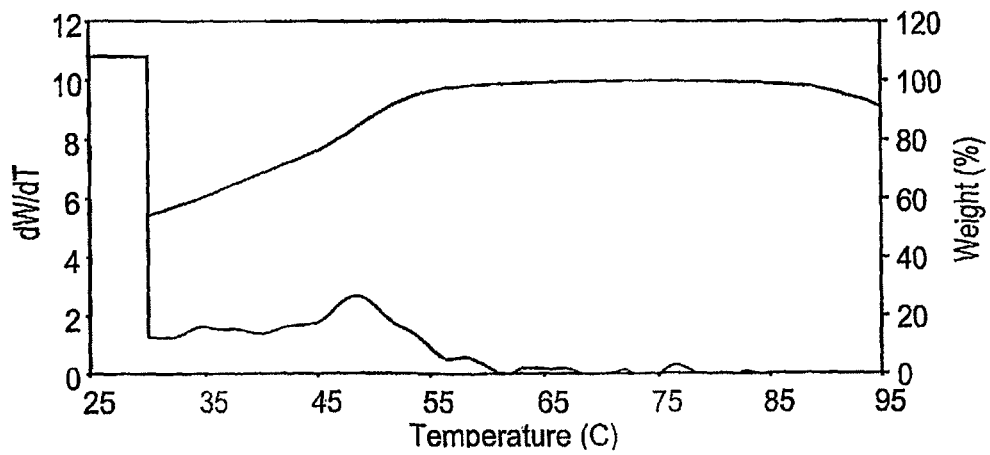

The DSC curve in FIG. 22 (comparative A) shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

Figure 23:
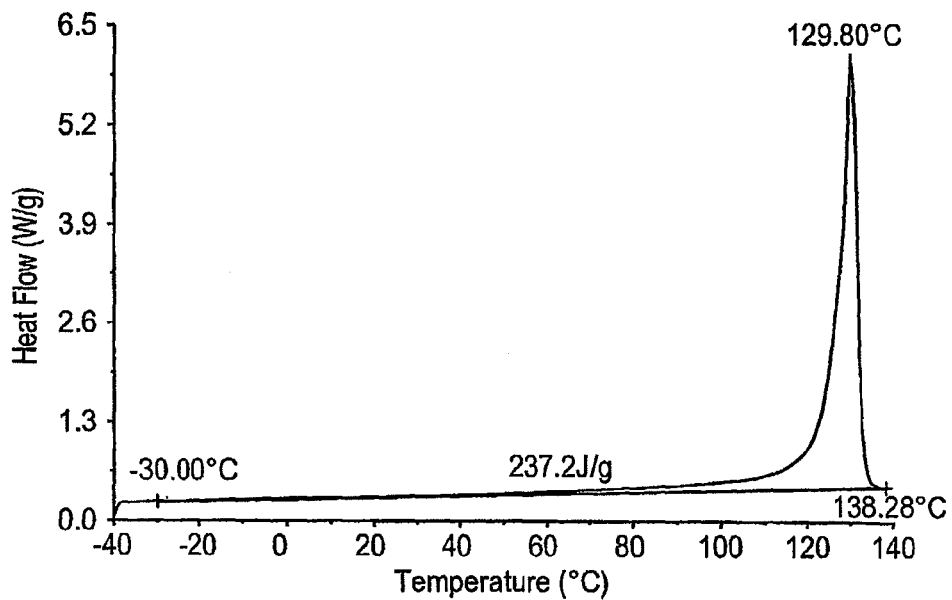
Figure 23:
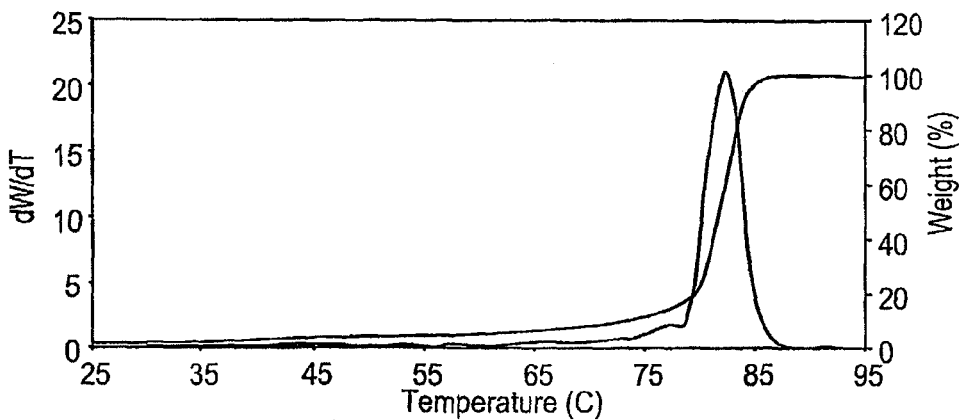

The DSC curve in FIG. 23 (Comparative B) shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

Figure 24:
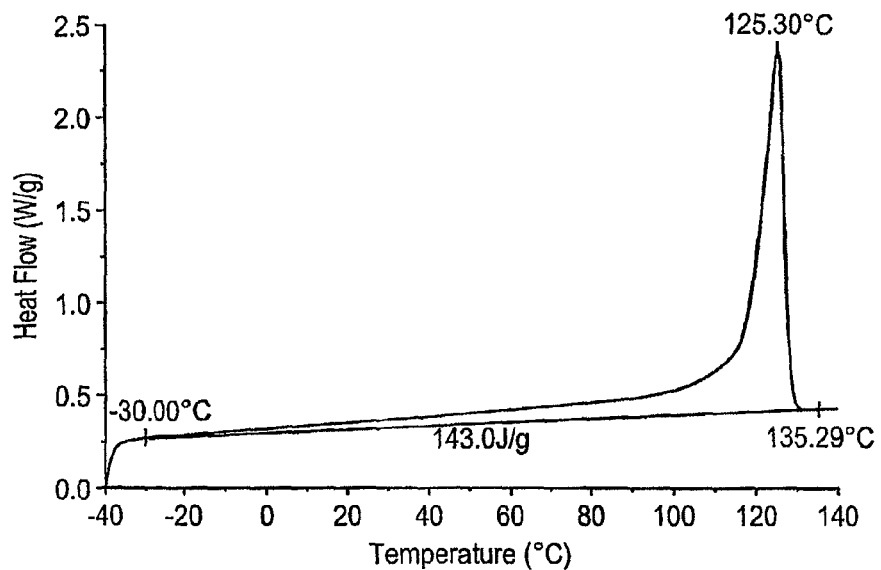
Figure 24:
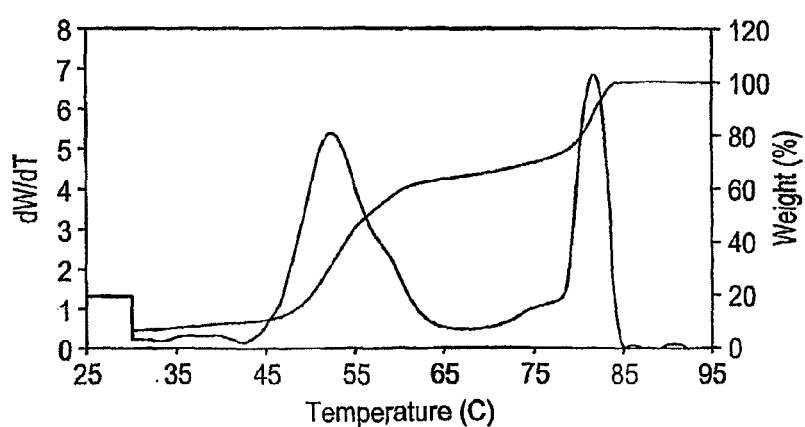

The DSC curve in FIG. 24 (Comparative C) shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

TABLE 1

| Ex. | Cat. (A1) (µmol) | Cat (B1) (µmol) | Cocat (µmol) | MMAO (µmol) | shuttling agent (µmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Figure 3:
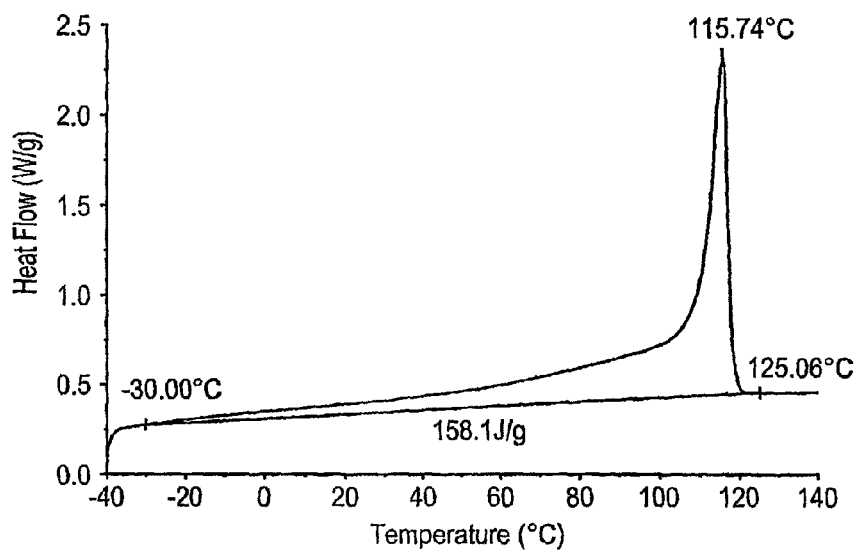
FIGS. 3-27 are DSC heating curves and corresponding CRYSTAF reports for the polymers of Examples 1-19 and Comparative polymers A-F, including peak temperature assignments and weight fraction integrations for the areas corresponding to the respective peak temperatures.
Figure 3:
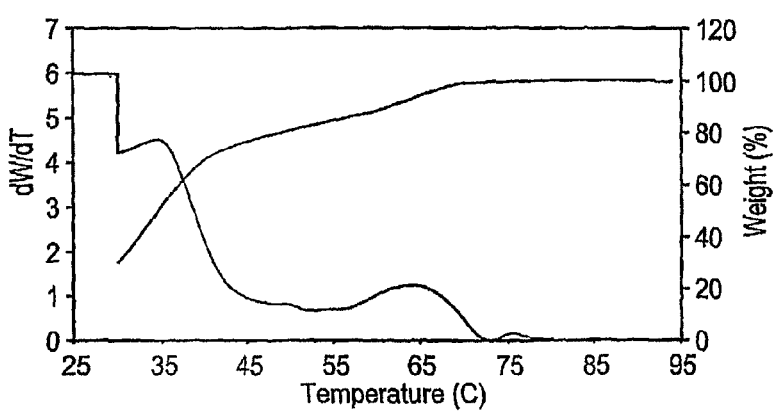

Further characterizing data for the polymers of Table 1 are determined by reference to the figures. More specifically DSC and ATREFF results show the following:

The DSC curve in FIG. 3 for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

Figure 4:
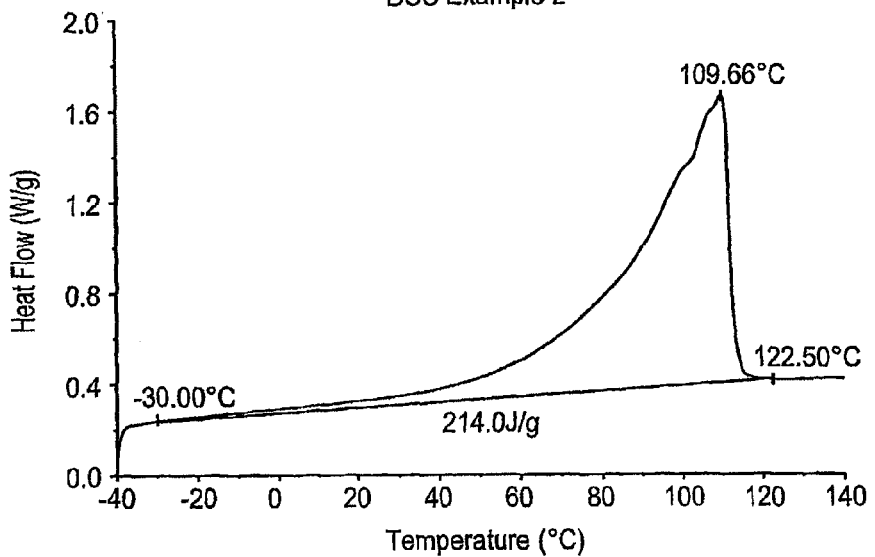
Figure 4:
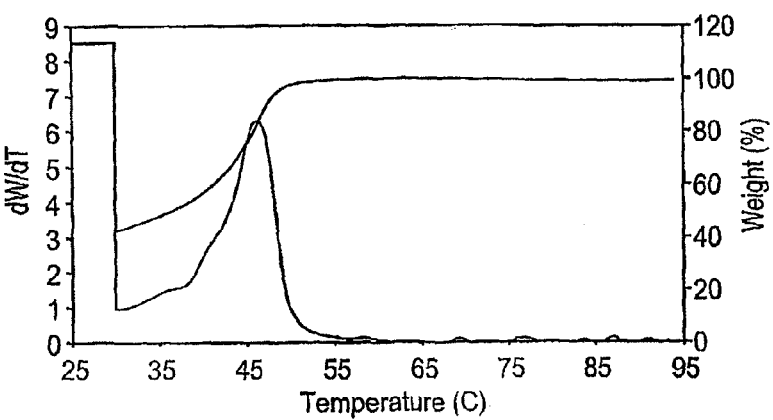

The DSC curve in FIG. 4 for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

Figure 5:
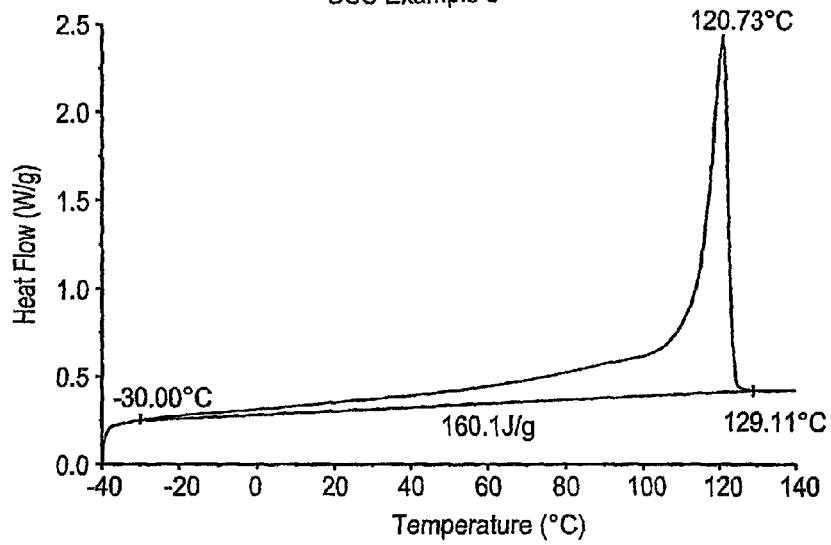
Figure 5:
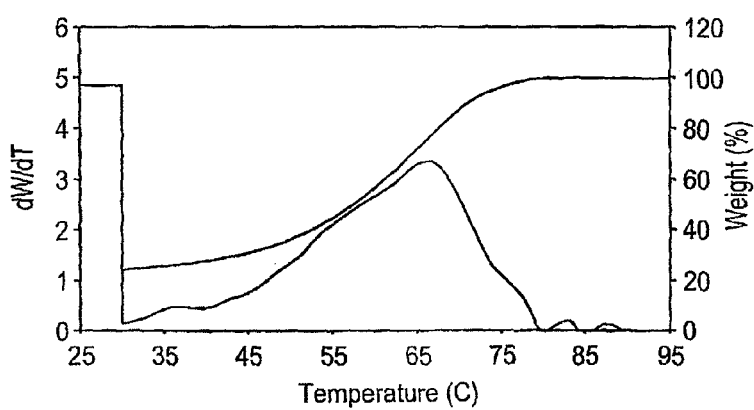

The DSC curve in FIG. 5 for the polymer of example 3 shows a peak with a 120.7° C. melting point (Tm) with a heat Examples 5-19, Comparatives D-F Continuous Solution Polymerization, Catalyst A1/B2+DEZ Continuous solution polymerizations are carried out in a computer controlled autoclave reactor equipped with an internal stirrer. Purified mixed alkanes solvent (Isopar™ E available from ExxonMobil, Inc.), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

| Ex. | $C_8H_{16}$ kg/hr | Solv. kg/hr | $H_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]$/$[DEZ]$[4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

| Ex. | Density (g/cm$^3$) | $I_2$ | $I_{10}$ | $I_{10}/I_2$ | Mw (g/mol) | Mn (g/mol) | Mw/Mn | Heat of Fusion (J/g) | $T_m$ (°C.) | $T_c$ (°C.) | $T_{CRYSTAF}$ (°C.) | Tm-$T_{CRYSTAF}$ (°C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

Figure 7:
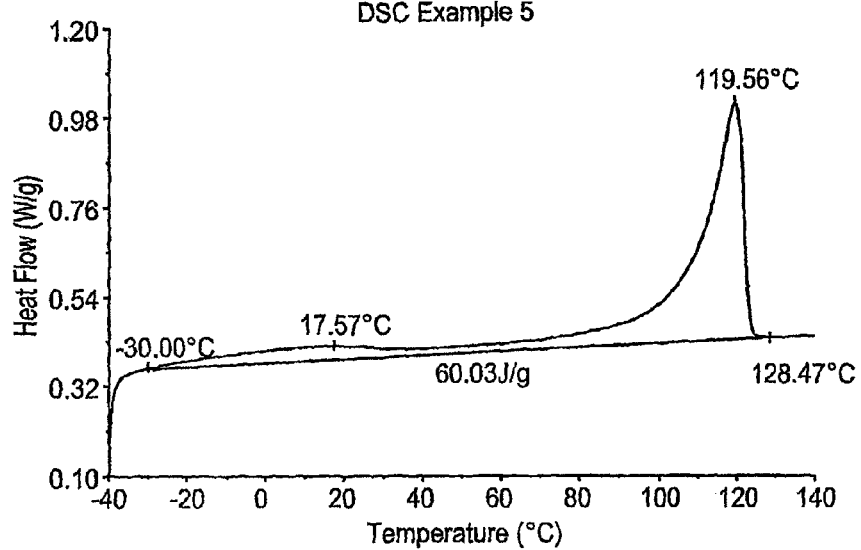
Figure 7:
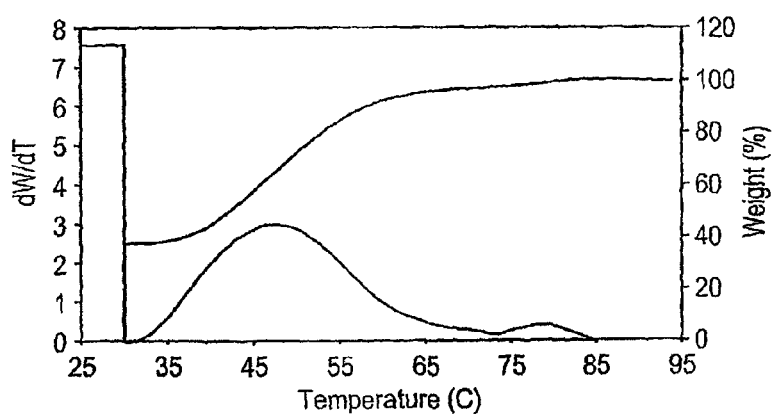

The resulting polymers are tested by DSC and ATREFF as with previous examples. Results are as follows:

The DSC curve in FIG. 7 (polymer of example 5) shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

Figure 8:
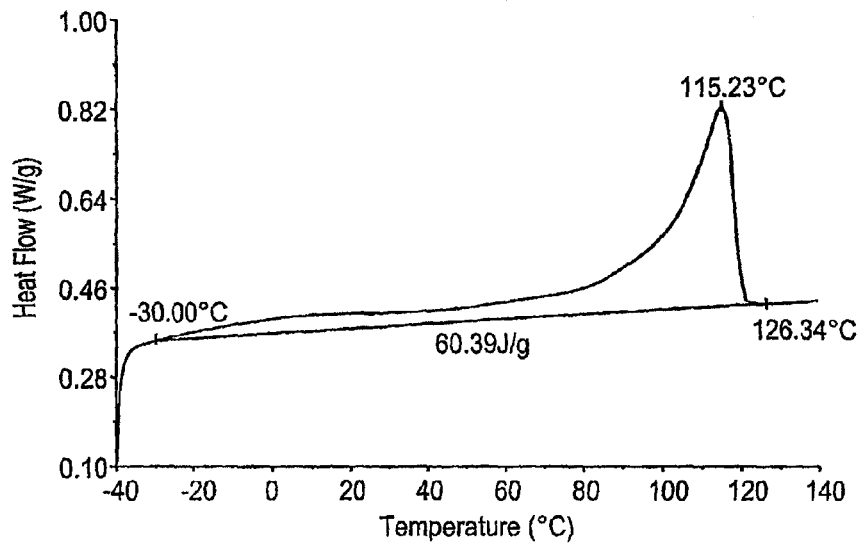
Figure 8:
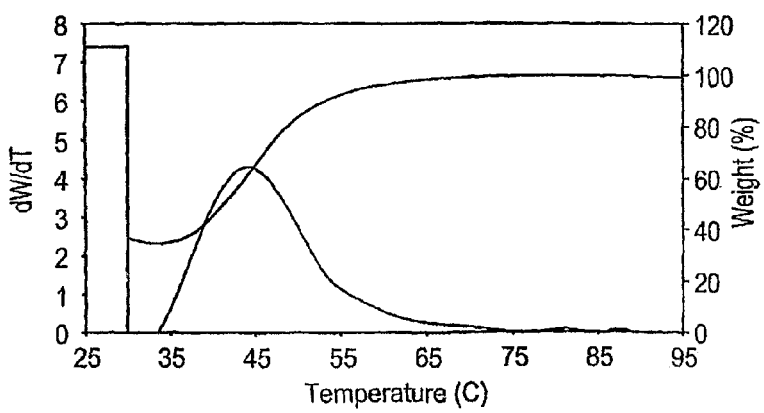

The DSC curve in FIG. 8 (polymer of example 6) shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

Figure 9:
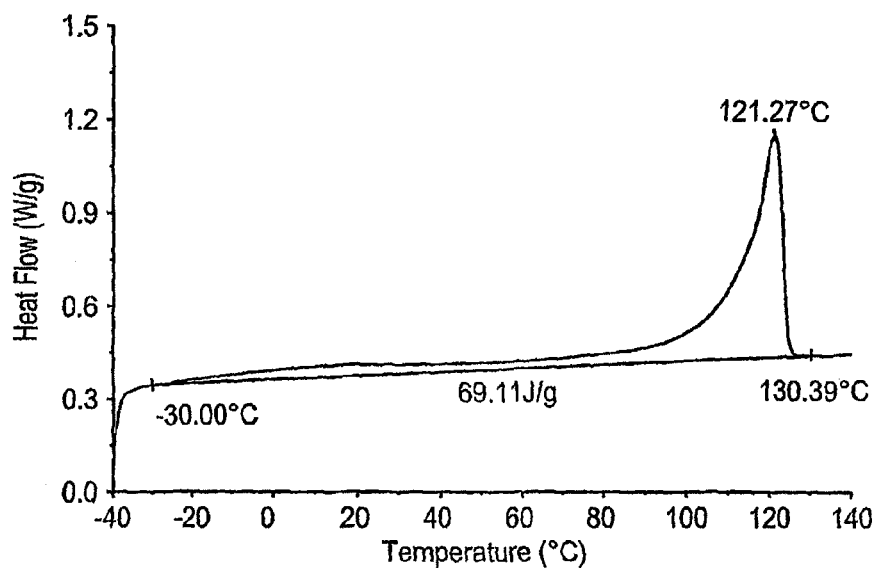
Figure 9:
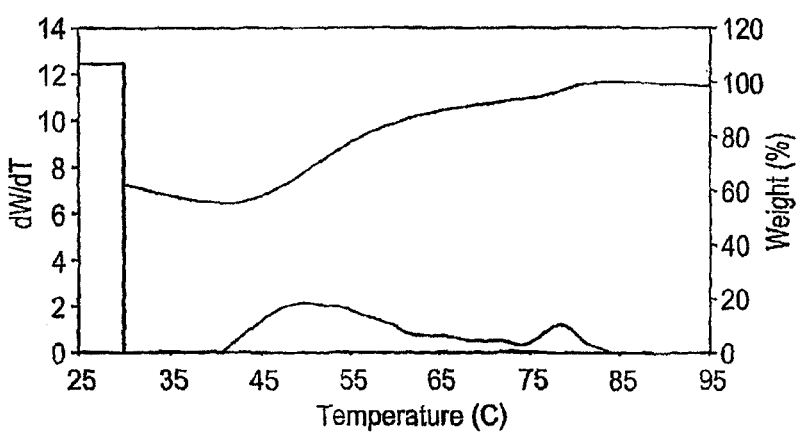

The DSC curve in FIG. 9 (polymer of example 7) shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

Figure 10:
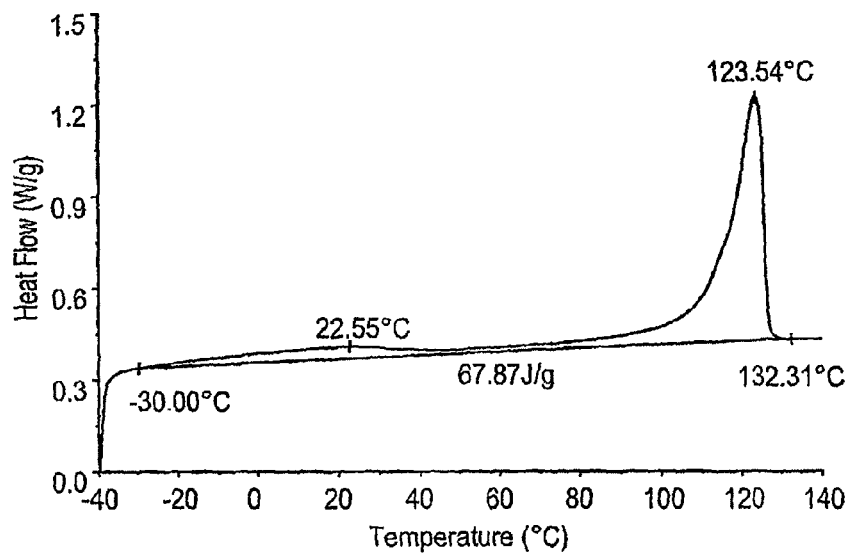
Figure 10:
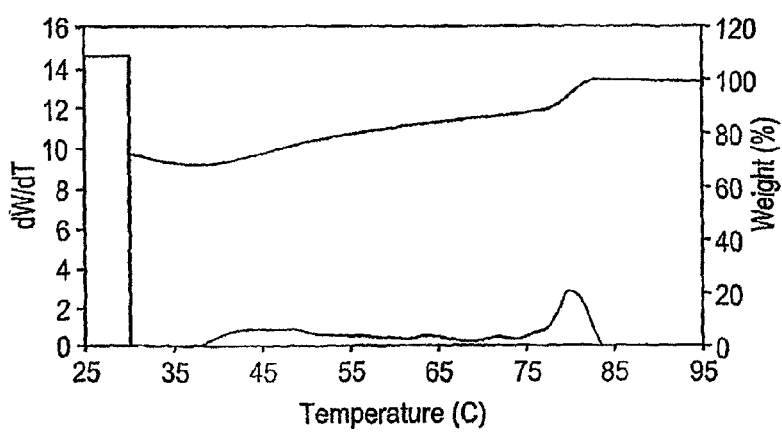

The DSC curve in FIG. 10 (polymer of example 8) shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

Figure 11:
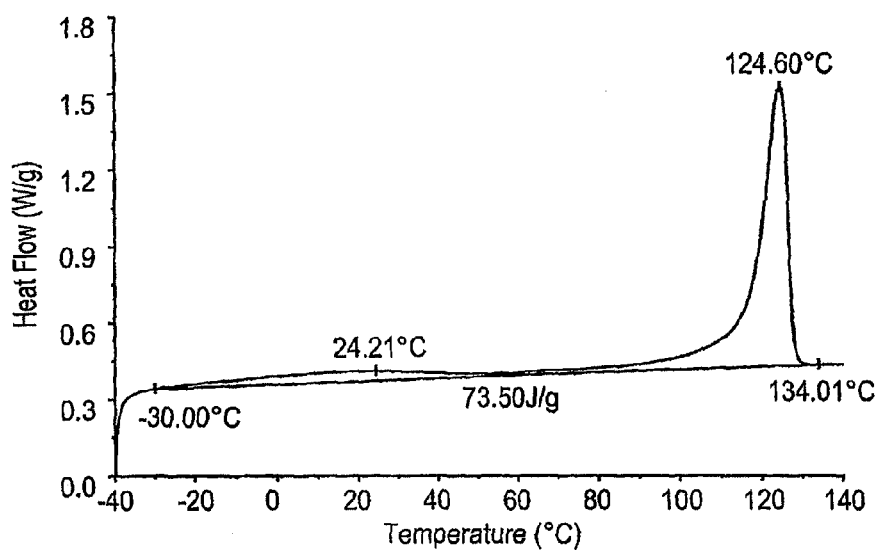
Figure 11:
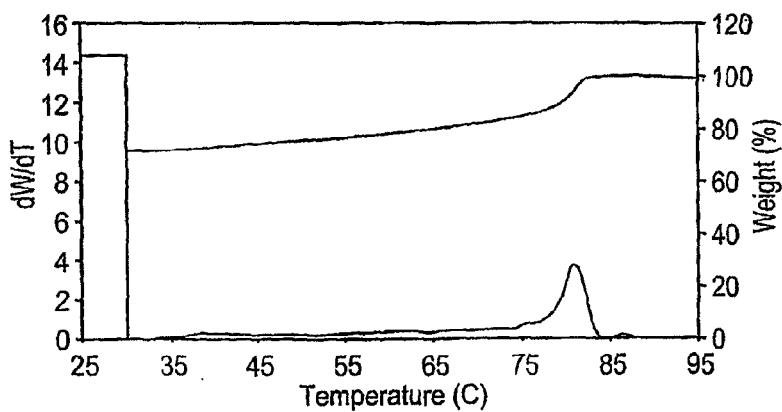

The DSC curve in FIG. 11 (polymer of example 9) shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

Figure 12:
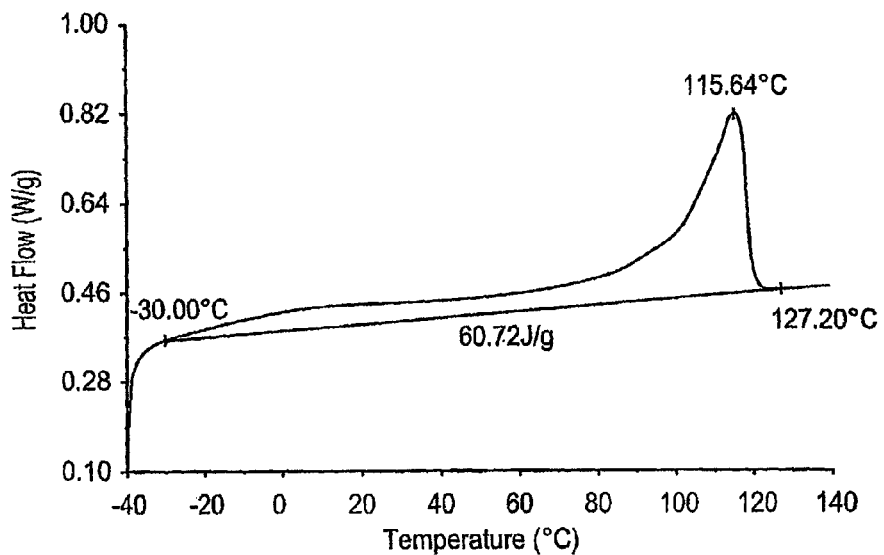
Figure 12:
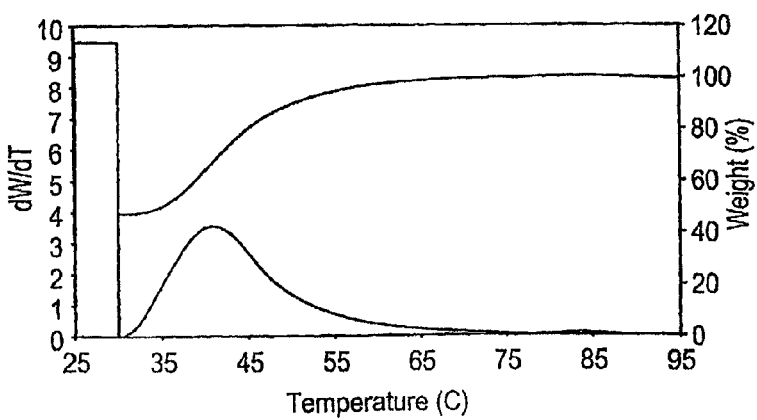

The DSC curve in FIG. 12 (polymer of example 10) shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

Figure 13:
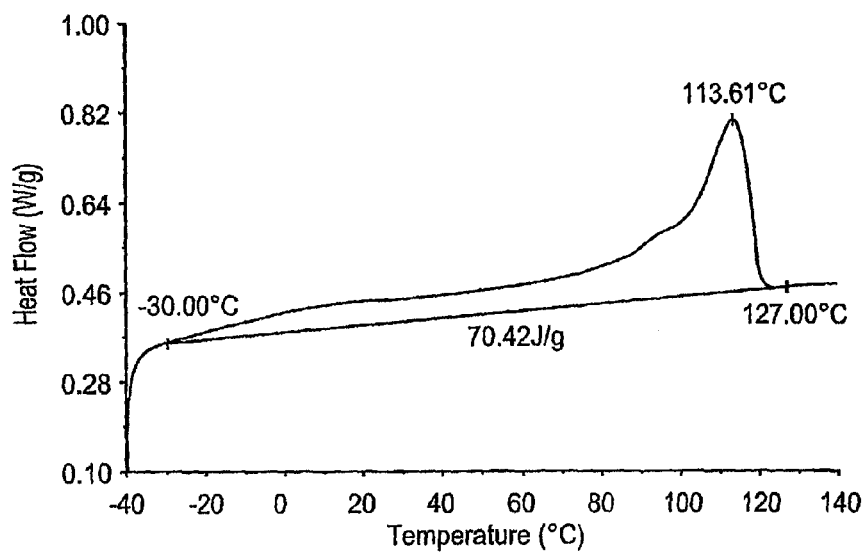
Figure 13:
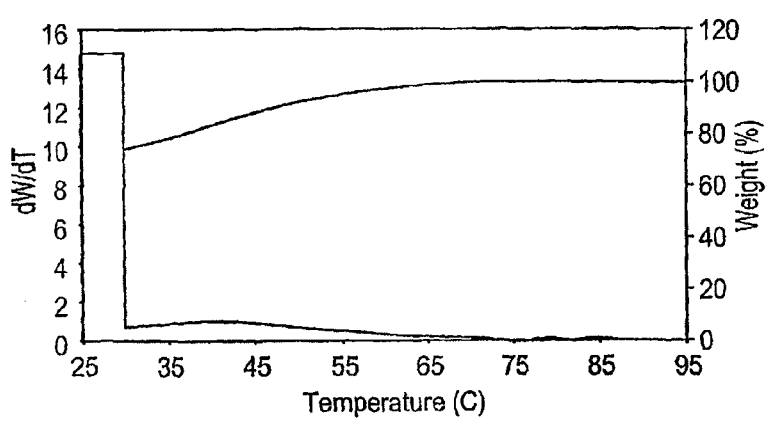

The DSC curve in FIG. 13 (polymer of example 11) shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

Figure 14:
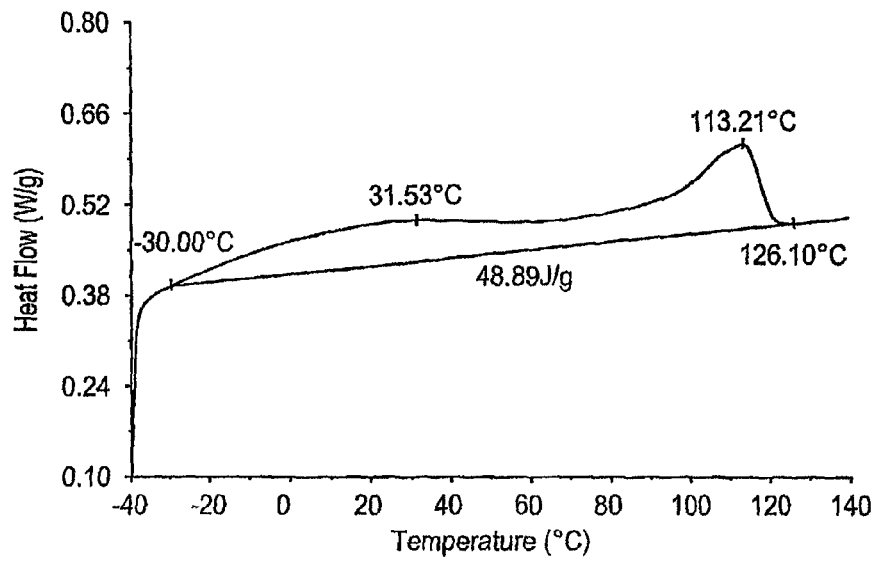
Figure 14:
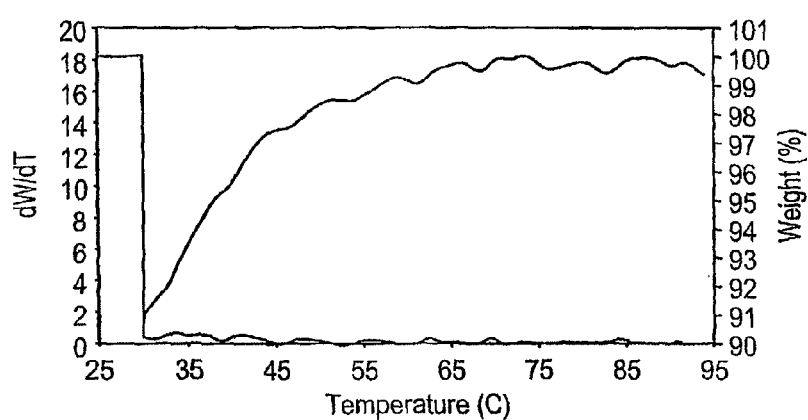

The DSC curve in FIG. 14 (polymer of example 12) shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

Figure 15:
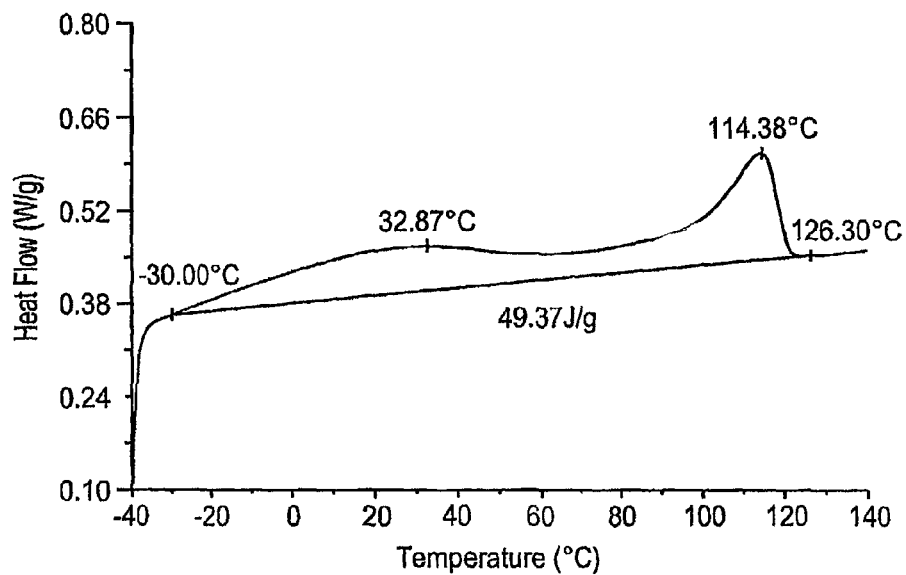
Figure 15:
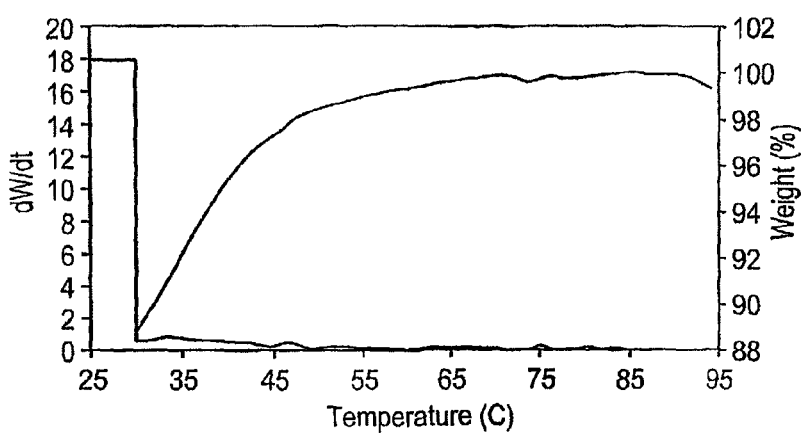

The DSC curve in FIG. 15 (polymer of example 13) shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

Figure 16:
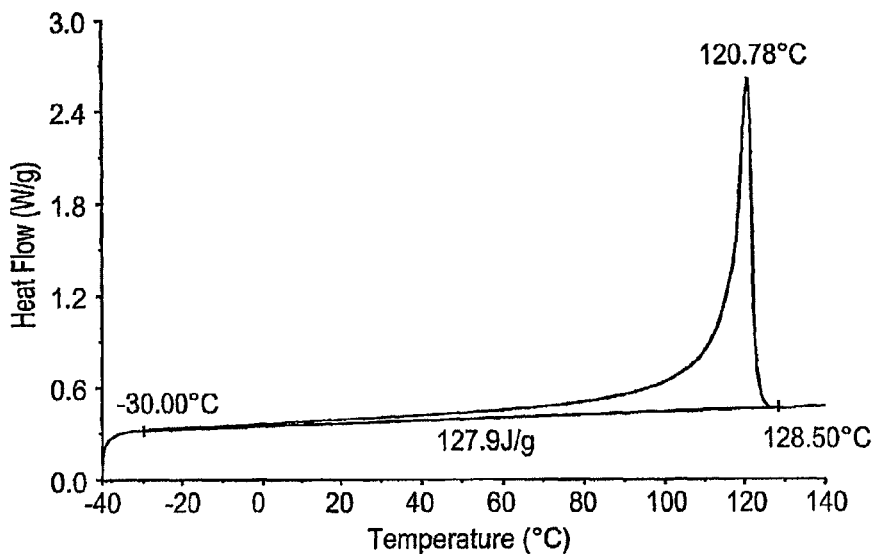
Figure 16:
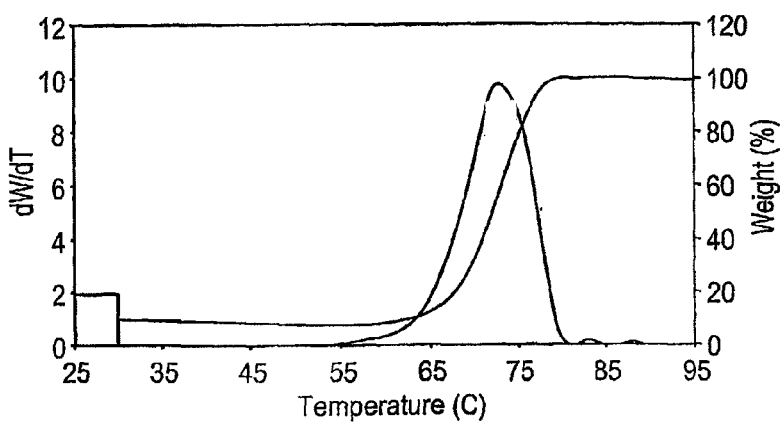

The DSC curve in FIG. 16 (polymer of example 14) shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

Figure 17:
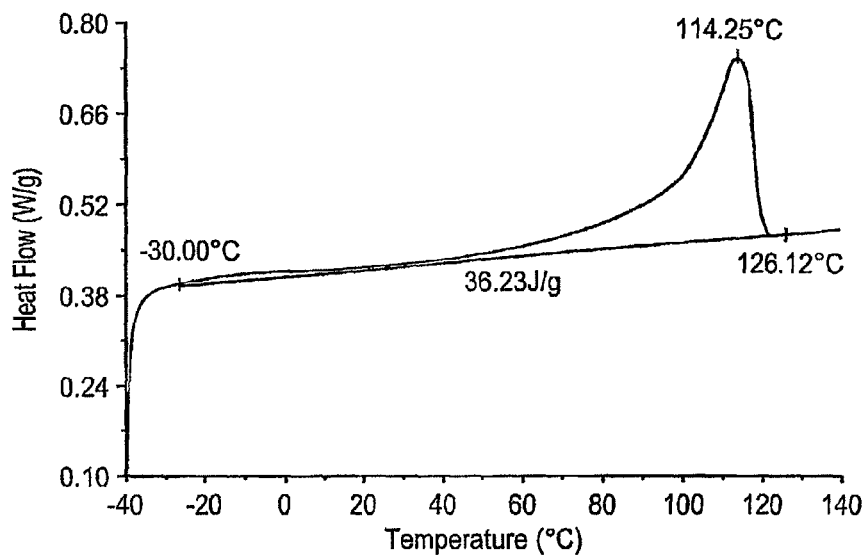
Figure 17:
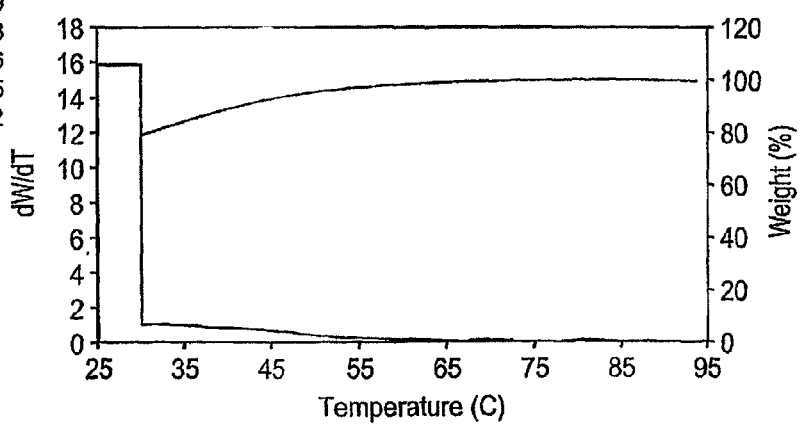

The DSC curve in FIG. 17 (polymer of example 15) shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

Figure 18:
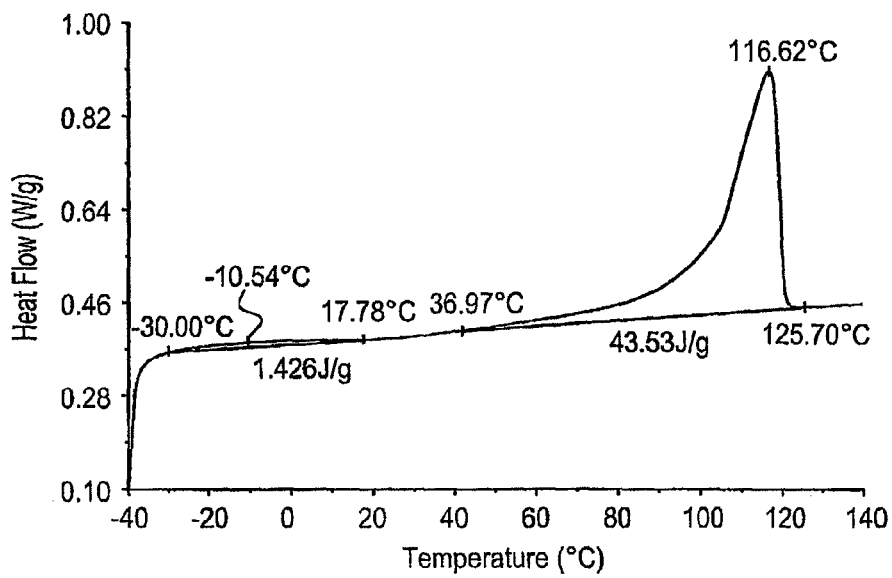
Figure 18:
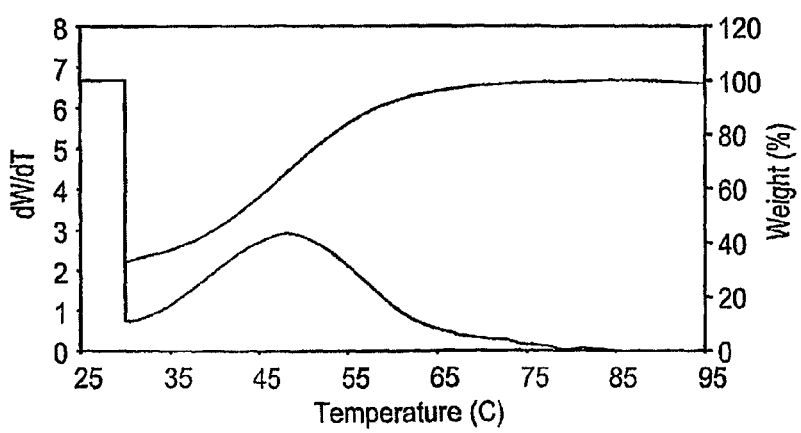

The DSC curve in FIG. 18 (polymer of example 16) shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

Figure 19:
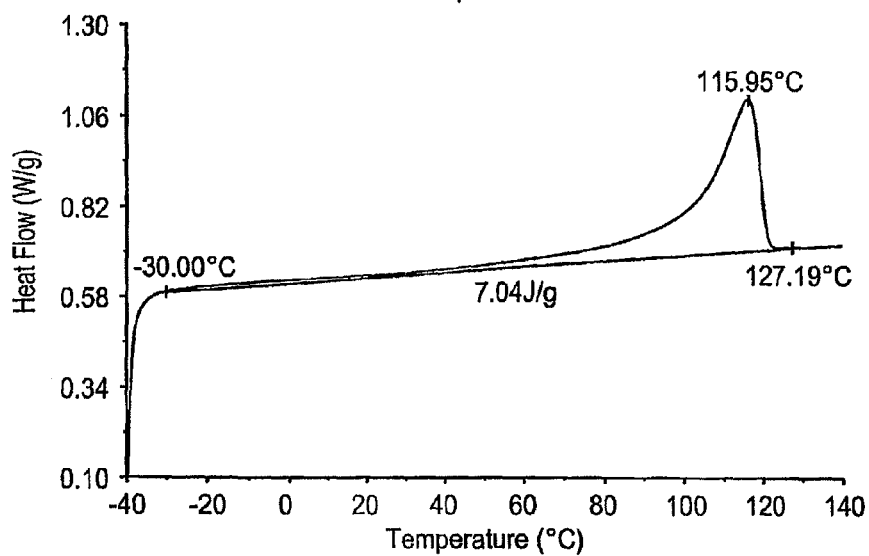
Figure 19:
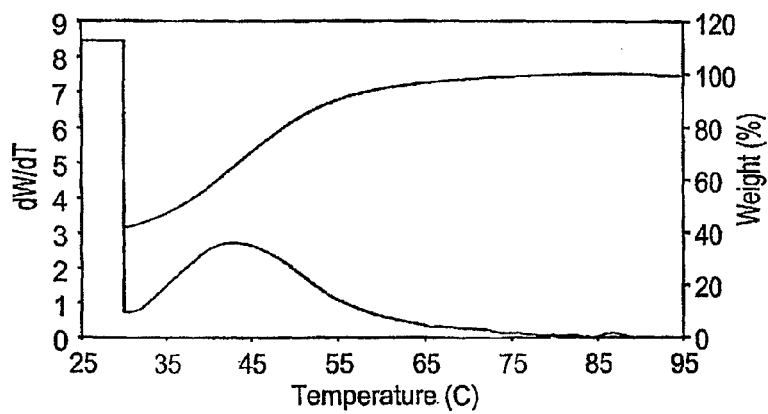

The DSC curve in FIG. 19 (polymer of example 17) shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

Figure 20:
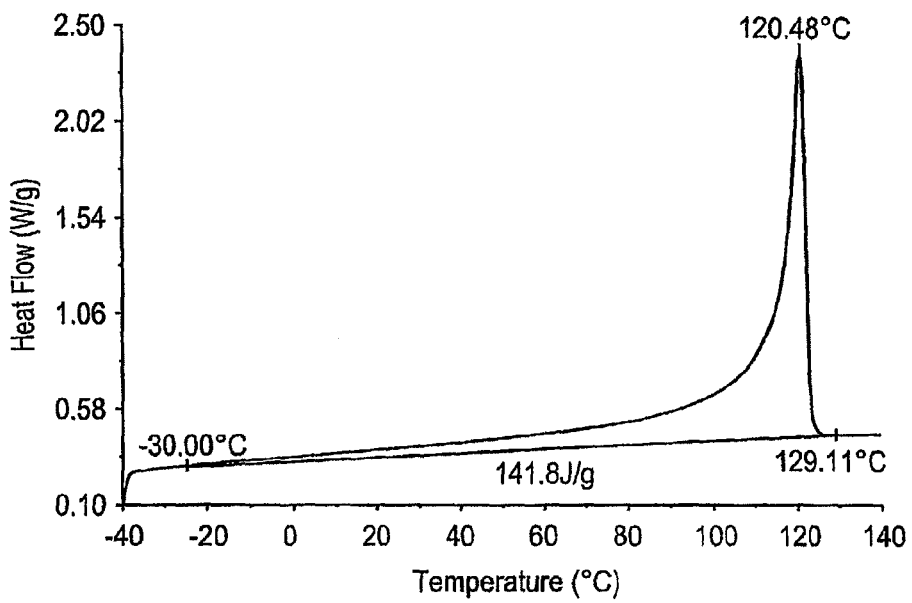
Figure 20:
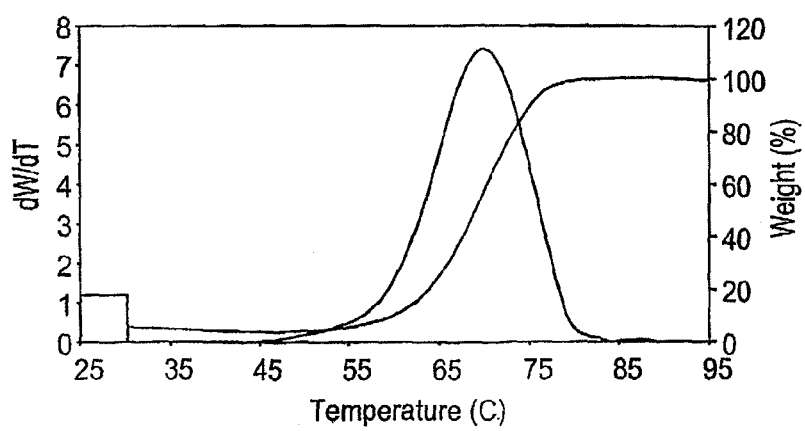

The DSC curve in FIG. 20 (polymer of example 18) shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

Figure 21:
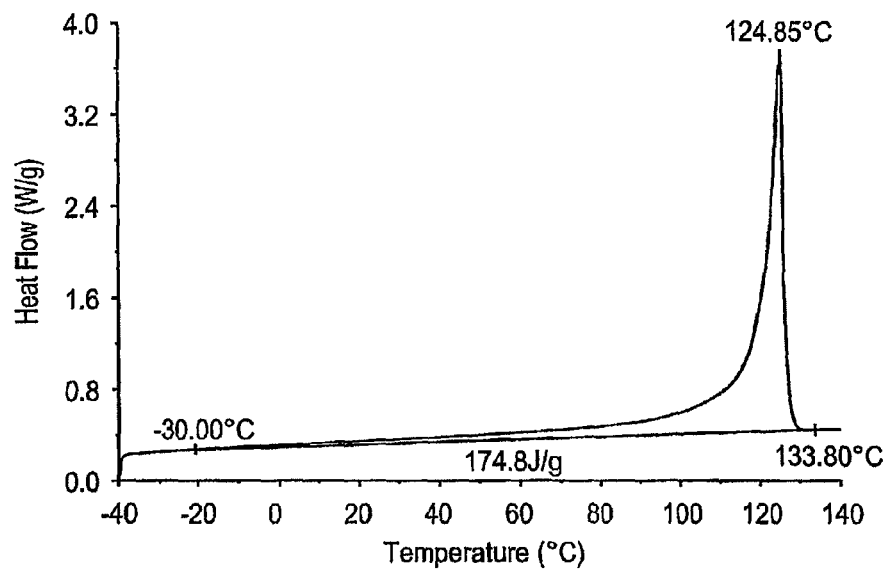
Figure 21:
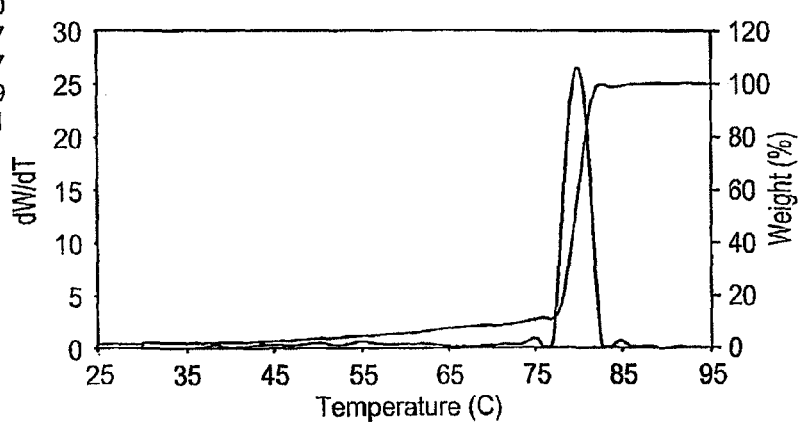

The DSC curve in FIG. 21 (polymer of example 19) shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

Figure 25:
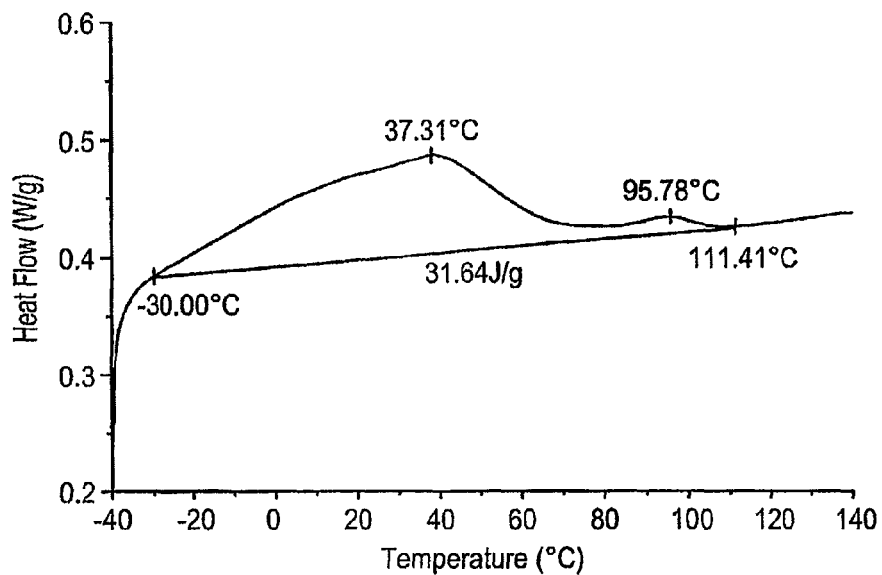
Figure 25:
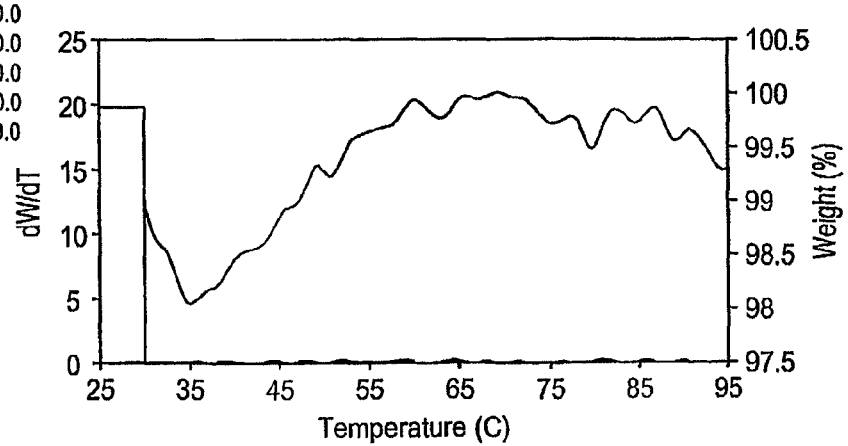

The DSC curve in FIG. 25 (comparative D) shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

Figure 26:
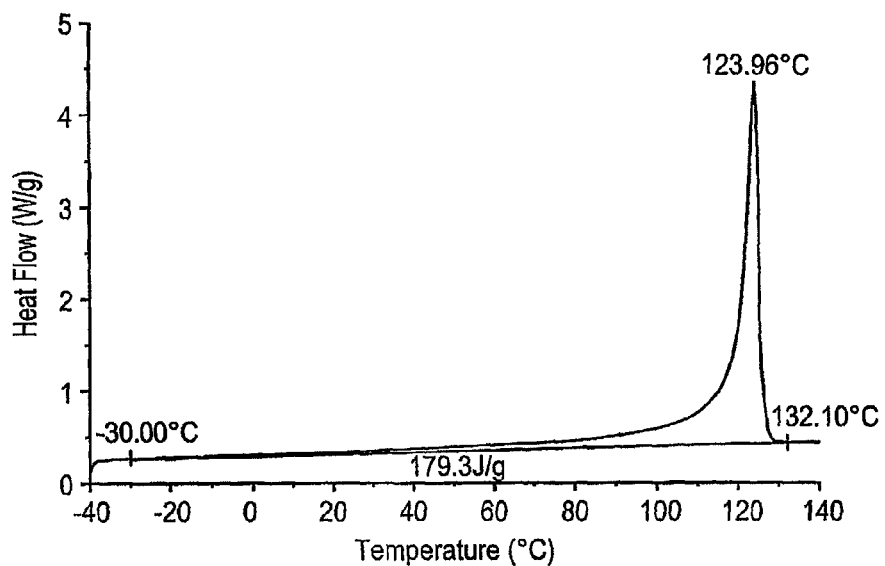
Figure 26:
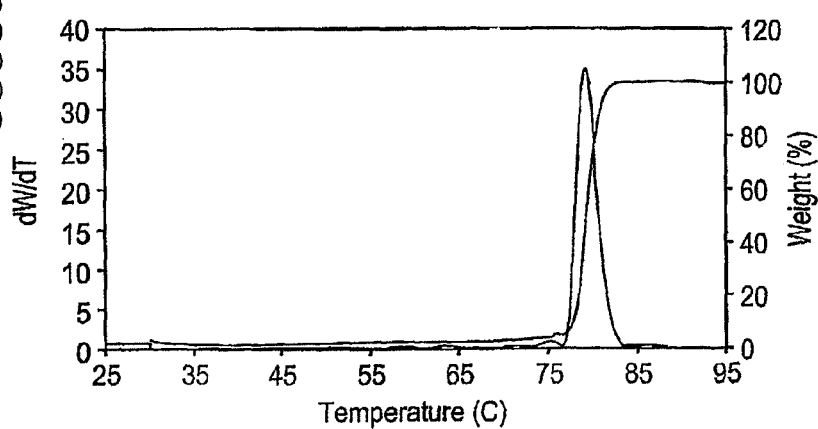

The DSC curve in FIG. 26 (comparative E) shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

Figure 27:
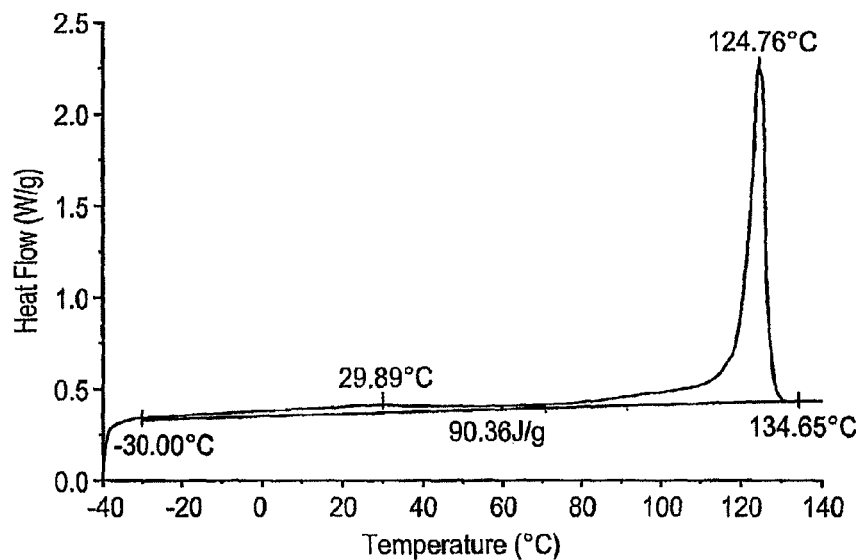
Figure 27:
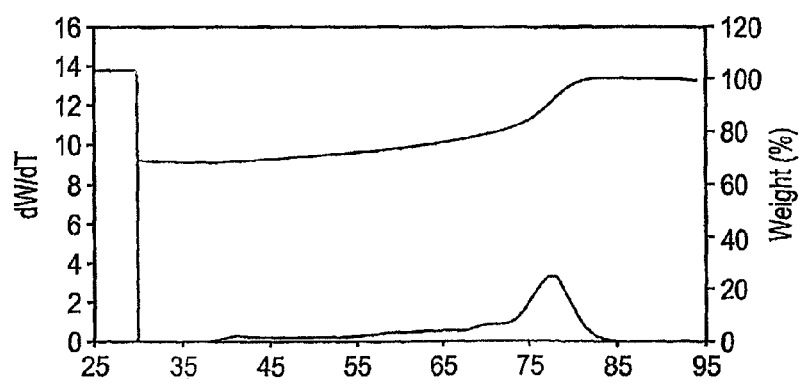

The DSC curve in FIG. 27 (comparative F) shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY™ KC8852G, available from The Dow Chemical Company), Comparative H* is an elastomeric, substantially linear ethylene/1-octene copolymer (AFFINITY™ EG8100, available from The Dow Chemical Company), Comparative I is a substantially linear ethylene/1-octene copolymer (Affinity PL1840, available from The Dow Chemical Company), Comparative J is a hydrogenated styrene/butadiene/styrene triblock copolymer (Kraton™ G1652, available from KRATON Polymers), Comparative K is a thermoplastic vulanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft² (kPa) | G' (25° C.)/ G' (100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |

TABLE 4-continued

High Temperature Mechanical Properties

| Ex. | TMA-1 mm penetration (° C.) | Pellet Blocking Strength lb/ft$^2$ (kPa) | G' (25° C.)/ G' (100° C.) | 300% Strain Recovery (80° C.) (percent) | Compression Set (70° C.) (percent) |
|---|---|---|---|---|---|
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the invented polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the invented polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm$^3$) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the present polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the invented polymers is generally 1000 mJ or higher, as shown in Table 5. Tear strength for the invented polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the invented polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the invented polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |

TABLE 6-continued

Polymer Optical Properties

| Ex. | Internal Haze (percent) | Clarity (percent) | 45° Gloss (percent) |
|---|---|---|---|
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Article Fabrication and Testing
Fibers

Polymer samples from Example 11, Example 17 and Comparative G are spun into a multifilament bundle of 24 fibers with round cross-sections in a fiber spinning line (Fourne) equipped with twenty four 25×1 mm spinnerets a spin head temperature of 260° C., a melt temperature of 302° C. and a winder speed of 70 m/min. Other spinning conditions are listed in Table 8. The denier of the resulting bundle is approximately 95 to 100 denier (g/9000 m).

TABLE 8

| Pump Size (cm³/rev) | 1.12 |
| Pump Speed (rpm) | 10 |
| Screen Size, mesh (μm) | 325 (45) |
| Extruder Discharge Pressure (MPa) | 2 |

The fibers are crosslinked by passing six times through an electron beaming crosslinking machine operating at an electron beam dosage of 32 KGy/pass, giving a total dosage level of 192 KGy. Between each pass, the fibers are cooled to −10° C.

Figure 30:
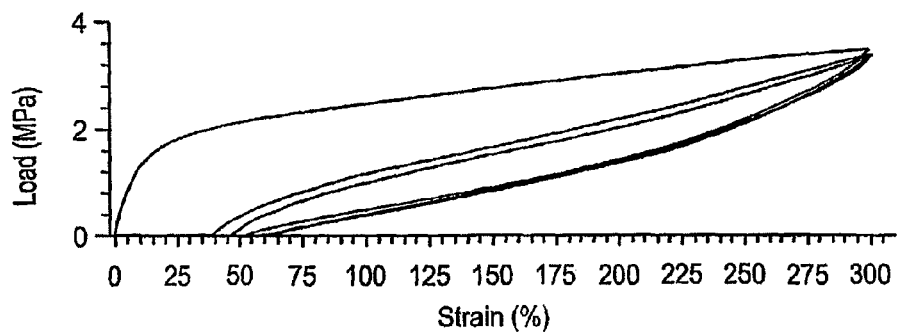
FIG. 30 depicts 300 percent strain cycle behavior for samples prepared from the polymer of Example 17.

The tensile behavior of the resulting uncrosslinked and crosslinked fibers is measured according to BISFA Test Methods for Bare Elastic Yarns, Chapter 6: Tensile Properties using Option C clamps and Option A test speed. Tenacity and elongation at break are reported from an average of 5 replications. The recovery behavior of the crosslinked fibers is also measured using BISFA Test Methods for Bare Elastic Yarns, Chapter 7: Viscoelastic Properties Procedure A where the fiber is cyclically loaded to 300 percent strain. The percent permanent deformation is calculated at the beginning of the 6$^{th}$ cycle as specified in the test method. Results of 300 percent strain cycle behavior for fibers prepared from the polymer of Example 17 are shown in FIG. 30.

Figure 31:
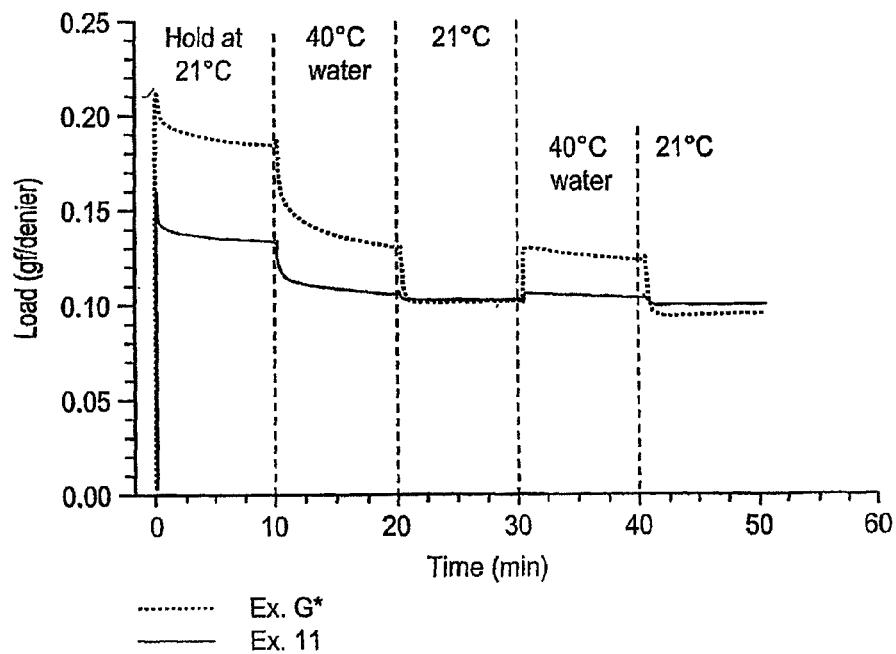
FIG. 31 depicts Stress Relaxation of Crosslinked Fibers from the polymer of Example 11 and Comparative G at 21° C. and 40° C.

Stress relaxation of crosslinked fibers is measured from 10 percent strain at alternating temperatures of 21° C. and 40° C. In the experiment, 13 loops of the bundle fibers with a circumference of 324 mm are mounted to an Instron test machine by 2 hooks resulting in a gauge length of 162 mm. The sample is stretched to 10 percent strain at a rate of 100 percent elongation/minute at 21° C. and then held for 10 minutes. The subsequent thermal treatment is: 10 minutes at 40° C. in a water bath, 10 minutes at 21° C. in air, 10 minutes at 40° C. in a water bath, and 10 minutes at 21° C. in air. The time to transfer the sample between the water bath and the air cooling chamber is 6 seconds. During the entire process, the load is monitored. The percent load change from the load at 35 minutes and the load at 45 minutes is calculated using the formula:

$$\% \text{ load change} = \frac{L(t = 35 \text{ min}) - L(t = 45 \text{ min})}{L(t = 35 \text{ min})}$$

where L(t=35 min) and L(t=45 min) are loads at 35 minutes and 45 minutes, corresponding to the middle periods of the last 40° C. water bath and 21° C. air exposures, respectively. Results are shown in FIG. 31. Fiber properties are also tabulated in Table 9.

TABLE 9

| | Fiber Properties | | | | | |
| --- | --- | --- | --- | --- | --- | --- |
| | Uncrosslinked | | Crosslinked | | | |
| Ex. | Tenacity (gf/denier) | Elongation at Break (percent) | Tenacity (gf/denier) | Elongation at Break (percent) | Permanent Deformation (percent) | Percent Load Change |
| 11 | 3.7 | 720 | 5.0 | 669 | 133 | 4 |
| G* | 6.4 | 423 | 7.7 | 382 | 137 | 25 |

In fibers prepared from both Example 11 and comparative G, crosslinking results in an increase in tenacity with some loss of elongation. Both examples show similar permanent deformation of approximately 135 percent. In FIG. 31, Example 11 displays lower stress relaxation than comparative G as well as being less temperature sensitive. The percent load change between 40° C. (35 min) and 21° C. (35 min) are listed in Table 9. The fiber prepared from Example 11 polymer shows only 4 percent change in load whereas the fiber of Comparative G displays 25 percent change. Low temperature sensitivity in stress relaxation is important in maintaining long shelf life of fiber bobbins. High temperature sensitivity in stress relaxation can lead to bobbin defects during storage in a non-climate controlled storage facility as the fiber alternately relaxes and constricts due to temperature fluctuations. This can lead to problems such as poor fiber unwinding behavior and fiber breaks in subsequent downstream processing of the fiber.

Foams

Samples of polymers (Ex. 5 and a commercially available ethylene/vinylacetate copolymer, Elvax™ 460, containing 18 percent acetate and having 2 melt index, available from DuPont Inc., Comparative L) are melt compounded with an azide blowing agent (AZ130, an azodicarbonamide blowing agent available from Uniroyal, Inc.), zinc oxide, stearic acid, and a peroxide cross-linking agent (di-tert butyl peroxy isopropyl benzene peroxide, 40 percent active on silica carrier, Perkadox™ 1440 peroxide, available from Azo Nobel, Inc.) compression molded into plaques and allowed to expand.

Compounding Condition: Roll mill @ 130° C. 10 min,

Molding and Foaming Condition: Sheets from the roll mill are preheated to 90° C. in an oven for 15 minutes, then fed to a mold preheated to 180° C., pressed (mechanical lock) and cured at this temperature for 10 minutes. Upon removal, samples are allowed to expand. Formulation details (parts by weight) are contained in Table 10.

TABLE 10

| component | Comparative | Ex. 5 |
| --- | --- | --- |
| L* | 100 | 0 |
| Example 5 | 0 | 100 |

TABLE 10-continued

| component | Comparative | Ex. 5 |
|---|---|---|
| peroxide | 1.6 | 2 |
| stearic acid | 0.2 | 0.2 |
| ZnO | 2 | 2 |
| azide | 1.3 | 1.3 |

Property testing on the resulting foam strands is conducted in the following manner: Foam density is measured according to ASTM 792, abrasion resistance is measured according to ISO 4649, shrinkage is measured at room temperature after subjecting the sample to 70° C. for 40 minutes according to SATRA PM70, compression set is measured at room temperature after 1.5 and 24 hours of subjecting a sample to a temperature of 50° C. for 6 hours according to ISO 815, Shore A hardness is measured according to ISO 868, split tear is measured according to SATRA TM65 standards, and tensile strength and elongation are measured according DIN 53504. Results are reported in Table 11.

TABLE 11

Properties of crosslinked foams

| | Density kg/m³ | Abrasion mm³ | Percent Shrinkage | Percent Set 1.5 hr (24 hr) | Hardness shore A | Split tear N/mm | Tensile strength MPa | Elongation percent |
|---|---|---|---|---|---|---|---|---|
| L* | 371 | 300 | 3.25 | 66 (66) | 63 | 4.25 | 3.74 | 285 |
| Ex. 5 | 353 | 392 | 1.11 | 32.5 (27) | 50 | 4.81 | 3.21 | 400 |

The results of table 11 show that the thermal and mechanical properties of the crosslinked foam prepared from example 7 are better than those of the similarly prepared foam made from Comparative L. In particular, the foam prepared from Example 7 has lower shrinkage, lower compression set, and higher split tear and elongation than the comparative foam. These properties make the polymers of the invention well suited for use in many high performance foam applications, such as shoe soles, flooring, and construction materials.

Crosslinked Films using Electron Beam

Compression molded films of 0.4 mm thickness are crosslinked under nitrogen atmosphere using an electron beam radiation crosslinking unit (Sterigenics, San Diego). A total electron beam dosage of 22.4 Mrad is applied using a series of 7 passes through an electronic beam at 3.2 Mrad per pass. All examples showed a gel level between 75 and 90 percent as measured according to ASTM D-2765. The mechanical properties of the irradiated films are substantially unaffected by crosslinking. Although the inventive and comparative examples exhibit similar ultimate properties, the inventive examples exhibit higher percent recovery, retractive stress and stress relaxation than the comparative samples. Results are provided in Table 12.

TABLE 12

Properties of electron beam crosslinked films

| Example | Gel Content (percent) | Stress at Break (MPa) | Elongation at Break (percent) | 300% Strain Recovery (%) (21° C.) | Retractive Stress at 150% Strain (kPa) | Stress Relaxation at 50% Strain (%) |
|---|---|---|---|---|---|---|
| 5 | 75 | 16 | 864 | 75 | 815 | 28 |
| 12 | 83 | 12 | 720 | 80 | 819 | — |
| 13 | 87 | 14 | 734 | 77 | 852 | — |
| 16 | 87 | 5 | 471 | 84 | 1063 | — |
| 17 | 82 | 15 | 822 | 83 | 1010 | — |
| G* | 78 | 15 | 739 | 55 | 186 | 50 |
| H* | 83 | 16 | 738 | 59 | 316 | — |

Polypropylene Impact Modification

A series of impact modified isotactic polypropylene blends containing 20 percent by weight ethylene/octene elastomer are prepared on a Haake compounder supplied with a Leistritz 18 mm twin screw extruder (L/D=30), a K-TRON K2VT20 twin screw auger feeder, two refrigerated water circulation bath quench tanks, and a Berlyn PEL-2 4 blade strand chopper. The polypropylene used in all blends is PP-314-02Z hPP, available from The Dow Chemical Co. having a MFR of 2 dg/min measured according to ASTM D1238 (230° C., 2.16 kg).

A water circulator is attached to the jacket of the feed throat of the extruder and set at 20° C. to keep the polymer from melting and bridging the feed throat. The extruder temperature zones are set at 120, 165, 190, 230, and 230° C., respectively. The extruder die is set at 230° C. Prior to extrusion a lid supplied with a nitrogen line is placed on top of the feed hopper. The transition area from the feeder discharge to the extruder feed throat cone is sealed with heavy aluminum foil. The extruder is preheated, calibrated, and run empty for several minutes with nitrogen flowing throughout the system to purge it of oxygen. Three kilogram samples to be melt blended are prepared by hand tumbling the combined components in a plastic bag prior to extrusion.

Injection molded test bars are prepared from polymer samples and tested for 23° C. notched Izod impact according to ASTM D-256 and flexural modulus according to ASTM D-790. Injection Molding Conditions are as follows. The samples are injection molded at a melt temperature of 243° C., pack time of 6.7 sec at 3400 psi (23 MPa) pressure, hold time of 12 sec at 3400 psi (23 MPa) pressure, and total cycle time of 28 seconds. Component details and results are contained in Table 13.

TABLE 13

| Sample | Elastomer Component | 23° C. Notched Izod ft.-lbs./inch (N) | Flexural Modulus kpsi (MPa) |
|---|---|---|---|
| a | Ex. 5 | 7.0 (3.7) | 124 (855) |
| b | Ex. 8 | 9.6 (5.1) | 145 (1000) |
| c | H[1] | 6.4 (3.4) | 132 (910) |
| d* | L[2] | 6.5 (3.5) | 139 (958) |

*Comparative, not an example of the invention
[1]AFFINITY ™ EG8100: 0.87 g/cm$^3$, 1 g/10 min (I2), available from The Dow Chemical Co.
[2]ENGAGE ™ VP8770: 0.885 g/cm$^3$, 1 g/10 min (I2), available from The Dow Chemical Co.

The results of Table 13 indicate that the multiblock copolymers of the invention are highly effective as impact modifiers when blended with isotactic polypropylene. Surprisingly, sample a made with the polymer of Example 5 made with a higher ratio of chain shuttling agent/total catalyst resulting in a greater number of blocks per polymer molecule (a more "blocky" polymer) shows even lower modulus and impact strength than sample b, which is compounded with the polymer of Example 8, which is a less "blocky" polymer. This observation indicates that the level of blockiness, as controlled by the amount of chain shuttling agent, in the multi-block copolymers of the invention can strongly affect the stiffness/toughness balance of polymer blends.

Figure 51:
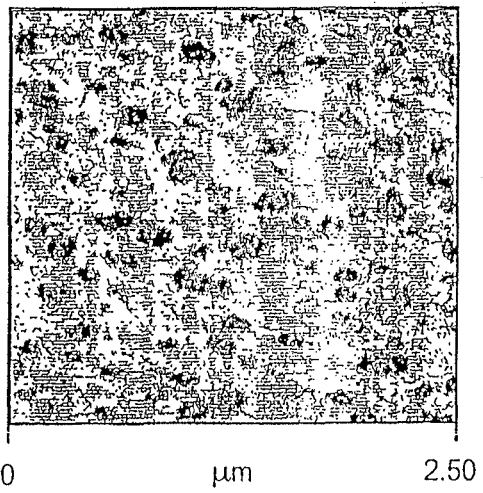
FIGS. 51-53 are atomic force microscopic images of microtomed samples of injection molded plaques of impact modified isotactic polypropylene corresponding to samples a, b and d of Table 13, respectively.
Figure 52:
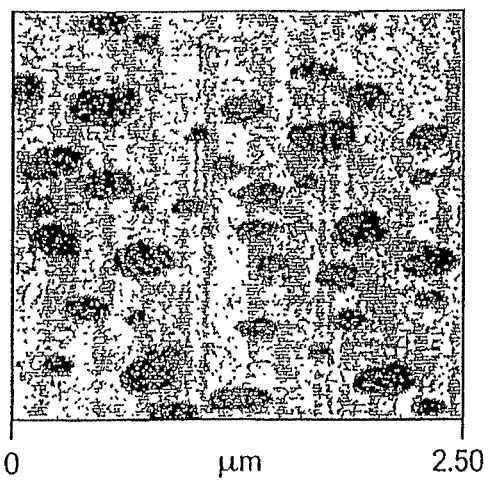
Figure 53:
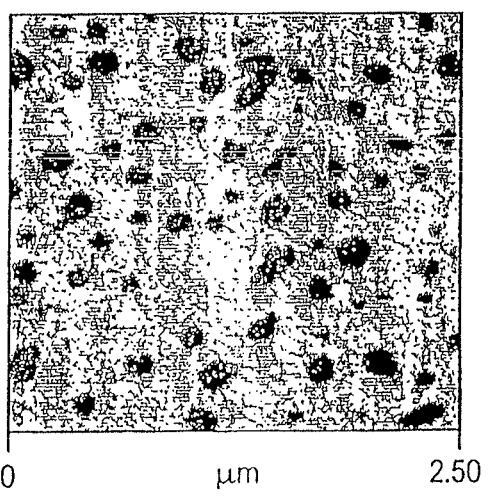

Additional evidence of the difference in polymer blend properties is apparent from a comparison of FIGS. 51-53, which are atomic force microscopic images of osmium tetroxide stained microtomed samples of injection molded plaques b, a and d, respectively. In the micrographs, the dark areas are the ethylene/octene copolymer elastomer while the lighter areas are the propylene homopolymers matrix. It can be seen from the micrographs that the multi-block copolymers made with low CSA to catalyst molar ratios (low "blockiness" copolymers) surprisingly produce core-shell morphology in the blends (FIG. 51). High CSA ratio multi-block copolymers (FIG. 52) exhibit domains of apparently solid elastomer similar in appearance to the results obtained using conventional ethylene/octene impact modifiers (FIG. 53).

The advantages of having the unique morphology shown in FIG. 51 (occluded rubber morphology) include: excellent stiffness/toughness balance, high impact efficiency (lower amount of rubber to achieve a given toughness) and higher brush resistance (lower tendency for stress whitening). Moreover, the refractive index of the elastomer is readily varied by controlling the amount of occlusions present. This allows greater ability to match the refractive index of the elastomer with the matrix polymer, resulting in blends exhibiting a better balance of optical clarity, stiffness, toughness and brush resistance. Additionally, such blends (that is, blends comprising lower blockiness multi-block copolymers) exhibit higher heat distortion temperature, improved morphological stability (retention of polymer properties after multiple processing steps). Previously, such properties were only obtainable in blend comprising additional components, such as three component blends of elastomer, high density polyethylene and isotactic polypropylene.

Preparation of Blown Film Samples

Samples of a multi-block copolymer (Example 14) and a convention ethylene/octene copolymer (Comparative I) are formed into single layer films using a laboratory blown film line. Polymer samples are melted in an extruder, passed through a ring die, expanded with air, cooled, and slit into bi-directional oriented films. Film forming conditions are provided in Table 14:

TABLE 14

| Blown Film Conditions: | | |
|---|---|---|
| Sample | I* | Ex. 14 |
| Zone 1, ° C. | 176 | 176 |
| Zone 2, ° C. | 206 | 204 |
| Zone 3, ° C. | 216 | 204 |
| Zone 4, ° C. | 216 | 210 |
| Screen Changer ° C. | 221 | 210 |
| Adapter ° C. | 232 | 210 |
| Die 1, ° C. | 232 | 210 |
| Die 2, ° C. | 232 | 210 |
| Screw Speed rpm | 48.3 | 49.2 |
| Melt Temp, ° C. | 234 | 234 |
| Extruder Power Consumption Amps | 12 | 9 |
| Pressure (MPa) | 9600 | 7600 |
| Nip Speed M/sec | 4.4 | 5.2 |
| Air Blower M$^3$/minute | 0.8 | 0.7 |
| Film Thickness mm | 0.05-0.06 | 0.04-0.05 |

Samples of the resulting films are tested for normalized film tear resistance in cross direction (CD) and machine direction (MD) according to ASTM D1922; blocking properties according to ASTM D3354-96; and coefficient of friction (COF), according to ASTM D1894-01. Results are contained in Table 15.

TABLE 15

| | | | Blown Film Properties | | | | | |
|---|---|---|---|---|---|---|---|---|
| polymer | Density g/cm$^3$ | MI dg/min | Normalized CD Tear g/0.001 in (kg/m) | Normalized MD Tear g/0.001 in (kg/m) | CD/ MD | Blockage g | Kinetic COF | Static COF |
| Ex. 14 | 0.912 | 2.6 | 668 (1700) | 468 (1200) | 1.43 | 60 | 1.9 | 3.7 |
| Comp. I*[1] | 0.909 | 1.0 | 480 (1200) | 291 (700) | 1.65 | 90 | 2.5 | 5.2 |

[1]Affinity ™ PL 1840, available from The Dow Chemical Company

The film prepared from the polymer of example 15 shows both higher CD and MD tear than the film made from Comparative I polymer. Additionally, it exhibits a more balanced tear (smaller CD/MD ratio) than the comparative film. Both the blocking force and COF for the film made from example 14 are lower than those for Comparative I. This combination of film properties indicates that films made from multi-block copolymers according to the invention have greater tear resistance and higher blocking resistance than films made from conventional ethylene/octene copolymers.

Preparation of Oil Extended Polymer Blends

Compounded blends are prepared at 190° C. in a preheated Haake Rheomix™ 600 mixer of 69 ml volume. The rotors are turned at a drive speed of 50 rpm while the polymer is added and worked into a melt. By monitoring the torque of the mixer, melting is verified. Once melting of the polymer is accomplished, a paraffinic oil (RENOIL™ 625, available from Renkert Oil, Inc.) is added by syringe to the molten polymer. Once oil addition had been completed the ram seal is lowered on to the melt and mixing continued for 15 minutes. Total mass of oil and polymer is 55 grams. The rotors are then stopped, the bowl opened and the resulting blend removed, flattened and cooled in a press.

Blended and unblended polymers are compression molded into 5"×5"×0.125" (125×125×3 mm) plaques on a laminating press under the following conditions:

1) 3 minutes no pressure at 190° C.,
2) 2 minutes at ram force 30,000 pounds (133 kN) at 190° C., and then
3) 3 minutes at 25° C. at ram force 30,000 pounds (13 kN).

The resulting plaques are measured for Shore A hardness with a hand held durometer and for heat resistance (TMA). Reported hardness results are the average of 5 measurements at 1 and 5 second durations made at random points on the plaque surface. Results are reported in Table 16.

TABLE 16

| Properties of oil extended polymers | | |
|---|---|---|
| sample | Shore A | TMA |
| Ex. 17 | 74 | 108 |
| Comp. H*[1] | 76 | 68 |
| 70 percent Example 17/30 percent Oil | 55 | 86 |
| 60 percent Comp. H*/40 percent Oil | 52 | 48 |

[1]An elastomeric, substantially linear ethylene/1-octene copolymer, AFFINITY ™ EG8100, available from The Dow Chemical Company The results of Table 16 indicate that the inventive polymer has similar Shore A hardness as the comparative polymer but shows about 40° C. higher TMA temperature. Surprisingly, the 30 weight percent oil extended polymer has a similar Shore A hardness to the 40 percent oil filled comparative polymer but has more than 30° C. higher TMA temperature. This result demonstrates that the polymer of Example 17 exhibits higher oil acceptance and better retention of thermal and mechanical properties such as heat resistance as measured by TMA temperature, and tensile strength compared to the comparative H polymer. This combination of low hardness and high TMA temperature is useful in many soft elastomer applications such as soft touch molded articles and pressure sensitive adhesive applications.

Example 20

Method for Selecting Catalyst A/Shuttling Agent Pair

Figure 32:
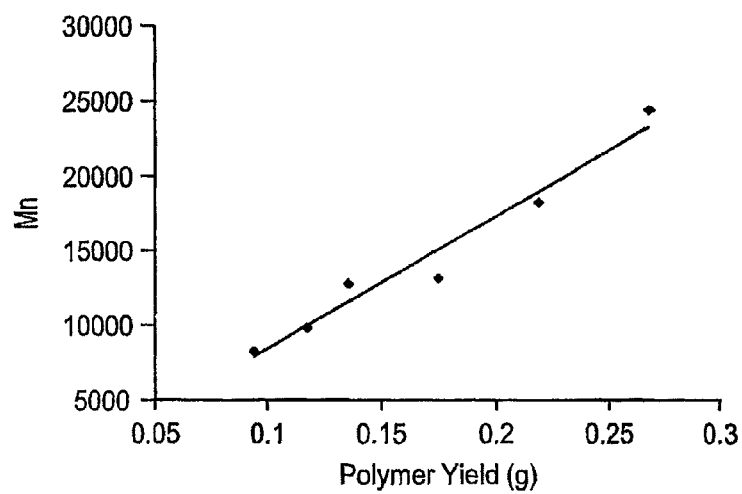
FIGS. 32 and 33 are plots of the polymer number average molecular weight (Mn) as a function of yield for the polymerizations conducted in Examples 27 and 28 respectively.

A series of ethylene/1-octene copolymerizations are conducted using differing catalyst/shuttling agent molar ratios and monomer conversions. The cocatalyst employed in all polymerizations is Cocatalyst 2. The resulting polymers are measured for molecular weight (Mw and Mn) using GPC. Polydispersity Index (PDI=Mw/Mn) is calculated for each polymer. Results are tabulated in Table 17 and plotted in FIG. 32. In FIG. 32, the line is statistical fit to the data with a $R^2$ value of 0.961.

i). A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 15 seconds, the reaction is quenched by addition of CO. The glass insert is removed and volatile components removed under vacuum. Polymer yield=0.0938 g. Mw=14,560; Mn=8,267; PDI 1.76.

ii) A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 30 seconds, the reaction is quenched by addition of CO. The glass insert is removed and volatile components removed under vacuum. Polymer yield=0.1173 g. Mw=16,677; Mn=9,774; PDI=1.71.

iii) A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 51 seconds, the reaction is quenched by addition of CO. The glass insert is removed and volatile components removed under vacuum. Polymer yield=0.1360 g. Mw=20,557; Mn=12,773; PDI=1.61.

iv) A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 98 seconds, the reaction is quenched by addition of CO. The glass insert is removed and volatile components removed under vacuum. Polymer yield=0.1748 g. Mw=26,379; Mn=13,161; PDI=2.00.

v) A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 291 seconds, the reaction is quenched by addition of CO. The glass insert is removed and volatile components removed under vacuum. Polymer yield=0.2191 g. Mw=33,777; Mn=18,201; PDI=1.86.

vi) A 6-mL reaction vessel containing a glass vial insert is charged with mixed alkanes (2.70 mL) and then pressurized to 110 psi (0.77 MPa) with ethylene. Octene (100 uL), and then a mixture of cocatalyst (4.2 mM in toluene, 0.100 mL, 420 nmol) and diethylzinc (10 umol) is added via syringe. Catalyst (A) (3.5 mM in toluene, 0.100 mL, 350 nmol) was added via syringe. After 1201 seconds, the reaction is quenched by addition of CO. The glass insert is removed and volatile components removed under vacuum. Polymer yield=0.2681 g. Mw=46,539; Mn=24,426; PDI=1.91.

TABLE 17

| Run | Polymerization Time (sec) | Yield (g) | Mn | Mw | PDI |
|---|---|---|---|---|---|
| i | 15 | 0.0938 | 8267 | 14560 | 1.76 |
| ii | 30 | 0.1173 | 9774 | 16677 | 1.71 |
| iii | 51 | 0.1360 | 12773 | 20557 | 1.61 |
| iv | 98 | 0.1748 | 13161 | 26379 | 2.00 |
| v | 291 | 0.2191 | 18201 | 33777 | 1.86 |
| vi | 1201 | 0.2681 | 24426 | 46539 | 1.91 |

These results demonstrate that chain shuttling behavior (both forward and reverse polymeryl exchange) between Catalyst (A) and diethylzinc chain shuttling agent occurs during polymerization due to the fact that Mn of the resulting polymer increases linearly with polymer yield, while the PDI remains less than or equal to two for all polymerizations.

Example 21

Method for Selecting Catalyst B2/Shuttling Agent Pair

Figure 33:
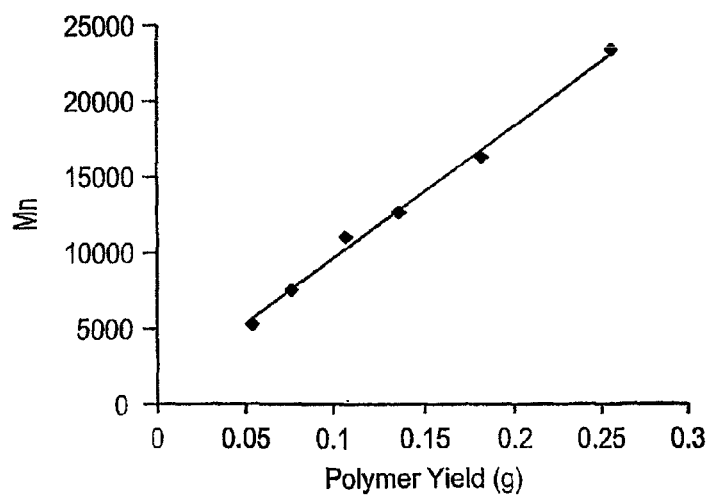

A series of ethylene/1-octene polymerizations are conducted using differing catalyst/shuttling agent molar ratios and monomer conversions with cocatalyst 2. The resulting polymers are measured for molecular weight (Mw and Mn) using GPC. Polydispersity Index (PDI=Mw/Mn) is calculated for each polymer. Results are tabulated in Table 18 and plotted in FIG. 33. In FIG. 33, the line is statistical fit to the data with a $R^2$ value of 0.995.

i). A 6-mL reaction vessel containing a glass vial insert is charged with mixed alkanes (2.334 mL) and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 18 seconds, the reaction is quenched by addition of CO. The glass insert is removed and volatile components removed under vacuum. Polymer yield=0.0542 g. Mw=7,626; Mn=5,281; PDI=1.44.

ii) A 6-mL reaction vessel containing a glass vial insert is charged with mixed alkanes (2.334 mL), and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 39 seconds, the reaction is quenched by addition of CO. The glass insert is removed and volatile components removed under vacuum. Polymer yield=0.0769 g. Mw=10.501; Mn=7,523; PDI=1.40.

iii) A 6-mL reaction vessel containing a glass vial insert is charged with mixed alkanes (2.334 mL), and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 59 seconds, the reaction is quenched by addition of CO. The glass insert is removed and volatile components removed under vacuum. Polymer yield=0.1071 g. Mw=15,840; Mn=10,971; PDI=1.44.

iv) A 6-mL reaction vessel containing a glass vial insert is charged with mixed alkanes (2.334 mL), and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 103 seconds, the reaction is quenched by addition of CO. The glass insert is removed and volatile components removed under vacuum. Polymer yield=0.1365 g. Mw=21,664; Mn=12,577; PDI=1.72.

v) A 6-mL reaction vessel containing a glass vial insert is charged with mixed alkanes (2.334 mL), and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 173 seconds, the reaction is quenched by addition of CO. The glass insert is removed and volatile components removed under vacuum. Polymer yield=0.1829 g. Mw=25,221; Mn=16,245; PDI=1.55.

vi) A 6-mL reaction vessel containing a glass vial insert is charged with mixed alkanes (2.334 mL), and then pressurized to 110 psi (0.77 MPa) with ethylene. Octene (200 uL), and then a mixture of cocatalyst (1.8 mM in toluene, 0.233 mL, 419 nmol) and diethylzinc (10 umol) is added via syringe. Catalyst (B2) (1.5 mM in toluene, 0.233 mL, 350 nmol) was added via syringe. After 282 seconds, the reaction is quenched by addition of CO. The glass insert is removed and volatile components removed under vacuum. Polymer yield=0.2566 g. Mw=35,012; Mn=23,376; PDI=1.50.

TABLE 18

| Run | Polymerization Time (sec) | Yield (g) | Mn | Mw | PDI |
|---|---|---|---|---|---|
| i | 18 | 0.0542 | 5281 | 7626 | 1.44 |
| ii | 39 | 0.0769 | 7523 | 10501 | 1.40 |
| iii | 59 | 0.1071 | 10971 | 15840 | 1.44 |
| iv | 103 | 0.1365 | 12577 | 21664 | 1.72 |
| v | 173 | 0.1829 | 16245 | 25221 | 1.55 |
| vi | 282 | 0.2566 | 23376 | 35012 | 1.50 |

These results demonstrate that chain shuttling behavior (both forward and reverse polymeryl exchange) between Catalyst (B2) and diethylzinc chain shuttling agent occurs during polymerization due to the fact that Mn of the resulting polymer increases linearly with polymer yield, while the PDI remains less than two, and usually less than 1.5 for all polymerizations.

Example 22

Combinatorial Screening of Catalyst/Shuttling Agent pairs

The reaction conditions of Examples 1-4 are substantially repeated using various catalysts, cocatalyst 1 and potential shuttling agents. Over 500 reactions are performed. The resulting ethylene/1-octene copolymers are tested for Mn and PDI and polymer production rate compared to rates obtained from a control using MMAO in place of the shuttling agent. The best compositions are then selected based on a combination of greatest molecular weight (Mn) reduction, greatest reduction in PDI, and least reduction (or actual increase) in polymerization rate. Selected combinations showing the best results (ranked by Mn reduction) are presented in Table 19.

TABLE 19

| Run | Catalyst | Shuttling Agent | Relative Mn | Relative PDI | Relative rate |
|---|---|---|---|---|---|
| i | A1 | SA7 | 0.07 | 0.88 | 1.33 |
| ii | " | SA5 | 0.18 | 0.85 | 0.57 |
| iii | " | SA15 | 0.19 | 0.93 | 6.29 |
| iv | A2 | SA19 | 0.27 | 0.73 | 0.18 |
| v | A3 | SA2 | 0.29 | 0.80 | 9.74 |
| vi | " | SA8 | 0.38 | 1.01 | 1.15 |
| vii | " | SA7 | 0.60 | 1.06 | 1.38 |
| viii | " | SA11 | 0.65 | 1.04 | 1.43 |
| ix | " | SA3 | 0.65 | 0.86 | 4.61 |
| x | " | SA17 | 0.66 | 0.95 | 6.36 |
| xi | " | SA20 | 0.68 | 0.82 | 4.37 |
| xii | B1 | SA9 | 0.52 | 1.12 | 2.32 |
| xiii | " | SA7 | 0.53 | 1.07 | 0.91 |
| xiv | " | SA11 | 0.59 | 1.11 | 2.47 |
| xv | " | SA14 | 0.69 | 1.07 | 2.12 |
| xvi | " | SA18 | 0.69 | 1.10 | 3.16 |
| xvii | " | SA12 | 0.70 | 1.07 | 0.97 |
| xviii | " | SA5 | 0.93 | 0.95 | 0.81 |
| xix | C1 | SA2 | 0.29 | 0.92 | 0.71 |
| xx | " | SA13 | 0.59 | 0.97 | 0.93 |
| xxi | " | SA3 | 0.63 | 0.95 | 0.93 |
| xxii | " | SA5 | 0.79 | 1.10 | 1.19 |
| xxiii | C2 | SA13 | 0.83 | 0.92 | 0.67 |
| xxiv | C3 | SA6 | 0.63 | 0.96 | 0.66 |
| xv | " | SA7 | 0.74 | 1.15 | 0.96 |
| xvi | D1 | SA14 | 0.54 | 1.10 | 1.14 |
| xvii | " | SA10 | 0.59 | 1.10 | 0.77 |
| xviii | " | SA5 | 0.74 | 1.01 | 0.72 |
| xix | " | SA16 | 0.82 | 1.05 | 2.62 |

By reference to Table 19, suitable combinations of catalyst and shuttling agent may be selected. It is to be emphasized that preferred catalyst/shuttling agent combinations, in different embodiments, may be selected based on a desired objective, such as maximum reduction in Mn or improvement in production rate coupled with more modest Mn reduction. Additionally, the above results are based on a single catalyst/shuttling agent combination, whereas in practice, the effect, if any, of the presence of one or more additional catalysts or use of continuous polymerization conditions must also be considered in selecting a combination of catalysts and shuttling agent(s).

Example 23

Functionalized Multi-Block Copolymer Formation

A 1 L reactor is charged with 600 mL of dry, deoxygenated hexane and 40 mmol of diethyl zinc and heated to 100° C. under nitrogen. The reactor is then pressurized to 10 psi (70 kPa) with ethylene. A mixture of 10 μm of catalyst (A1), 10 μmole of catalyst (B1), and 50 micromoles of MMAO is then injected into the reactor and ethylene fed on demand to maintain 10 psi (70 kPa) for 40 minutes. The reactor is then vented and cooled to ambient temperature and purged with nitrogen for 20 minutes. While vigorously purging with nitrogen, a stream of air is introduced into the bottom of the reactor for 1 hour and the resulting slurry stirred an additional hour. The reaction product slurry is then removed from the reactor, stirred with water and dried to give 25.5 g of polymer. GPC analysis reveals Mw=1271, Mn=1018, Mw/Mn=1.25. NMR analysis reveals 27 percent conversion of possible zinc-terminated chain ends to hydroxyl-terminated chain ends.

Examples 24-28

Ethylene/1-Butene Copolymerization

Figure 36:
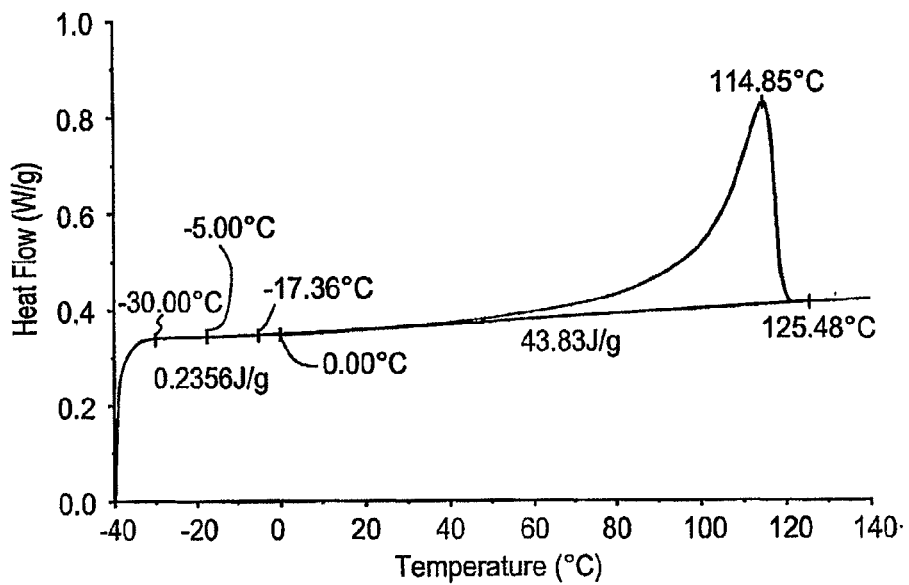
FIGS. 36-49 are DSC heating curves and corresponding CRYSTAF reports for the polymers of Examples 24-33 and Comparatives M-P, respectively, including peak temperature assignments and weight fraction integrations for the areas corresponding to the respective peak temperatures.
Figure 36:
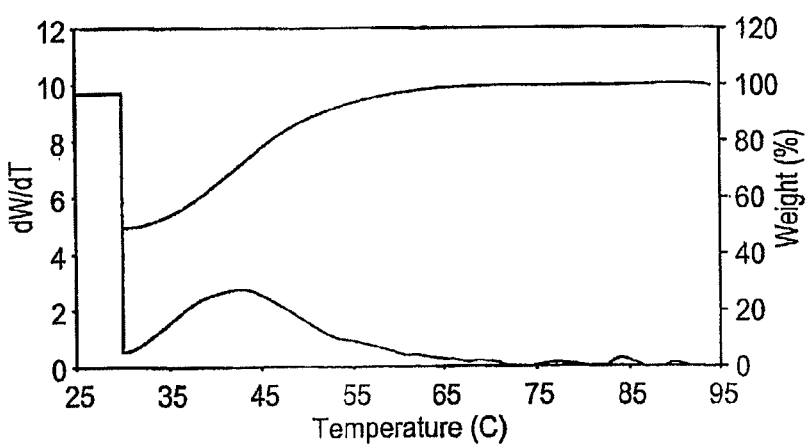

Continuous solution polymerizations are carried out following the procedure described above for Examples 5-19 with the following exceptions, the comonomer used in all examples is 1-butene and for Examples 25 a mixture of DEZ and MAO (99:1 molar ratio) is used as the chain shuttling agent (CSA). Process details and results are contained in Table 19. It may be seen that the mixture of chain shuttling agents results in approximately 40 percent improvement in efficiency while preparing substantially similar products (density=0.88, 12=2). Selected polymer properties are provided in Tables 21-24. Polymer thermal properties are as follows:

The DSC curve in FIG. 36 for the polymer of example 24 shows a peak with a 114.9° C. melting point with a heat of fusion of 44.1 J/g. The corresponding CRYSTAF curve shows the tallest peak at 42.6° C. with a peak area of 48.4 percent. The difference between the DSC Tm and the Tcrystaf is 72.3° C.

Figure 37:
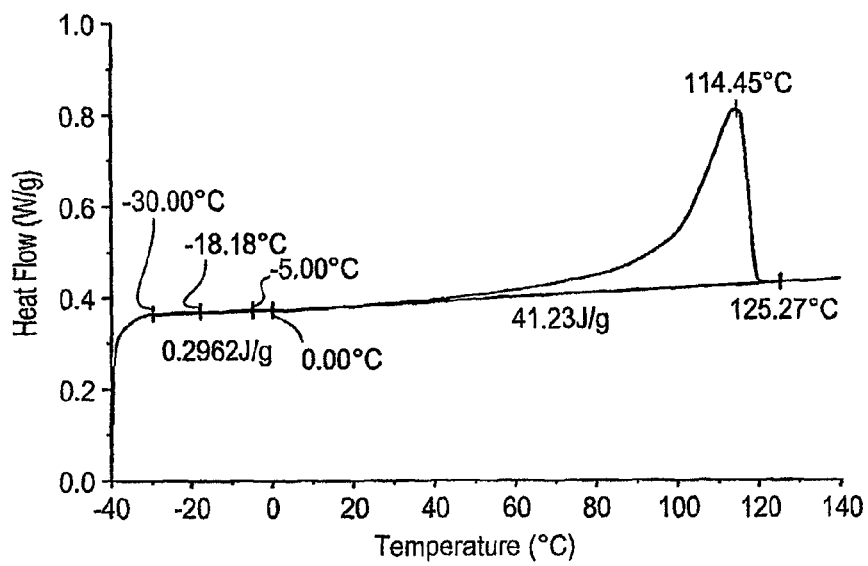
Figure 37:
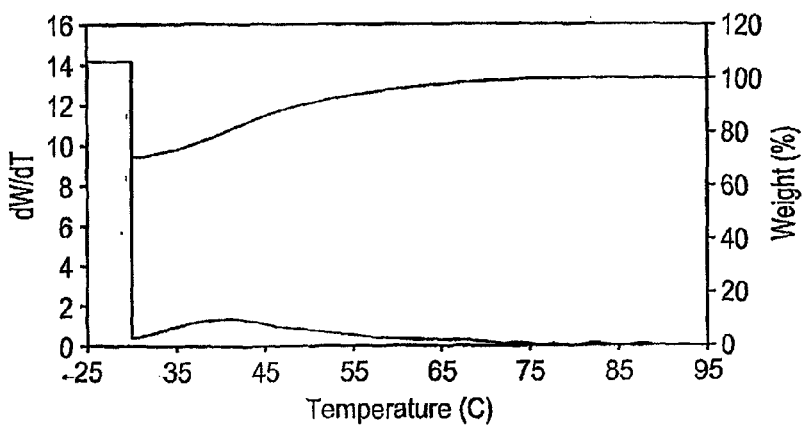

The DSC curve in FIG. 37 for the polymer of example 25 shows a peak with a 114.5° C. melting point with a heat of fusion of 41.5/g. The corresponding CRYSTAF curve shows the tallest peak at 41.0° C. with a peak area of 24.2 percent. The difference between the DSC Tm and the Tcrystaf is 73.5° C.

Figure 38:
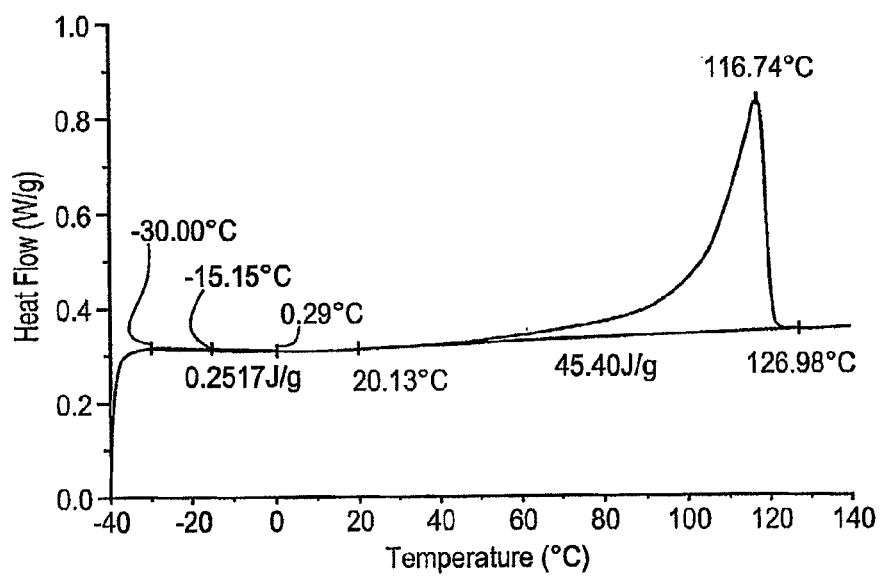
Figure 38:
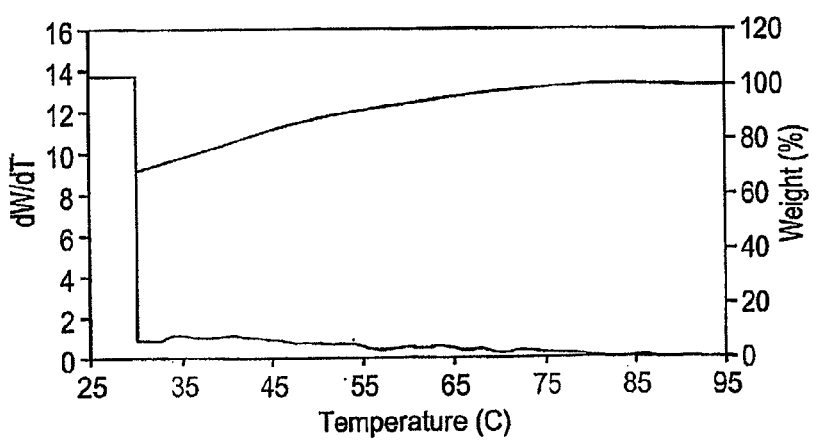

The DSC curve in FIG. 38 for the polymer of example 26 shows a peak with a 116.7° C. melting point with a heat of fusion of 45.7 J/g. The corresponding CRYSTAF curve shows the tallest peak at 40.2° C. with a peak area of 6.1 percent. The difference between the DSC Tm and the Tcrystaf is 76.5° C.

Figure 39:
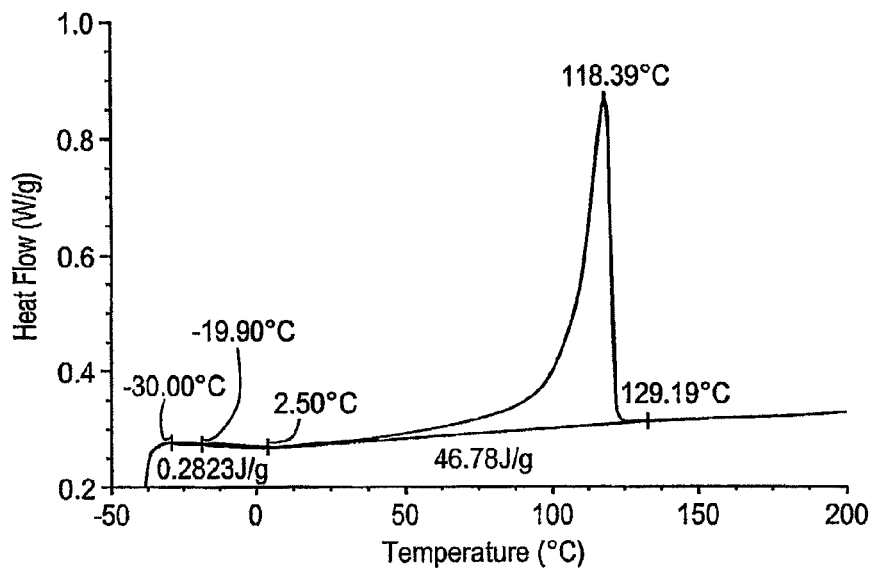
Figure 39:
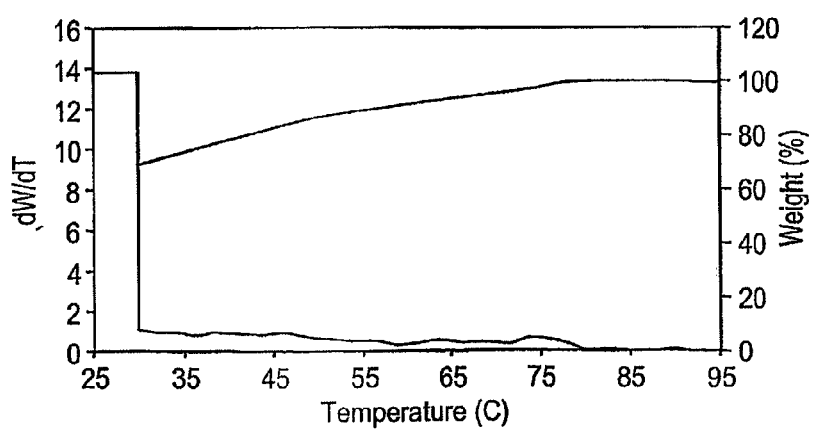

The DSC curve in FIG. 39 for the polymer of example 27 shows a peak with a 118.4° C. melting point with a heat of fusion of 47.1 J/g. The corresponding CRYSTAF curve shows the tallest peak at 40.2° C. with a peak area of 6.1 percent. The difference between the DSC Tm and the Tcrystaf is 79.8° C.

Figure 40:
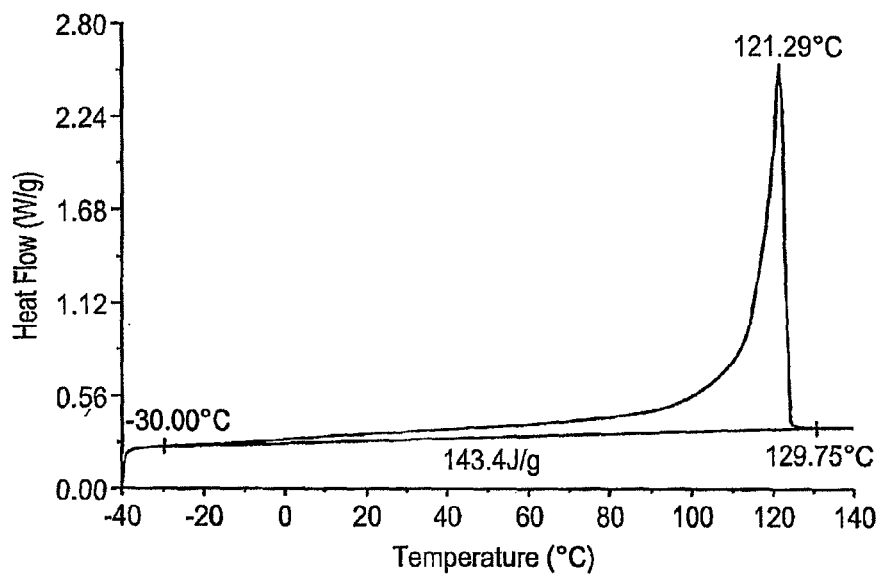
Figure 40:
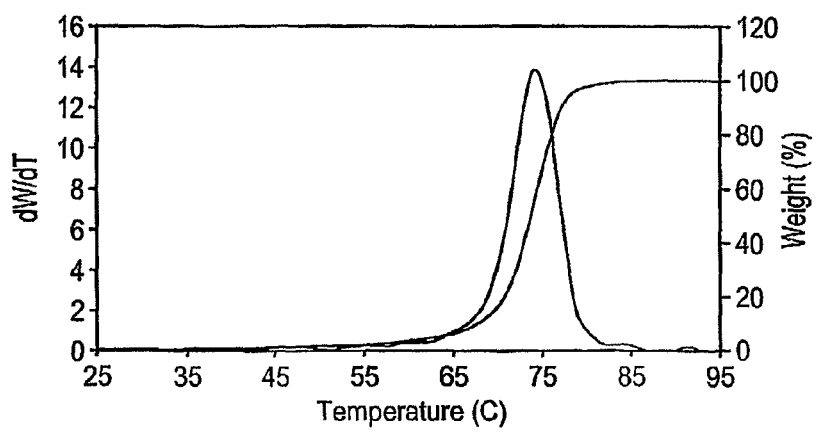

The DSC curve in FIG. 40 for the polymer of example 28 shows a peak with a 121.3° C. melting point with a heat of fusion of 143.4 J/g. The corresponding CRYSTAF curve shows the tallest peak at 74.4° C. with a peak area of 96.6 percent. The difference between the DSC Tm and the Tcrystaf is 46.9° C.

TABLE 20

Process Conditions

| Ex. | C$_4$H$_8$ kg/hr | Solv. kg/hr | H$_2$ sccm[1] | T °C. | A1[2] Conc ppm | A1 Flow kg/hr | Cat. B2[3] ppm | B2 Flow kg/hr | CSA Conc % | CSA Flow kg/hr | Cocat Conc. ppm | Cocat Flow kg/hr | [C$_2$H$_4$]/ [DEZ][6] | Poly Rate[7] kg/hr | Conv %[8] | Solids % | Eff.[9] |
|---|---|---|---|---|---|---|---|---|---|---|---|---|---|---|---|---|---|
| 24 | 2.04 | 9.55 | 0 | 120 | 95.08 | 0.11 | 41.02 | 0.05 | 0.92[4] | 0.07 | 1452 | 0.06 | 373 | 1.61 | 90.6 | 12.3 | 172.5 |
| 25 | " | " | " | " | " | 0.07 | " | 0.04 | 0.92[5] | 0.08 | " | 0.08 | 440 | 1.74 | 89.5 | 13.2 | 134.7 |
| 26 | " | 11.36 | 6.43 | " | " | 0.06 | " | 0.08 | 0.92[4] | 0.04 | " | 0.05 | 859 | 1.72 | 89.9 | 11.6 | 234.0 |
| 27 | " | 11.36 | 14.33 | " | " | " | " | 0.07 | 0.92[4] | " | " | 0.05 | 760 | 1.76 | 91.1 | 11.9 | 256.2 |
| 28 | 0.82 | 11.36 | 0 | " | " | " | " | 0.18 | 0.89[5] | 0.10 | 1662 | 0.06 | 310 | 1.30 | 90.5 | 9.4 | 137.2 |

[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]the CSA was DEZ without added MAO
[5]the CSA was a mixture of DEZ and MAO in a 99:1 molar ratio
[6]molar ratio in reactor
[7]polymer production rate
[8]percent ethylene conversion in reactor
[9]efficiency, kg polymer/g M where g M = g Hf + g Zr

TABLE 21

Physical Property Testing

| Ex. | Density (g/cm$^3$) | I2 | I10 | I10/I2 | Mw (g/mol) | Mn (g/mol) | Mw/Mn | Heat of Fusion (J/g) | Tm (° C.) | Tc (° C.) | T$_{CRYSTAF}$ (° C.) | Tm − T$_{CRYSTAF}$ (° C.) | CRYSTAF Peak Area (percent) |
|---|---|---|---|---|---|---|---|---|---|---|---|---|---|
| 24 | 0.8802 | 2.0 | 12.8 | 6.3 | 92100 | 44300 | 2.1 | 44 | 115 | 94 | 43 | 72 | 48 |
| 25 | 0.8792 | 1.4 | 9.4 | 6.5 | 97700 | 48000 | 2.0 | 41 | 114 | 93 | 41 | 73 | 24 |
| 26 | 0.8796 | 1.4 | 9.3 | 6.5 | 108400 | 55000 | 2.0 | 45 | 117 | 98 | 40 | 77 | 6 |
| 27 | 0.8815 | 0.9 | 6.5 | 6.9 | 121800 | 57300 | 2.1 | 48 | 118 | 99 | 39 | 80 | 6 |
| 28 | 0.9192 | 1.1 | 6.7 | 6.1 | 103500 | 54500 | 1.9 | 140 | 121 | 108 | 74 | 47 | 97 |

TABLE 22

Ethylene-Butene Copolymer High Temperature Mechanical Properties

| Ex. | G'(25° C.)/ G'(100° C.) | 300% Strain Recovery (80° C.) (percent) | Compression Set (70° C.) (percent) |
|---|---|---|---|
| 24 | 5.3 | Failed | 48 |
| 25 | 4.6 | Failed | 46 |
| 26 | 3.2 | Failed | 43 |
| 27 | 3.2 | Failed | 44 |
| 28 | 8.6 | — | — |

TABLE 23

Ethylene-Butene Copolymer Ambient Temperature Mechanical Properties

| Ex. | Flex Mod. (MPa) | Tensile Mod. (MPa) | Tensile Stren. (MPa) | Elong. at Break (%) | Tensile Notched Tear Strength (mJ) | 300% Strain Recovery 21° C. (percent) | Retractive Stress at 150% Strain (kPa) | Compress. Set 21° C. (Percent) | Stress Relaxation at 50% Strain |
|---|---|---|---|---|---|---|---|---|---|
| 24 | 28 | 19 | 11.1 | 1619 | 730 | 84 | 1014 | 19 | 32 |
| 25 | 28 | 20 | 11.7 | 1617 | 720 | 85 | 1011 | 10 | — |
| 26 | 26 | 18 | 11.6 | 1658 | 970 | 85 | 965 | 20 | — |
| 27 | 29 | 21 | 13.0 | 1452 | 1060 | 85 | 973 | 5 | — |
| 28 | 334 | 232 | 34.3 | 980 | 350 | — | — | — | — |

TABLE 24

Ethylene-Butene Copolymer Optical Properties

| Ex. | Internal Haze (percent) | Clarity (percent) | 45° Gloss (percent) |
|---|---|---|---|
| 24 | 33 | 73 | 42 |
| 25 | 33 | 72 | 44 |
| 26 | 34 | 74 | 50 |
| 27 | 17 | 75 | 61 |
| 28 | 62 | 64 | 50 |

Examples 29-33, Comparatives M-P

The reaction conditions of Examples 1-4 are substantially repeated to prepare copolymers of ethylene and a variety of aliphatic comonomers (1-hexene, 1-octene, 1-decene, 1,5-hexadiene, and 4-methyl-1-pentene). The chain shuttling agent used is trioctylaluminum (SA5). MAO is substituted for the CSA for comparatives M-P. Process details are recited in Table 25. Polymer properties are contained in Table 26.

TABLE 25

Process Data

| Ex. | Comonomer | Comon (μL) | Cat. (A1) (μmol) | Cat (B1) (μmol) | Cocat 1 (μmol) | MMAO (μmol) | SA1 (μmol) | Yield (g) |
|---|---|---|---|---|---|---|---|---|
| M* | 1-octene | 314 | 0.06 | 0.10 | 0.192 | 0.8 | — | 0.1894 |
| 29 | 1-octene | 314 | 0.06 | 0.10 | 0.192 | — | 10 | 0.2765 |
| N* | 1-decene | 379 | 0.06 | 0.10 | 0.192 | 0.8 | — | 0.2208 |
| 30 | 1-decene | 379 | 0.06 | 0.10 | 0.192 | — | 10 | 0.2474 |
| O* | 1-hexene | 250 | 0.06 | 0.10 | 0.192 | 0.8 | — | 0.1695 |
| 31 | 1-hexene | 250 | 0.06 | 0.10 | 0.192 | — | 10 | 0.2497 |
| 32 | 1,5-hexadiene | 237 | 0.06 | 0.10 | 0.192 | — | 10 | 0.2965 |
| P* | 4-methyl-1-pentene | 253 | 0.06 | 0.10 | 0.192 | 0.8 | — | 0.1276 |
| 33 | 4-methyl-1-pentene | 253 | 0.06 | 0.10 | 0.192 | — | 10 | 0.2267 |

Figure 41:
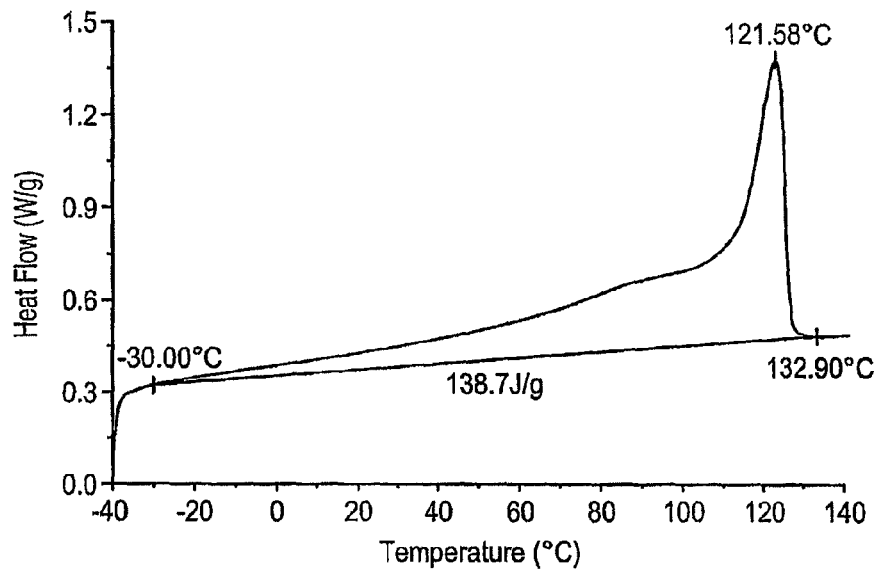
Figure 41:
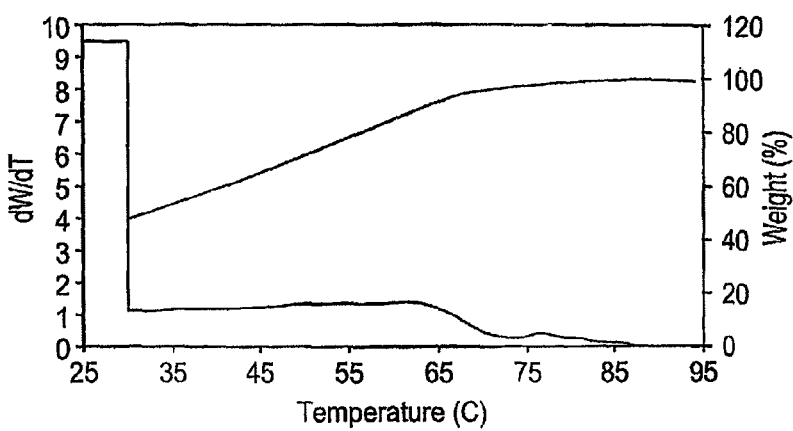

Thermal properties of the resulting polymers are as follows:

The DSC curve in FIG. 41 for the polymer of example 29 shows a peak with a 121.6° C. melting point with a heat of fusion of 138.7 J/g. The corresponding CRYSTAF curve shows the tallest peak at 61.0° C. with a peak area of 17.8 percent. The difference between the DSC Tm and the Tcrystaf is 60.6° C.

Figure 42:
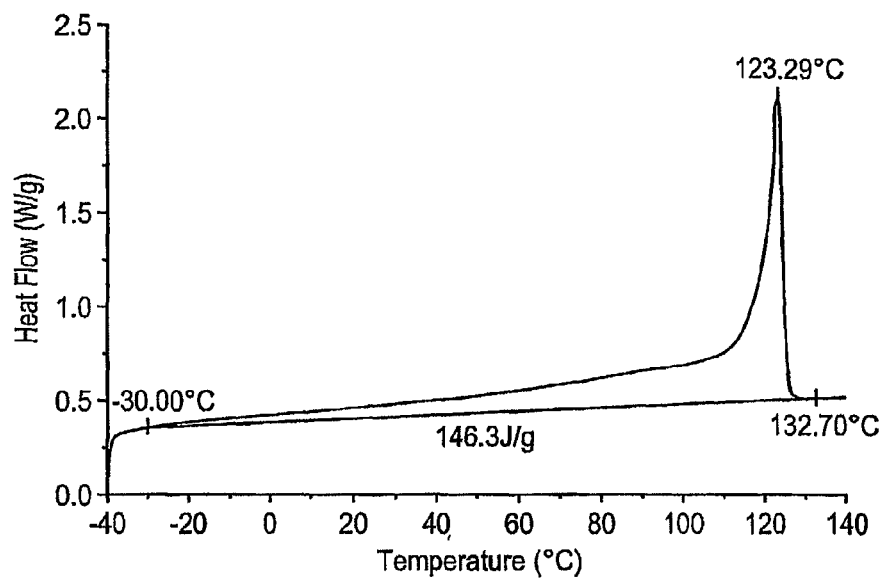
Figure 42:
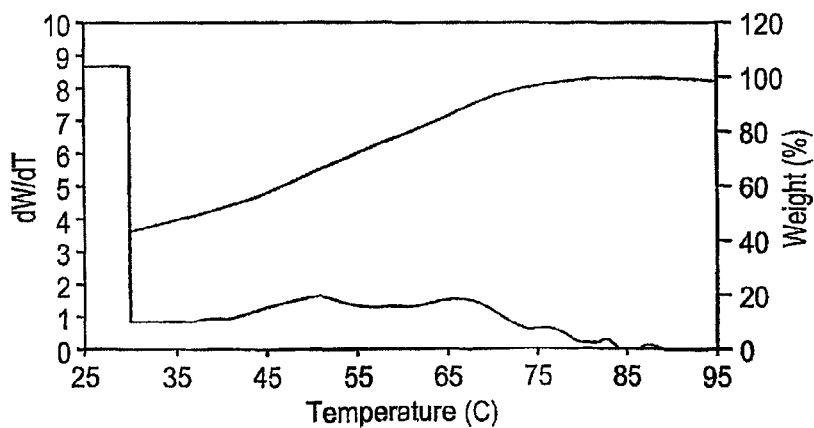

The DSC curve in FIG. 42 for the polymer of example 30 shows a peak with a 123.3° C. melting point with a heat of fusion of 146.3 J/g. The corresponding CRYSTAF curve shows the tallest peak at 50.6° C. with a peak area of 25.4 percent. The difference between the DSC Tm and the Tcrystaf is 72.7° C.

Figure 43:
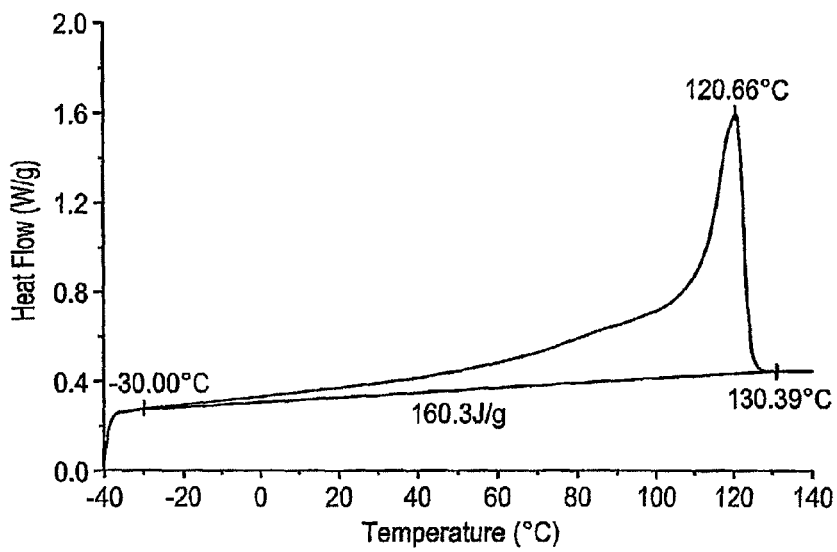
Figure 43:
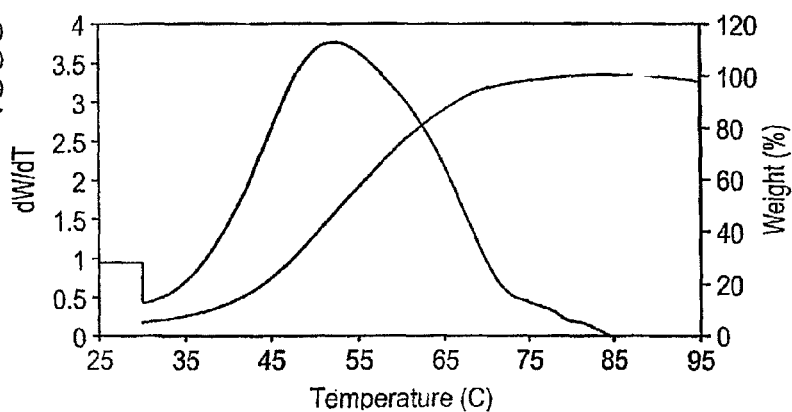

The DSC curve in FIG. 43 for the polymer of example 31 shows a peak with a 120.7° C. melting point with a heat of fusion of 160.3 J/g. The corresponding CRYSTAF curve shows the tallest peak at 52.3° C. with a peak area of 95.1 percent. The difference between the DSC Tm and the Tcrystaf is 68.4° C.

Figure 44:
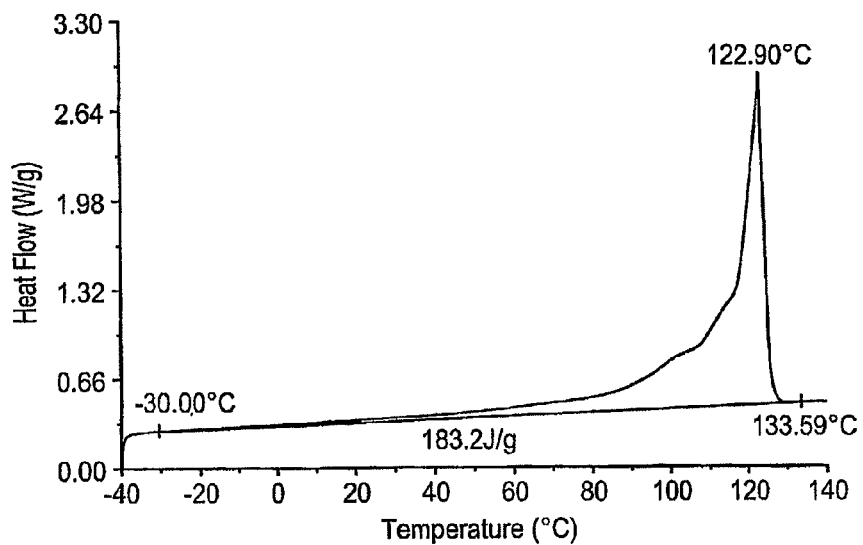
Figure 44:
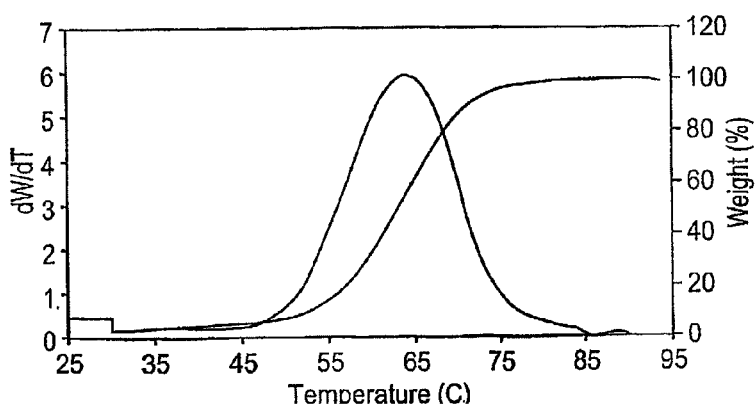

The DSC curve in FIG. 44 for the polymer of example 32 shows a peak with a 122.9° C. melting point with a heat of fusion of 183.2 J/g. The corresponding CRYSTAF curve shows the tallest peak at 64.1° C. with a peak area of 95.2 percent. The difference between the DSC Tm and the Tcrystaf is 58.7° C.

Figure 45:
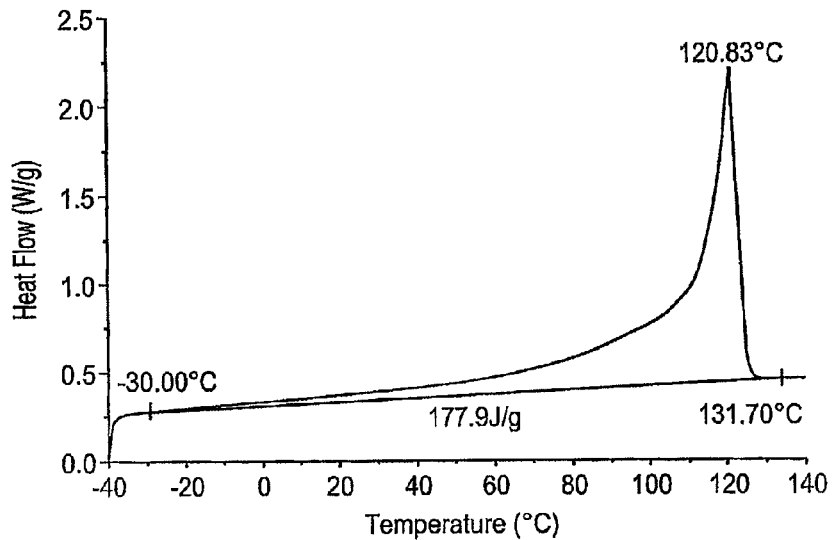
Figure 45:
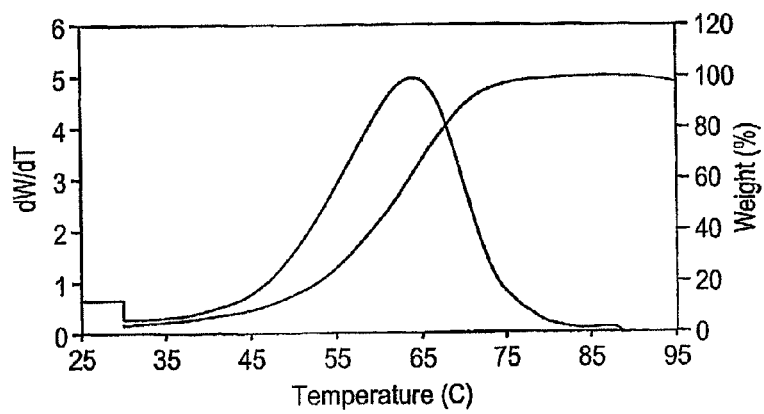

The DSC curve in FIG. 45 for the polymer of example 33 shows a peak with a 120.8° C. melting point with a heat of fusion of 177.9 J/g. The corresponding CRYSTAF curve shows the tallest peak at 64.1° C. with a peak area of 95.7 percent. The difference between the DSC Tm and the Tcrystaf is 56.7° C.

Figure 46:
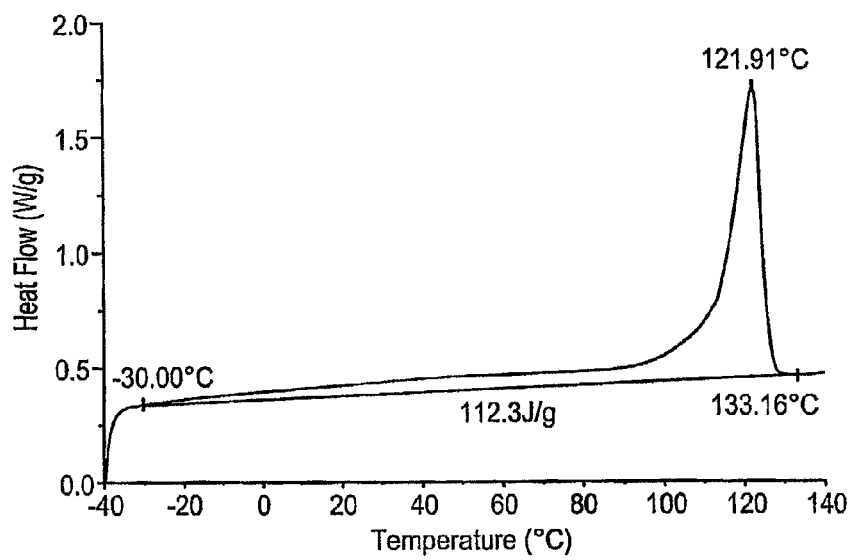
Figure 46:
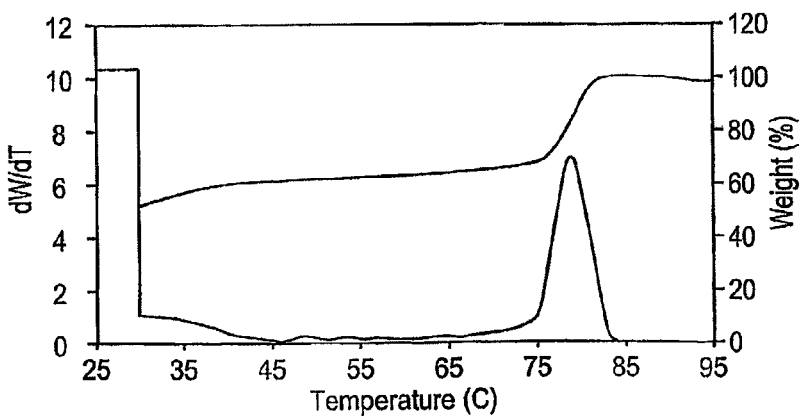

The DSC curve in FIG. 46 for the polymer of comparative M* shows a peak with a 121.9° C. melting point with a heat of fusion of 112.3 J/g. The corresponding CRYSTAF curve shows the tallest peak at 78.9° C. with a peak area of 36.1 percent. The difference between the DSC Tm and the Tcrystaf is 43.0° C.

Figure 47:
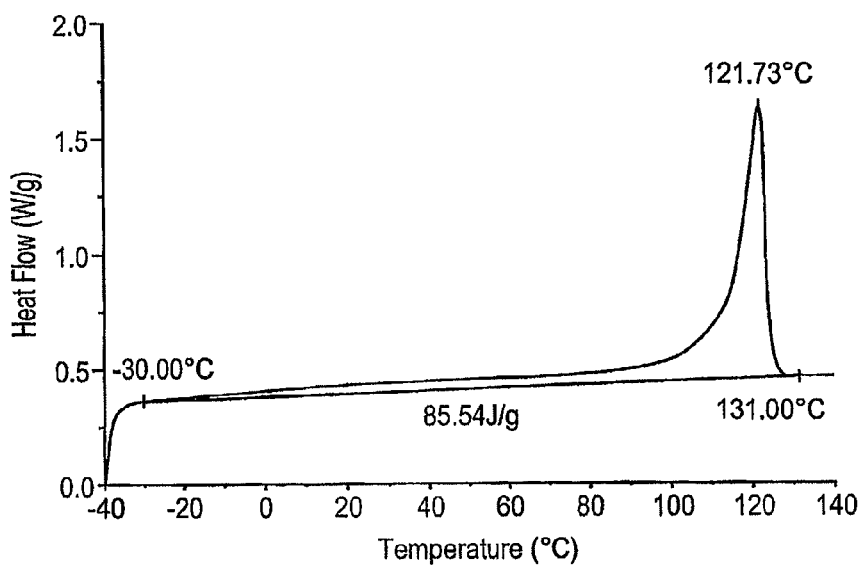
Figure 47:
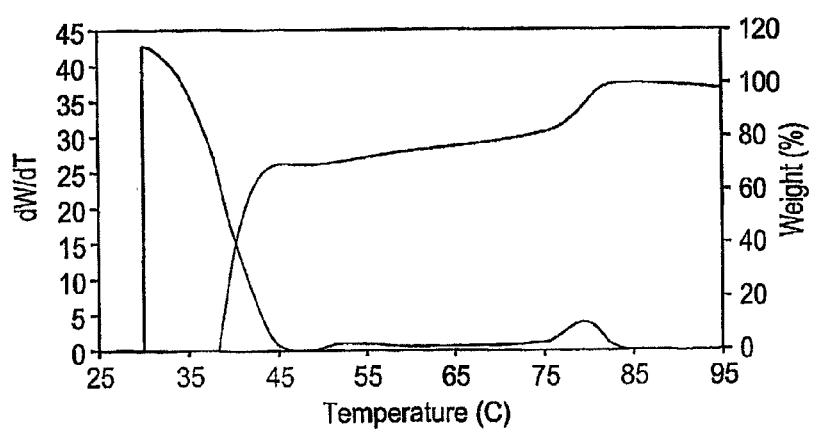

The DSC curve in FIG. 47 for the polymer of comparative N* shows a peak with a 121.7° C. melting point with a heat of fusion of 85.5 J/g. The corresponding CRYSTAF curve shows the tallest peak at 30.0° C. with a peak area of 69.7 percent. The difference between the DSC Tm and the Tcrystaf is 91.7° C. However, it should be noted the $M_w/M_n$ for this comparative example is 15 and is much larger than the inventive examples.

Figure 48:
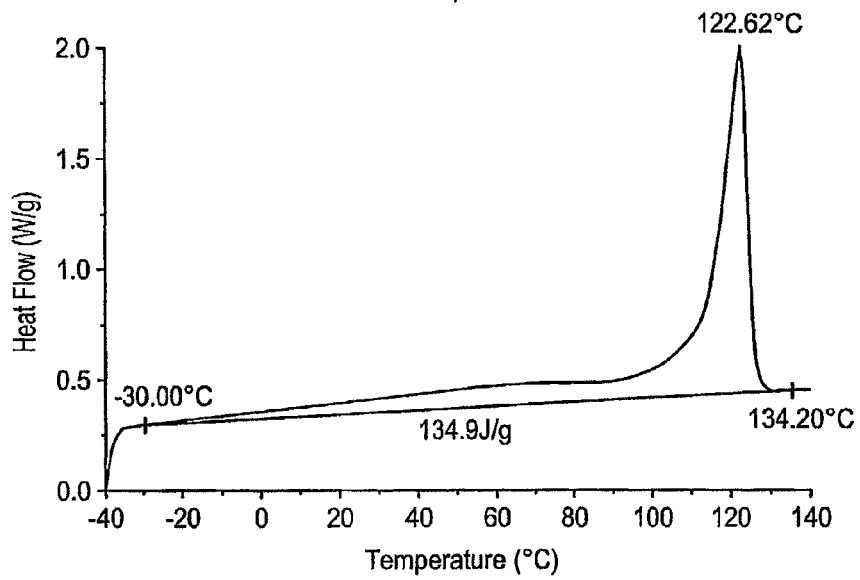
Figure 48:
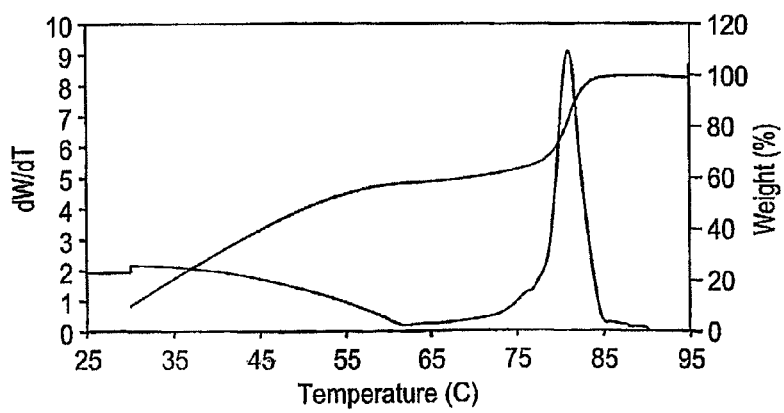

The DSC curve in FIG. 48 for the polymer of comparative O* shows a peak with a 122.6° C. melting point with a heat of fusion of 134.9 J/g. The corresponding CRYSTAF curve shows the tallest peak at 81.1° C. with a peak area of 40.4 percent. The difference between the DSC Tm and the Tcrystaf is 41.5° C.

Figure 49:
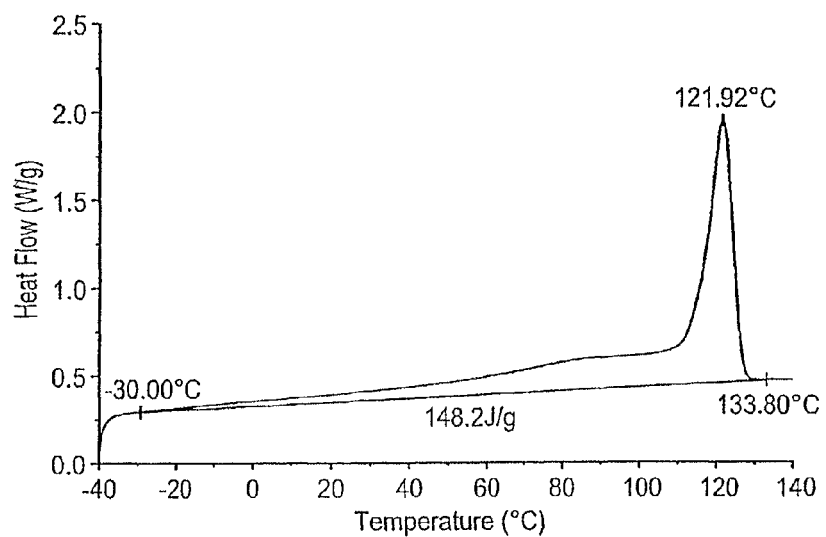
Figure 49:
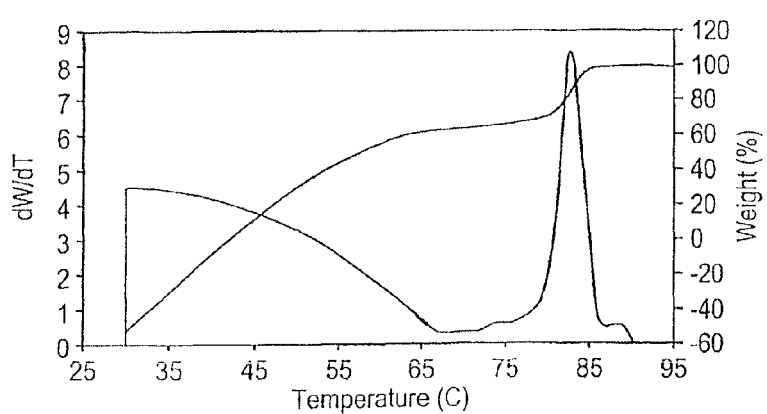
Figure 50:
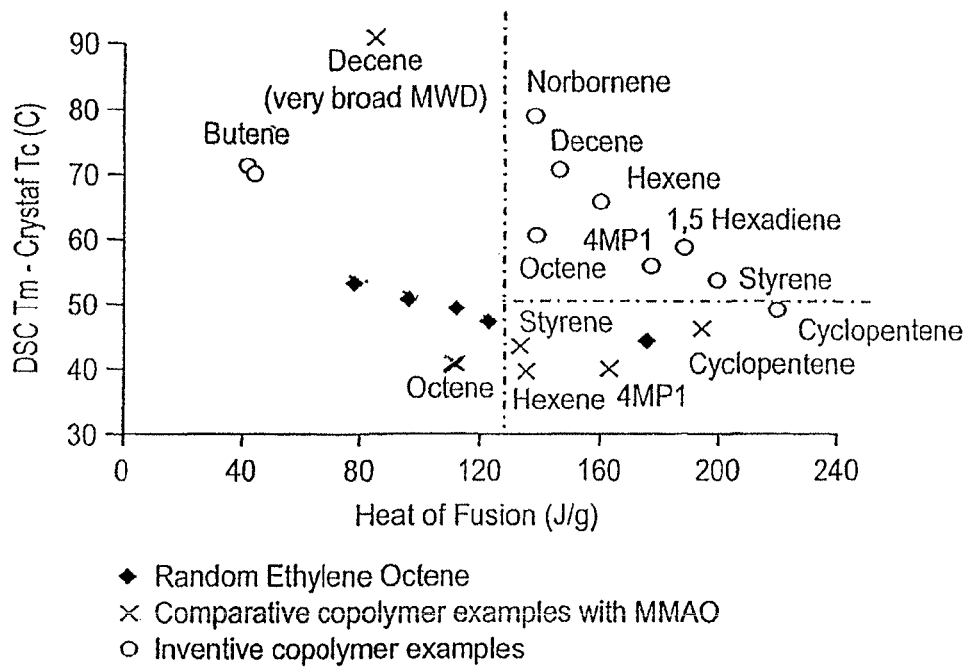
FIG. 50 shows plots of delta DSC-CRYSTAF as a function of DSC Melt Enthalpy for polymers of Examples 24, 25, 29-33, Comparative polymers M-P, and conventional ethylene/octene copolymers.

The DSC curve in FIG. 49 for the polymer of comparative P* shows a peak with a 121.9° C. melting point with a heat of fusion of 148.2 J/g. The corresponding CRYSTAF curve shows the tallest peak at 82.8° C. with a peak area of 33.3 percent. The difference between the DSC Tm and the Tcrystaf is 39.1° C.

FIG. 50 is a plot of the difference in peak DSC Tm−peak CRYSTAF Temperature as a function of DSC Melt Enthalpy for Examples 24, 25, 29-33, Comparative polymers M-P, and commercially obtained ethylene/octene copolymers.

TABLE 26

Polymer Physical Properties

| Ex. | Comonomer | CSA | PolymerType | Mw (g/mol) | Mn (g/mol) | Mw/Mn | ΔH (J/g) | $T_m$ (° C.) | $T_c$ (° C.) | $T_{CRYSTAF}$ (° C.) | $T_m - T_{CRYSTAF}$ (° C.) | Crystaf Peak Area (percent) |
|---|---|---|---|---|---|---|---|---|---|---|---|---|
| M* | 1-octene | — | blend | 398,900 | 24,400 | 16.3 | 112 | 122 | 108 | 79 | 43 | 36 |
| 29 | 1-octene | SA5 | multi-block | 28,600 | 9,280 | 3.1 | 139 | 122 | 109 | 61 | 61 | 18 |
| N* | 1-decene | — | blend | 414,400 | 27,600 | 15.0 | 86 | 122 | 108 | 80 | 42 | 24 |
| 30 | 1-decene | SA5 | multi-block | 26,200 | 8,030 | 3.3 | 146 | 123 | 113 | 51 | 73 | 25 |
| O* | 1-hexene | — | blend | 368,100 | 23,400 | 15.7 | 135 | 123 | 108 | 81 | 42 | 40 |
| 31 | 1-hexene | SA5 | multi-block | 26,200 | 8,130 | 3.2 | 160 | 121 | 109 | 52 | 68 | 95 |
| 32 | 1,5-hexadiene | SA5 | multi-block | 29,000 | 9,860 | 2.9 | 183 | 123 | 111 | 64 | 59 | 95 |
| P* | 4-methyl-1-pentene | — | blend | 412,800 | 29,500 | 14.0 | 148 | 122 | 110 | 83 | 39 | 33 |
| 33 | 4-methyl-1-pentene | SA5 | multi-block | 25,900 | 7,450 | 3.5 | 178 | 121 | 110 | 64 | 57 | 96 |

*Comparative, not an example of the invention

Examples 34-36, Comparatives Q-S

The reaction conditions of Examples 1-4 are substantially repeated to prepare copolymers of ethylene and a variety of aromatic and cycloaliphatic comonomers (styrene, cyclopentene, and bicyclo[2.2.1]hept-2-ene (norbornene)). The chain shuttling agent used is diethylzinc (SA1). MMAO is substituted for the CSA for comparatives Q-S. Polymerization details are provided in Table 27. Polymer properties are contained in Table 28.

TABLE 27

Process Data

| Ex. | Comonomer | Comon (µL) | Cat. (A1) (µmol) | Cat (B1) (µmol) | Cocat 1 (µmol) | MMAO (µmol) | SA1 (µmol) | Yield (g) |
|---|---|---|---|---|---|---|---|---|
| Q* | styrene | 231 | 0.30 | 0.30 | 0.72 | 3.0 | — | 0.1892 |
| 34 | styrene | 231 | " | " | " | — | 10 | 0.1702 |
| R* | cyclopentene | 177 | " | " | " | 3.0 | — | 0.2099 |
| 35 | cyclopentene | 177 | " | " | " | — | 10 | 0.1652 |
| S* | bicyclo[2.2.1]hept-2-ene | 333 | " | " | " | 3.0 | — | 0.1626 |
| 36 | bicyclo[2.2.1]hept-2-ene | 333 | " | " | " | — | 10 | 0.1354 |

TABLE 28

Polymer Physical Properties

| Ex. | Comonomer | CSA | Polymer Type | Mw (g/mol) | Mn (g/mol) | Mw/Mn | Heat of Fusion (J/g) | $T_m$ (° C.) | $T_c$ (° C.) | $T_{CRYSTAF}$ (° C.) | $T_m - T_{CRYSTAF}$ (° C.) | CRYSTAF Peak Area (percent) |
|---|---|---|---|---|---|---|---|---|---|---|---|---|
| Q* | styrene | — | blend | 111,500 | 35,900 | 3.11 | 133 | 117 | 104 | 73 | 44 | 97 |
| 34 | styrene | SA1 | multi-block | 15,200 | 11,700 | 1.30 | 187 | 123 | 114 | 69 | 54 | 95 |
| R* | cyclopentene | — | blend | 129,300 | 17,600 | 7.35 | 193 | 128 | 115 | 82 | 47 | 86 |
| 35 | cyclopentene | SA1 | multi-block | 13,600 | 9,660 | 1.41 | 231 | 130 | 119 | 81 | 50 | 84 |
| S* | bicyclo[2.2.1]hept-2-ene | — | blend | 680,300 | 120,200 | 5.66 | 80 | 81 | 92 | — | — | — |
| 36 | bicyclo[2.2.1]hept-2-ene | SA1 | multi-block | 15,700 | 9,560 | 1.64 | 138 | 109 | 97 | 30 | 79 | 21 |

*Comparative, not an example of the invention

The invention claimed is:

1. An ethylene/α-olefin multi-block interpolymer comprising in polymerized form at least 50 mole percent ethylene and one or more copolymerizable α-olefin comonomers, said interpolymer containing therein two or more blocks differing in comonomer content, crystallinity, density, melting point or glass transition temperature;
   the interpolymer comprising from 3.7 ppm to 11.0 ppm of a first Group IVB metal and a second Group IVB metal.

2. The multi-block interpolymer of claim 1 wherein the first Group IVB metal is hafnium and the second Group IVB metal is zirconium.

3. An ethylene/α-olefin multi-block interpolymer comprising in polymerized form at least 50 mole percent ethylene and having a single melting point and the interpolymer comprising:
   at least three metals.

4. The ethylene/α-olefin block interpolymer of claim 3 having a Mw/Mn from 1.7 to 3.5, at least one melting point, $T_m$, in degrees Celsius and density, d*, in grams/cubic centimeter, wherein the numerical values of the variables correspond to the relationship:

$$T_m > -2002.9 + 4538.5(d^*) - 2422.2(d^*)^2.$$

5. The ethylene/α-olefin block interpolymer of claim 4 comprising ethylene in polymerized form and one or more copolymerizable comonomers, said interpolymer containing therein two or more blocks differing in comonomer content, crystallinity, density, melting point or glass transition temperature.

6. The ethylene/α-olefin block interpolymer of claim 3 comprising a first Group IVB metal; and a second Group IVB metal.

7. The ethylene/α-olefin block interpolymer of claim 3 comprising hafnium.

8. The ethylene/α-olefin block interpolymer of claim 3 comprising zinc.

* * * * *